Sept. 24, 1929.  F. S. DICKINSON  1,728,957
CORD TIRE MAKING MACHINE
Original Filed March 16, 1923  21 Sheets-Sheet 1

INVENTOR
FREDRICK S. DICKINSON
BY
ATTORNEY

Sept. 24, 1929.   F. S. DICKINSON   1,728,957
CORD TIRE MAKING MACHINE
Original Filed March 16, 1923   21 Sheets-Sheet 2

INVENTOR
FREDRICK S. DICKINSON
BY
Charles H. Wilson
ATTORNEY

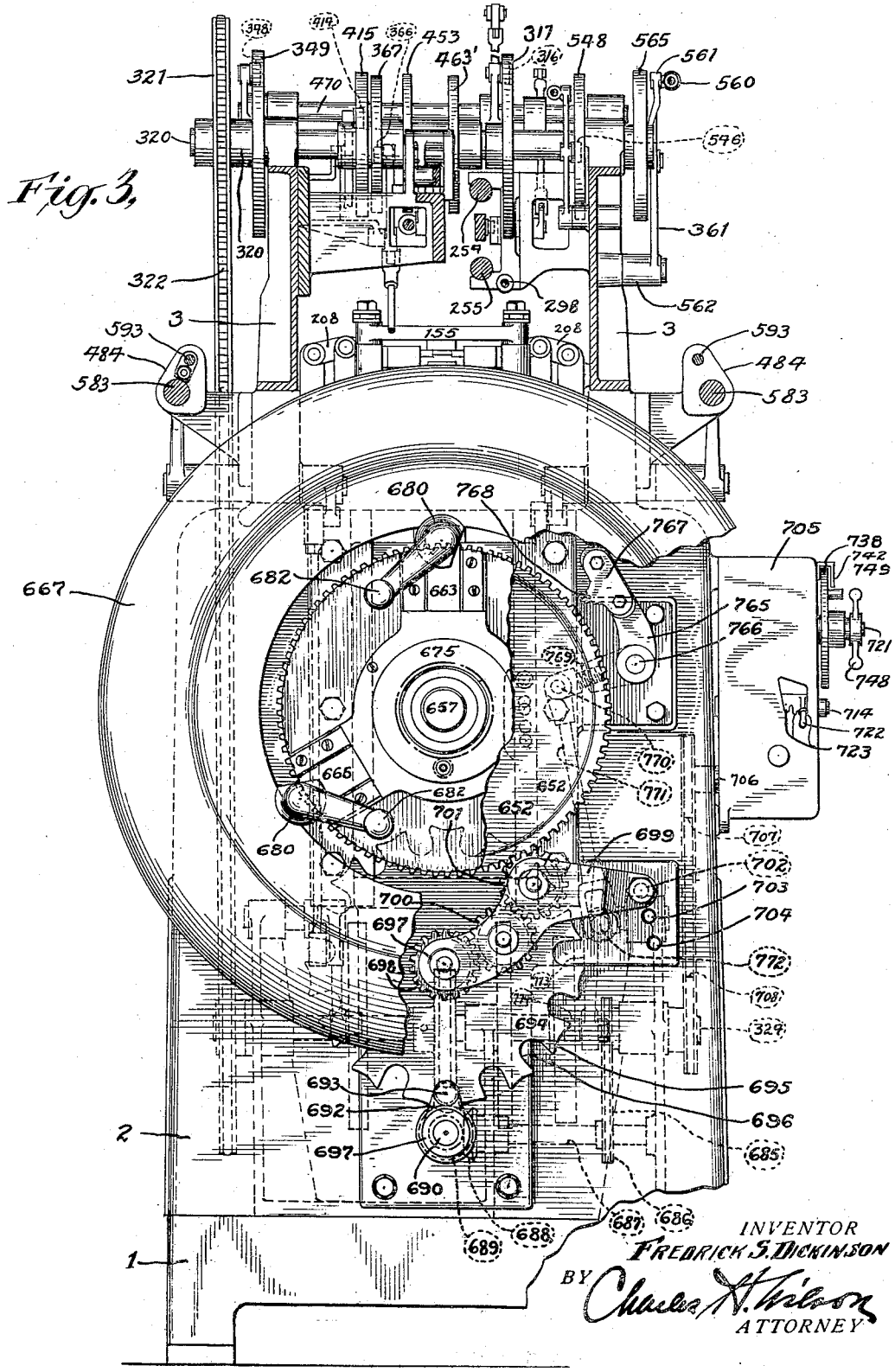

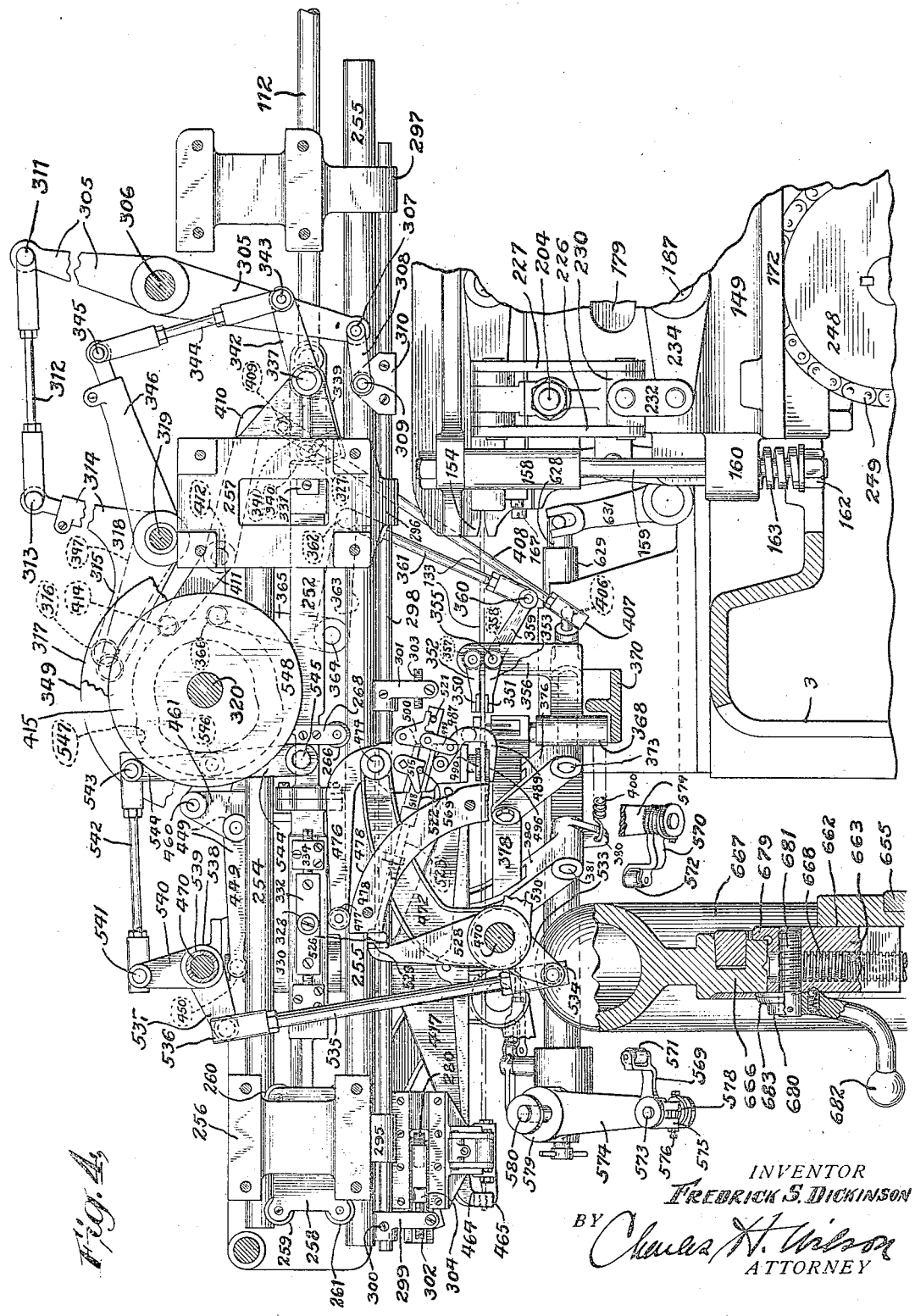

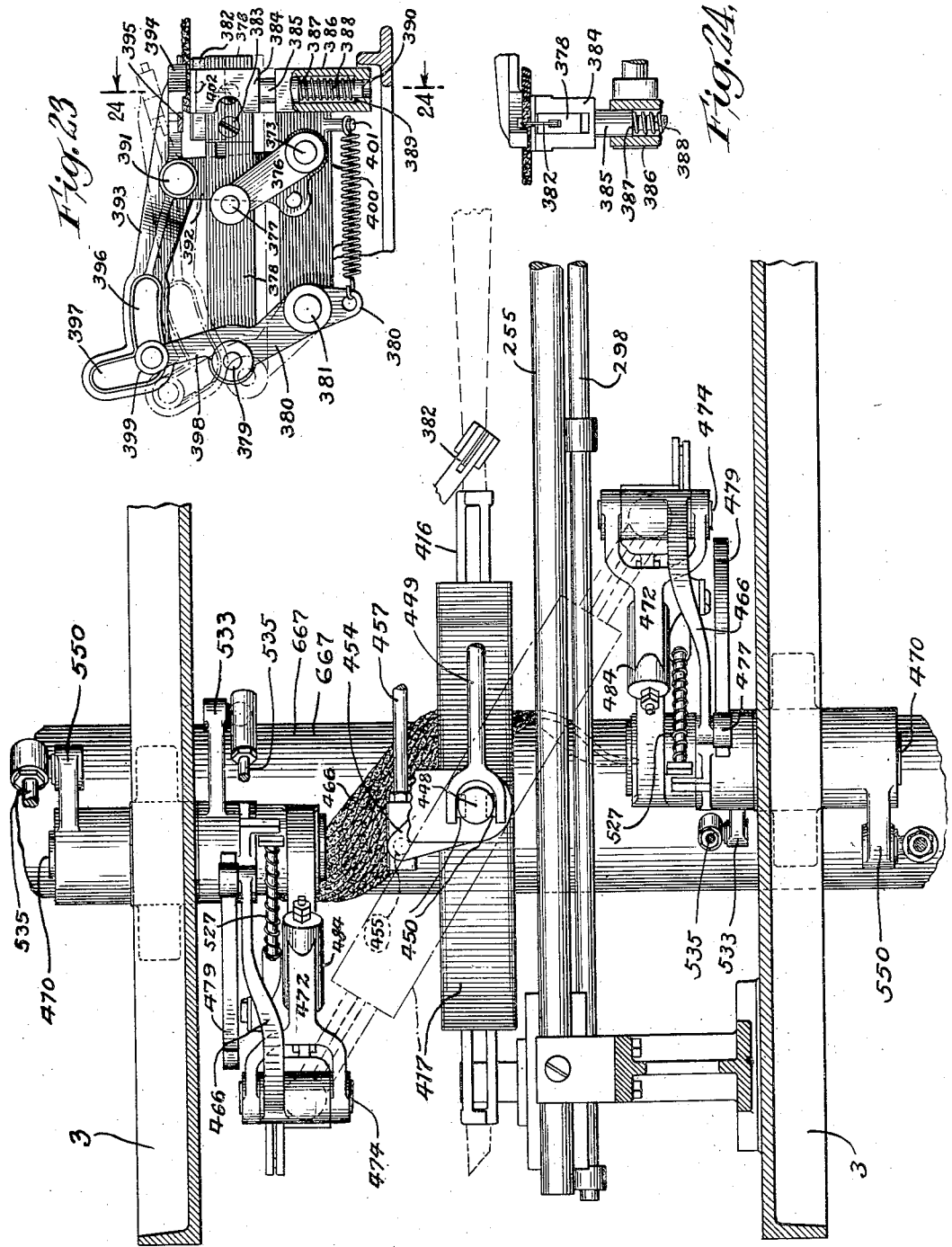

Sept. 24, 1929.　　　F. S. DICKINSON　　　1,728,957
CORD TIRE MAKING MACHINE
Original Filed March 16, 1923　　21 Sheets-Sheet 6
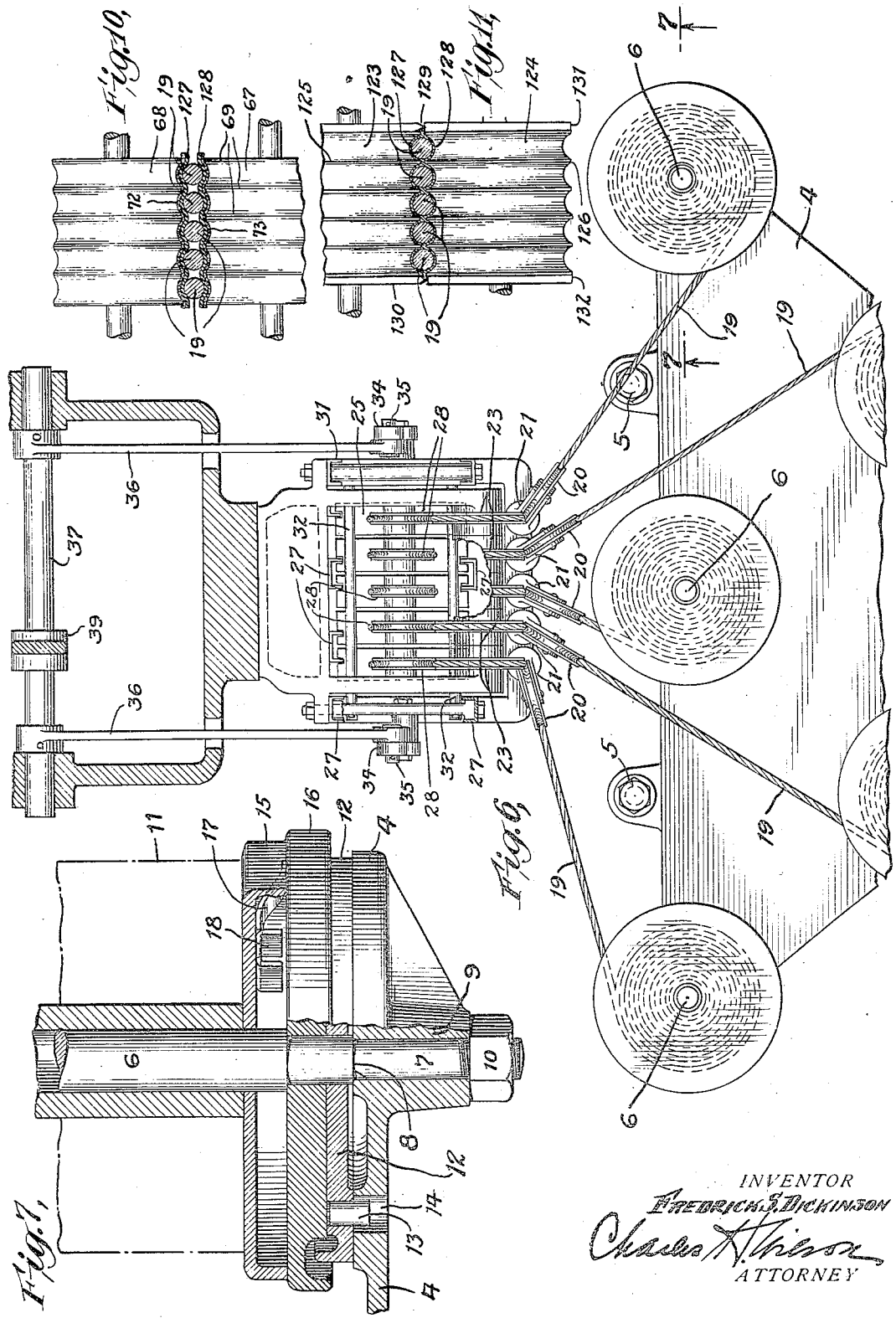
INVENTOR
FREDRICK S. DICKINSON
Charles H. Thirson
ATTORNEY Sept. 24, 1929.  F. S. DICKINSON  1,728,957
CORD TIRE MAKING MACHINE
Original Filed March 16, 1923  21 Sheets-Sheet 7

INVENTOR
FREDRICK S. DICKINSON
BY Charles H. Wilson
ATTORNEY

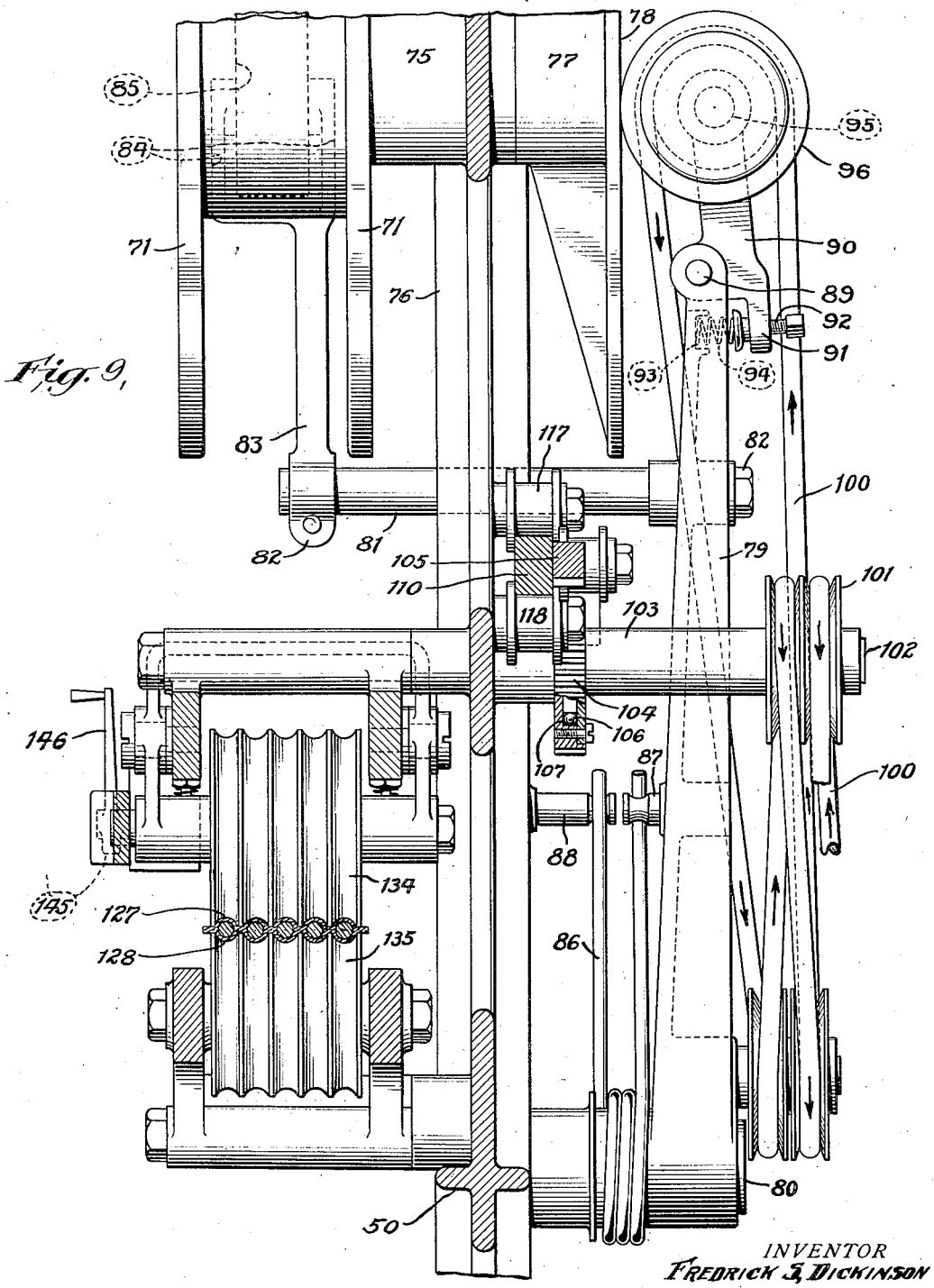

Sept. 24, 1929. F. S. DICKINSON 1,728,957
CORD TIRE MAKING MACHINE
Original Filed March 16, 1923 21 Sheets-Sheet 9
Fig. 17.
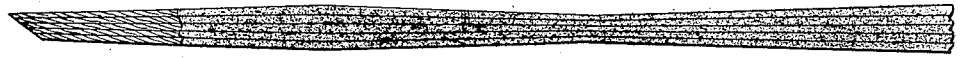
Fig. 18.
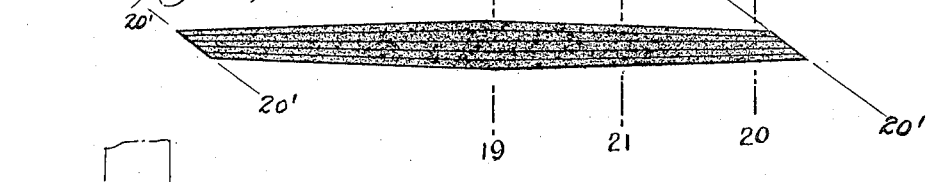
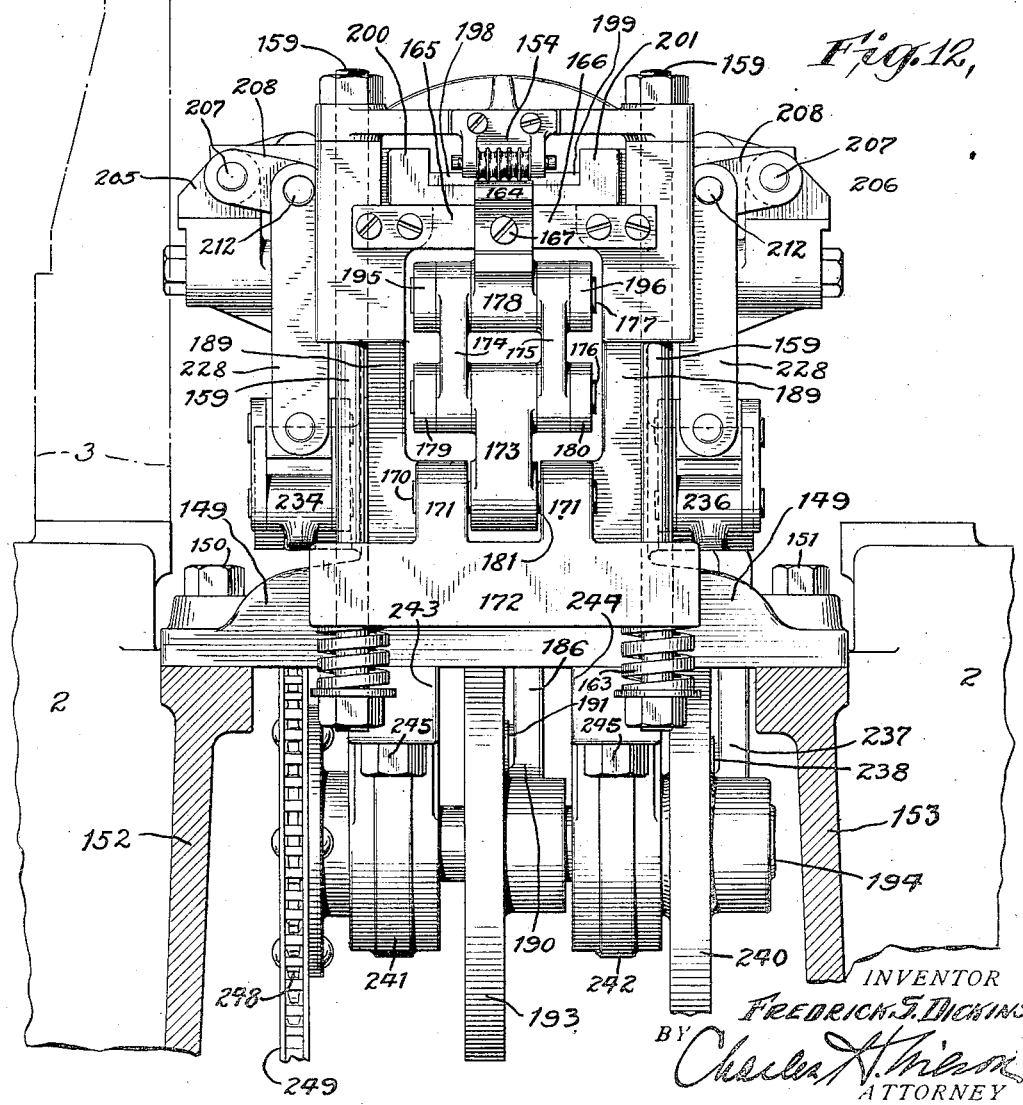
INVENTOR
FREDRICK S. DICKINSON
BY
ATTORNEY

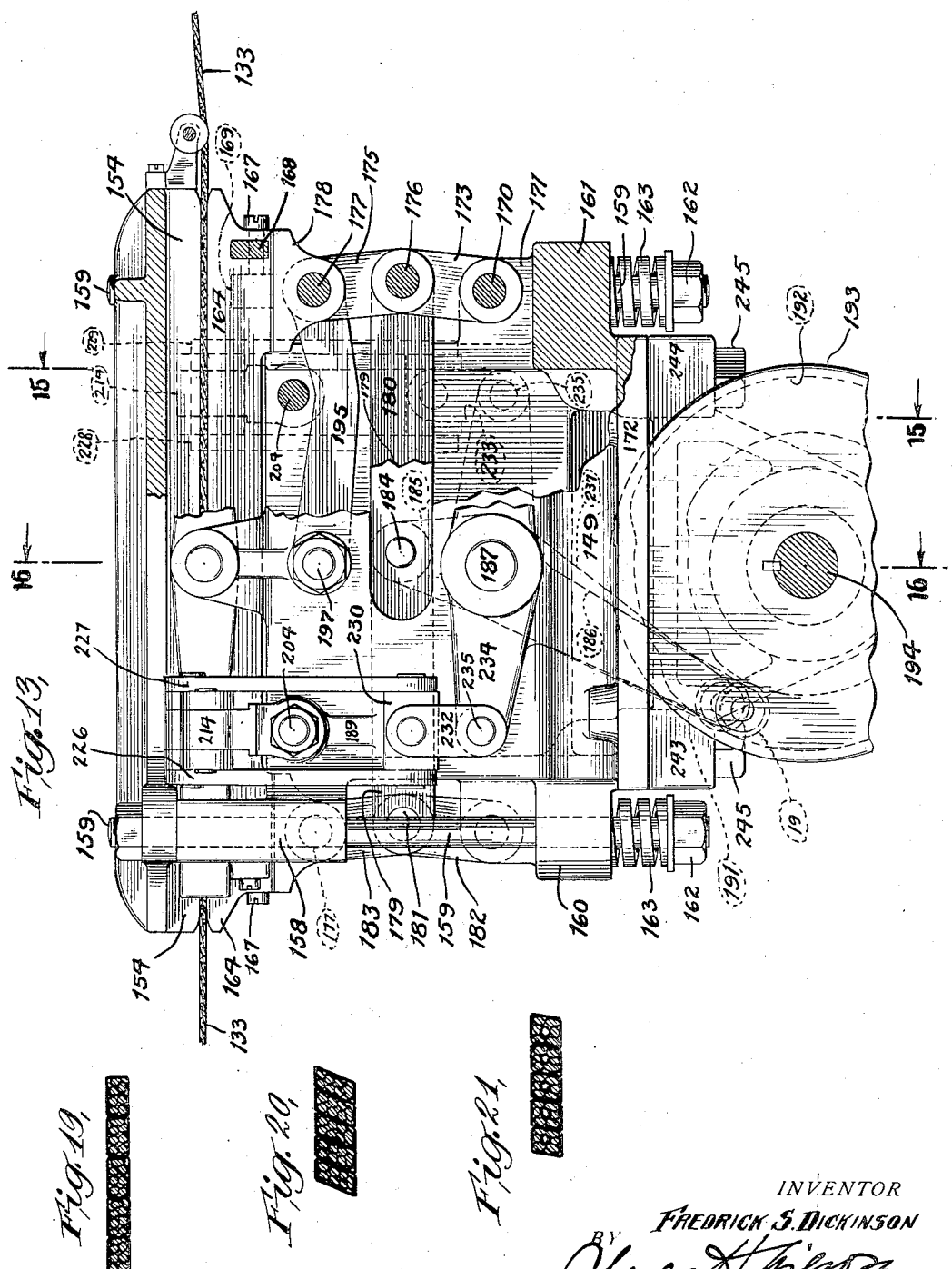

Sept. 24, 1929.   F. S. DICKINSON   1,728,957
CORD TIRE MAKING MACHINE
Original Filed March 16, 1923   21 Sheets-Sheet 11
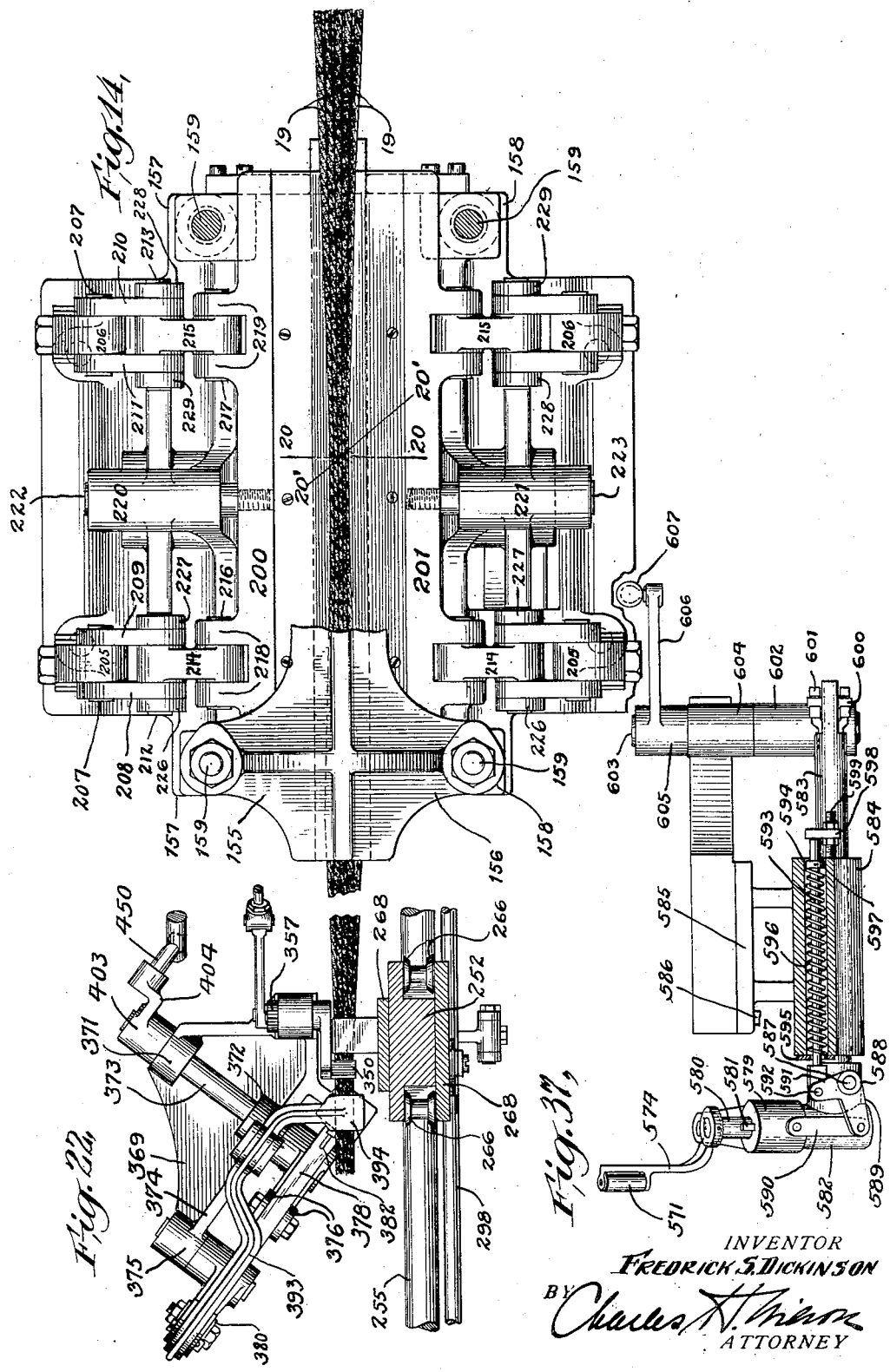
INVENTOR
FREDRICK S. DICKINSON
BY
Charles H. Therm
ATTORNEY Sept. 24, 1929.  F. S. DICKINSON  1,728,957
CORD TIRE MAKING MACHINE
Original Filed March 16, 1923   21 Sheets-Sheet 12
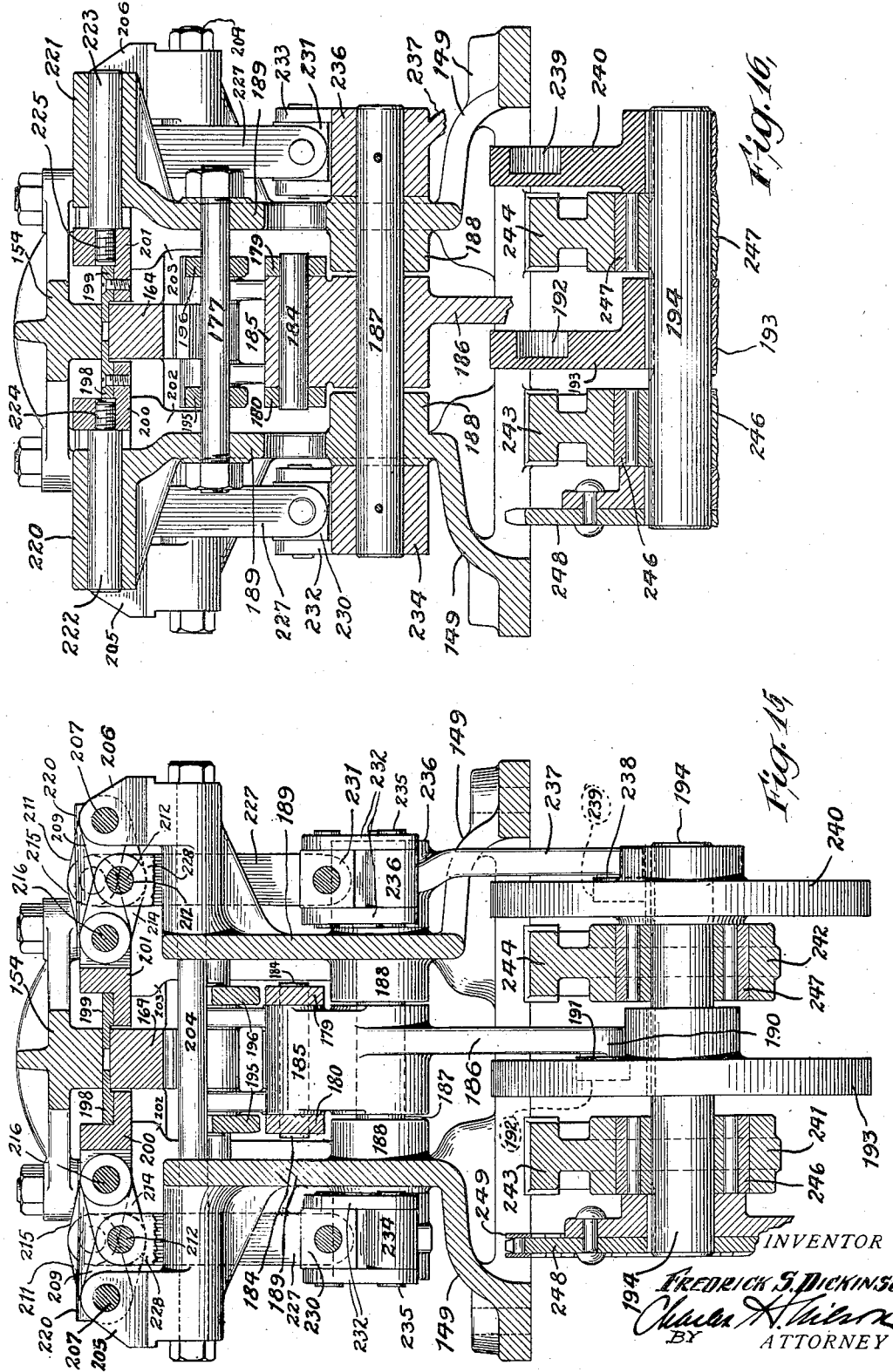
INVENTOR
FREDRICK S. DICKINSON
BY Charles H. Tilton
ATTORNEY Sept. 24, 1929.  F. S. DICKINSON  1,728,957
CORD TIRE MAKING MACHINE
Original Filed March 16, 1923   21 Sheets-Sheet 13
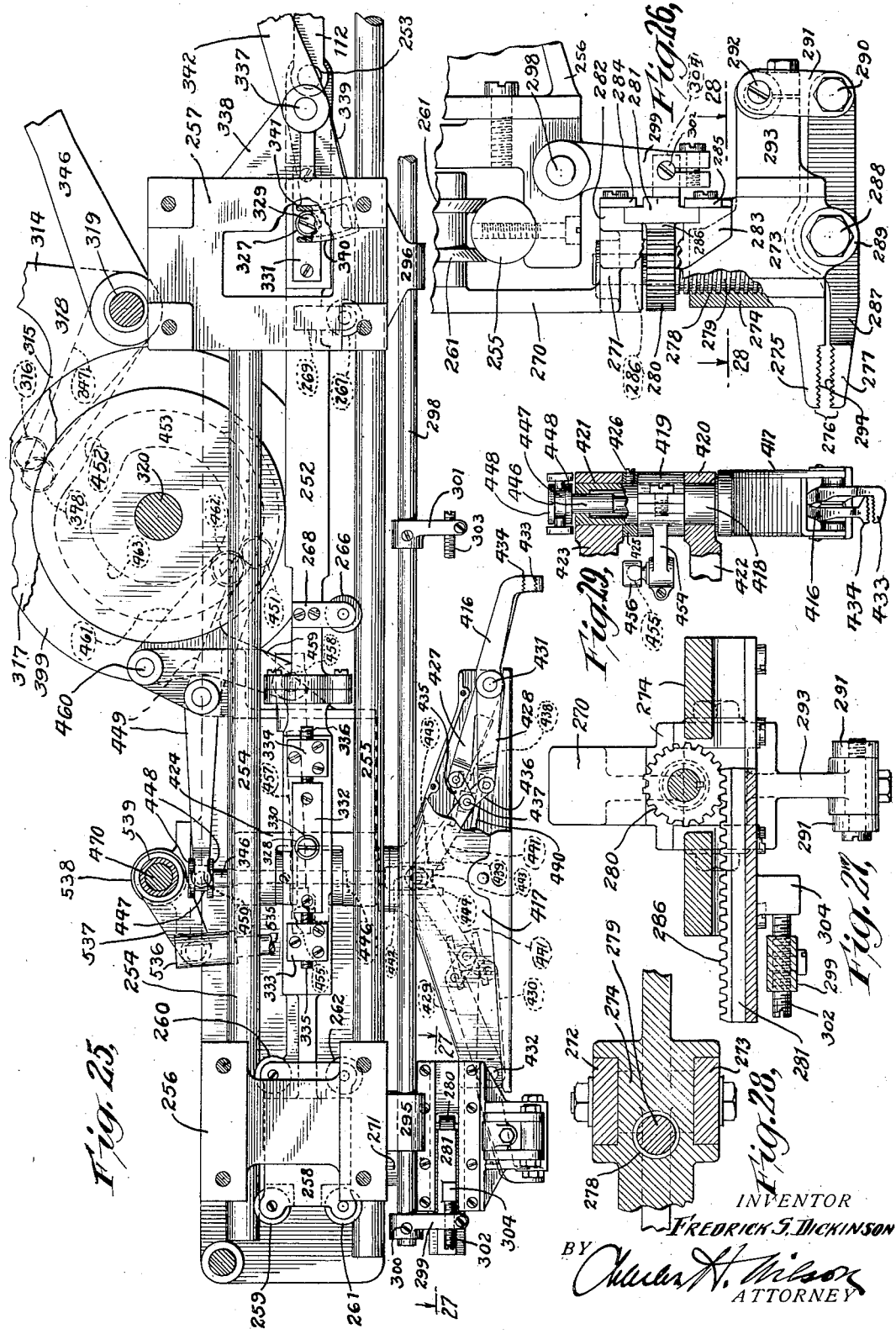
INVENTOR
FREDRICK S. DICKINSON
BY
ATTORNEY

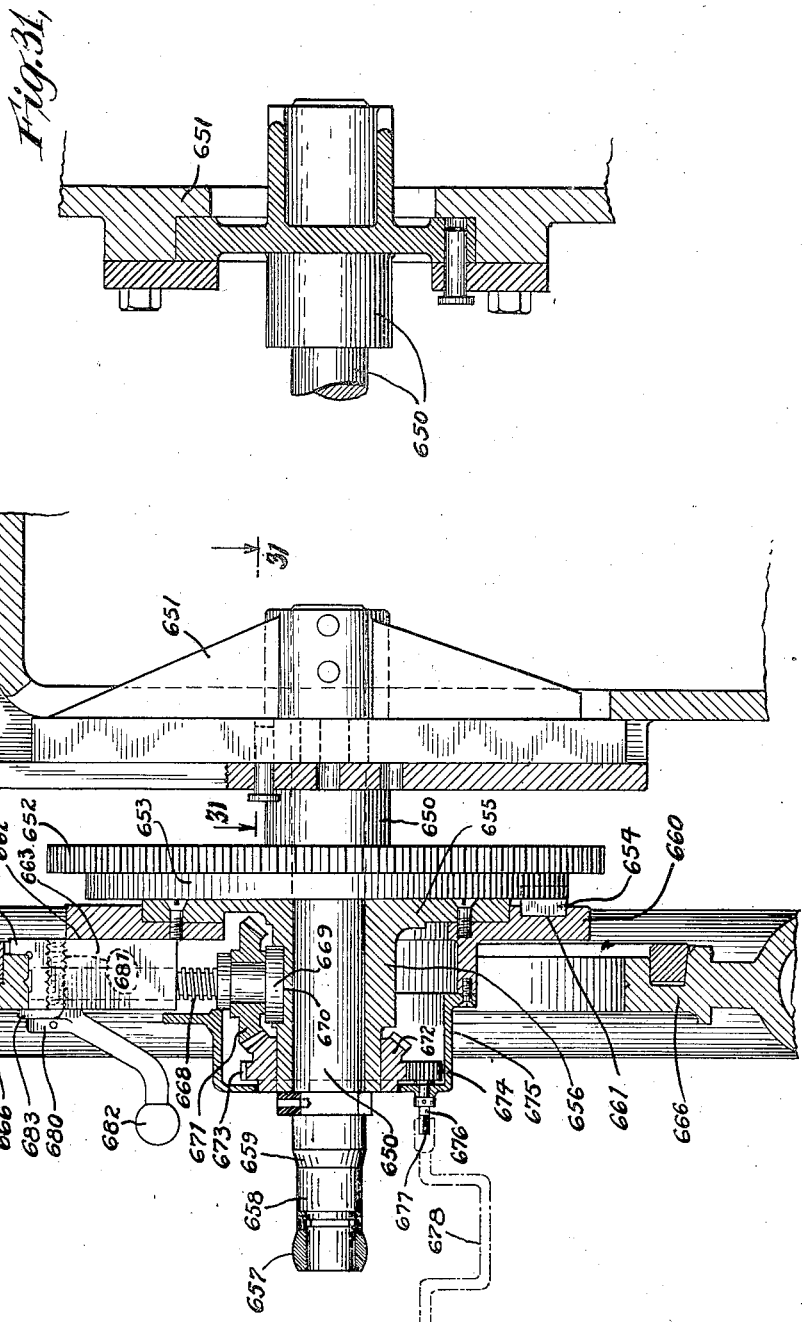

Sept. 24, 1929.　　　F. S. DICKINSON　　　1,728,957
CORD TIRE MAKING MACHINE
Original Filed March 16, 1923　　21 Sheets-Sheet 15
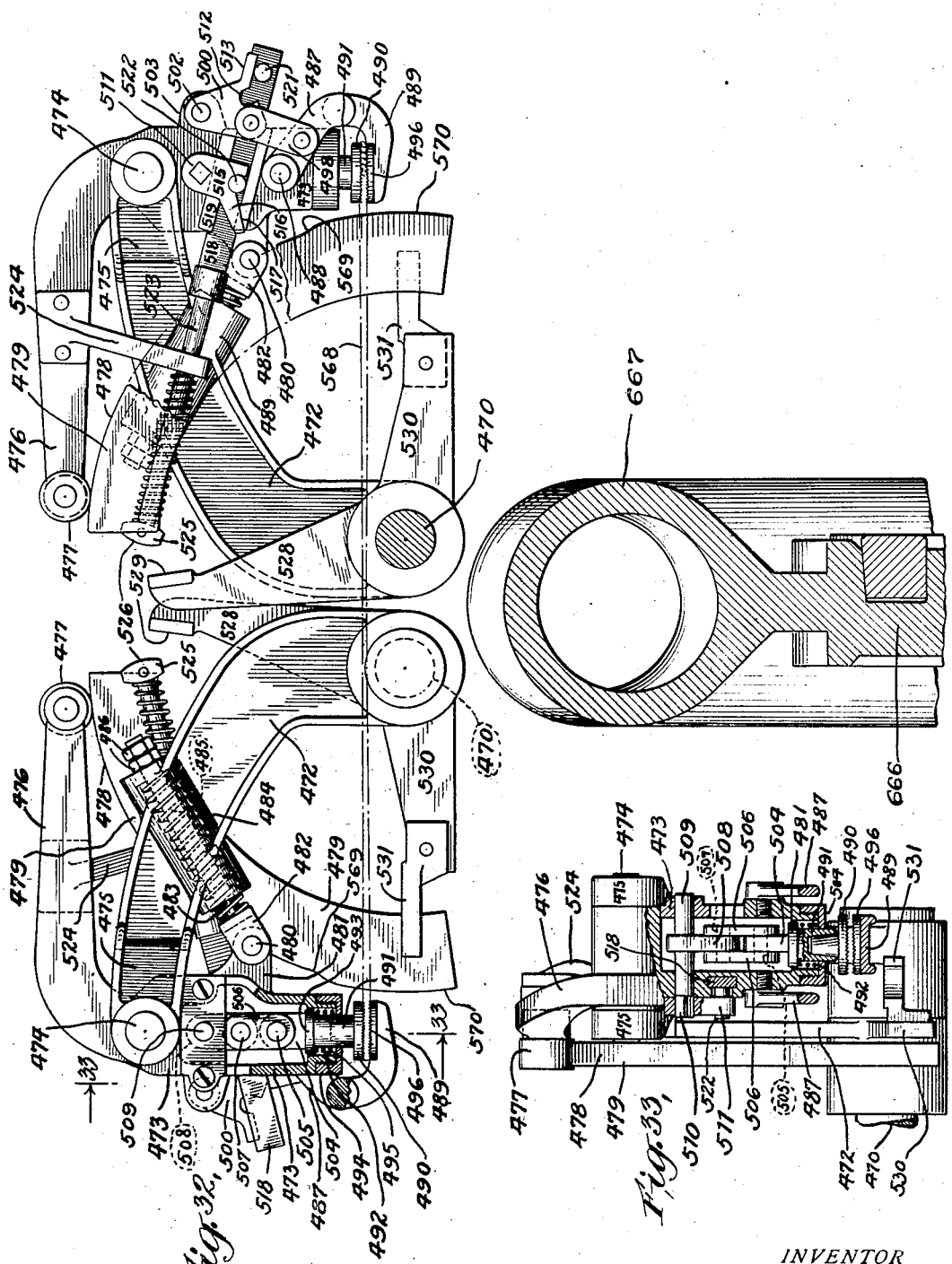
INVENTOR
FREDRICK S. DICKINSON
ATTORNEY

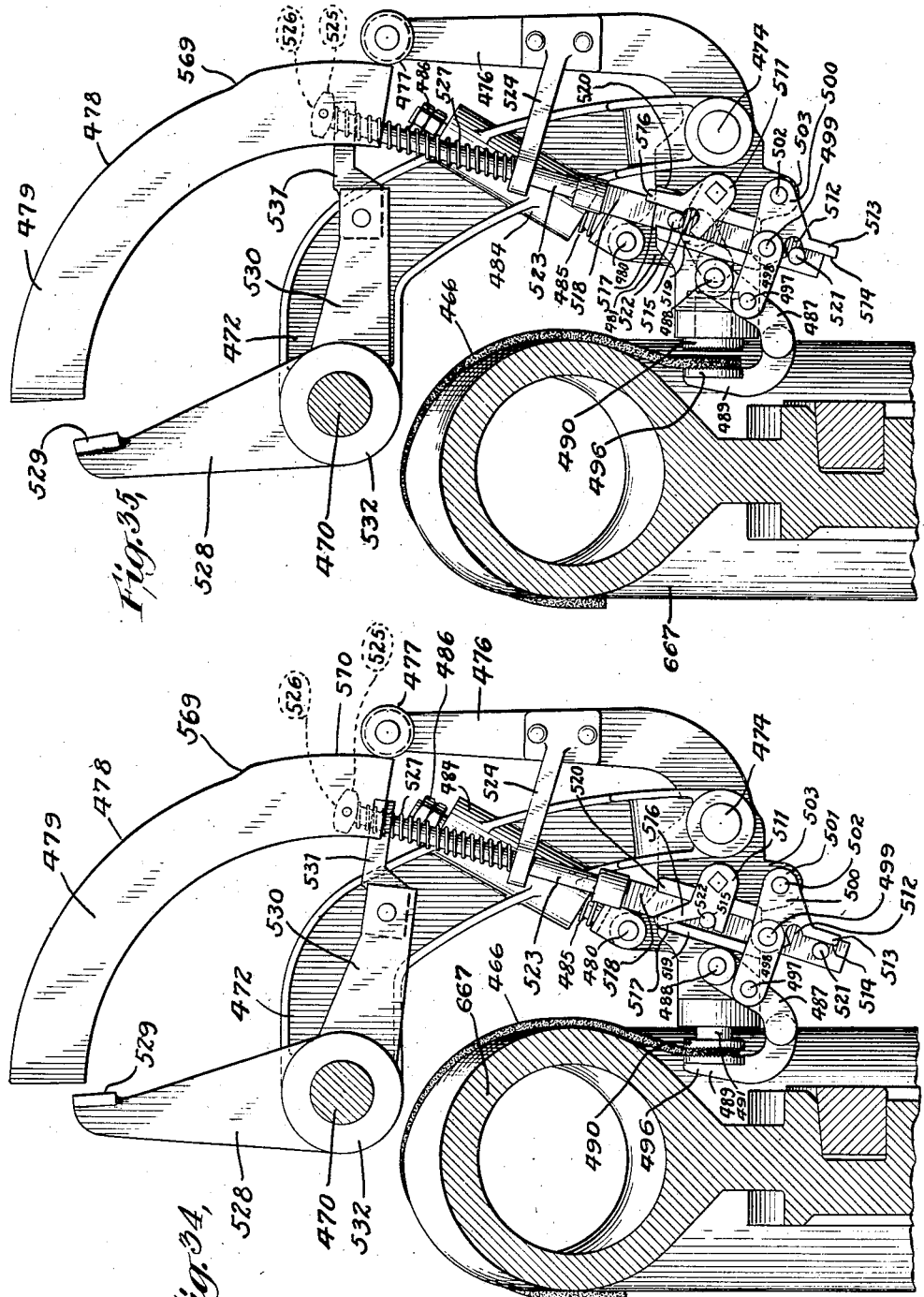

Sept. 24, 1929.  F. S. DICKINSON  1,728,957
CORD TIRE MAKING MACHINE
Original Filed March 16, 1923   21 Sheets-Sheet 17
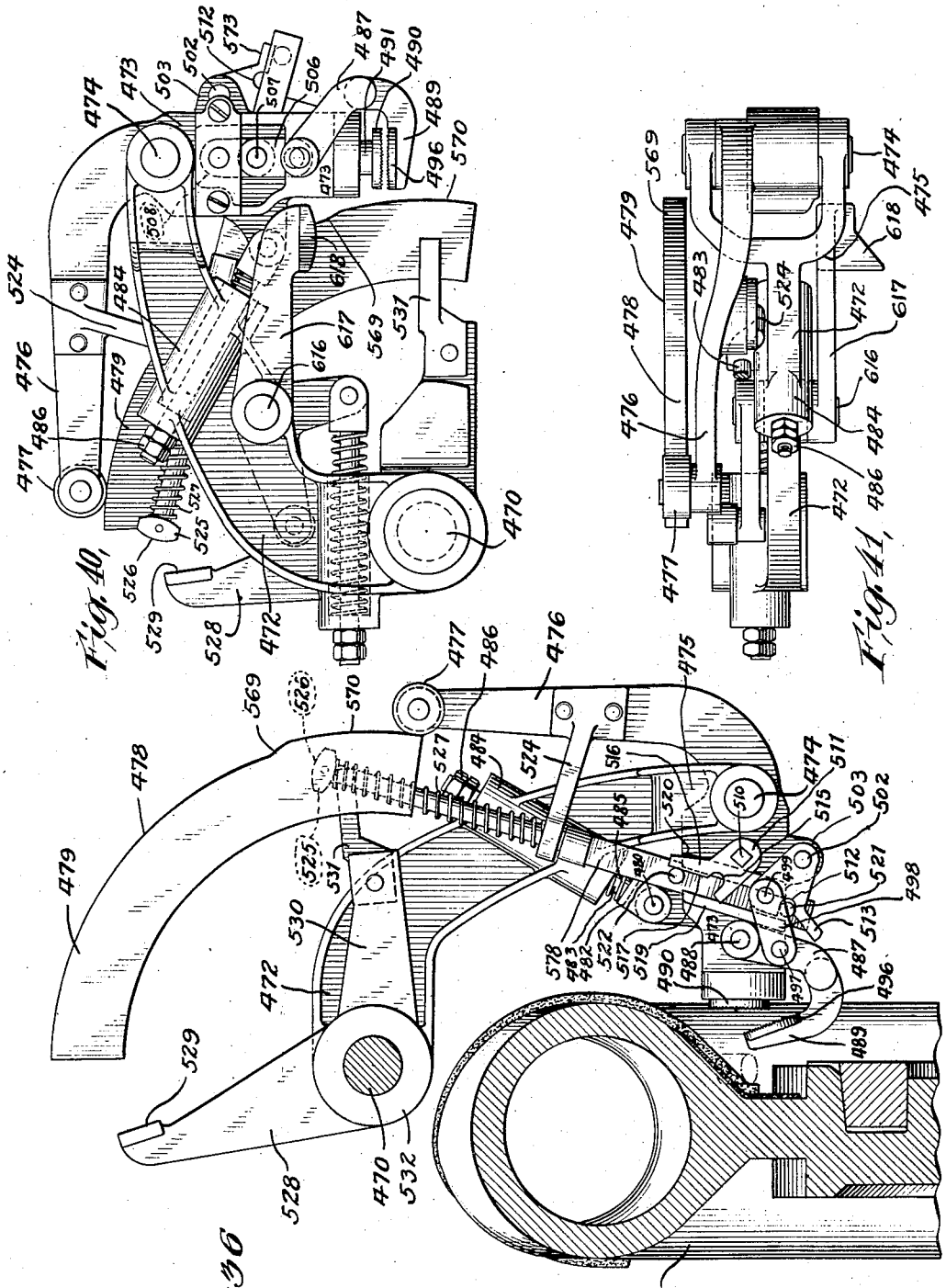
INVENTOR
FREDRICK S. DICKINSON
BY
ATTORNEY Sept. 24, 1929.　　　F. S. DICKINSON　　　1,728,957
CORD TIRE MAKING MACHINE
Original Filed March 16, 1923　　21 Sheets-Sheet 18
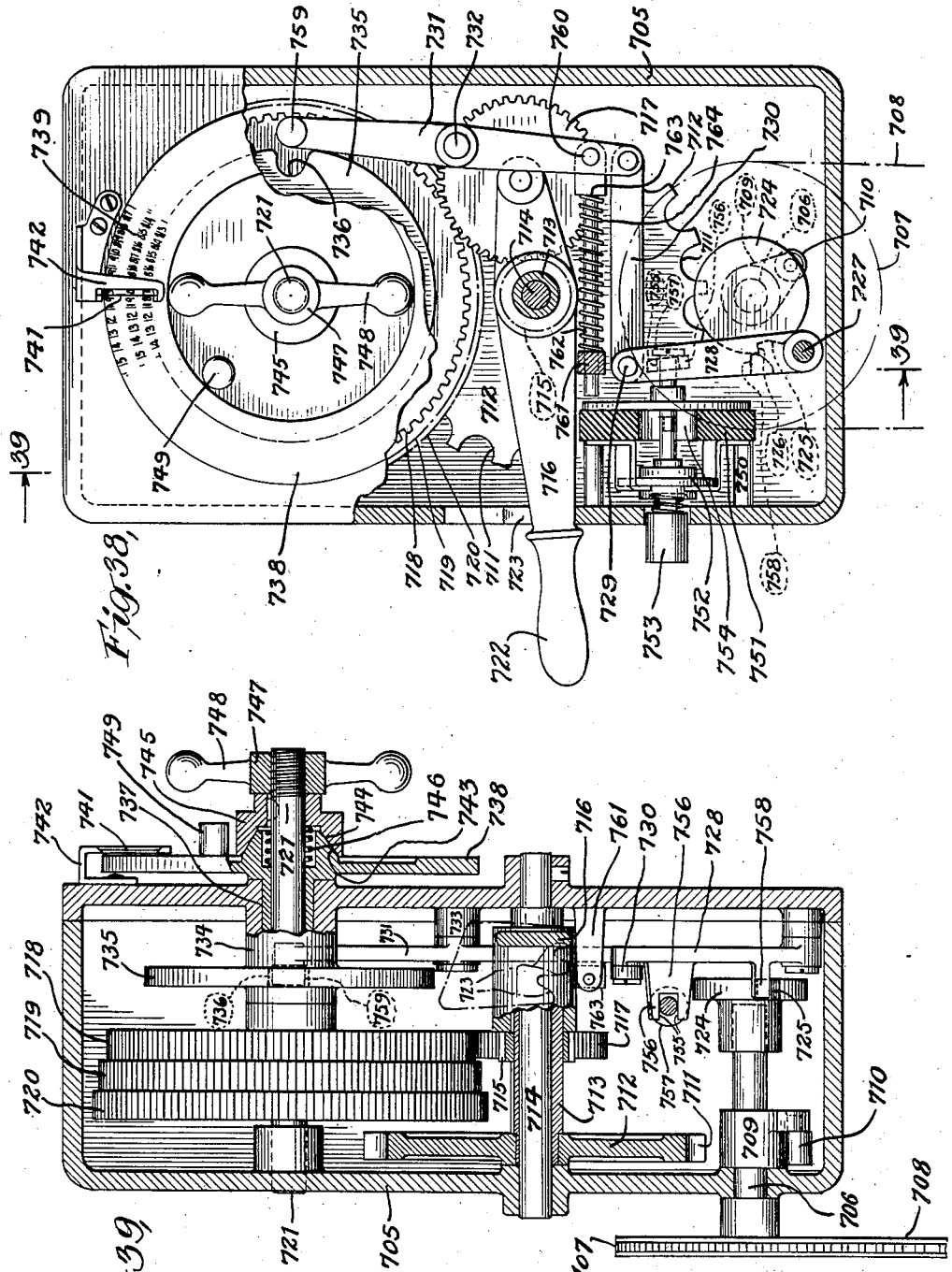

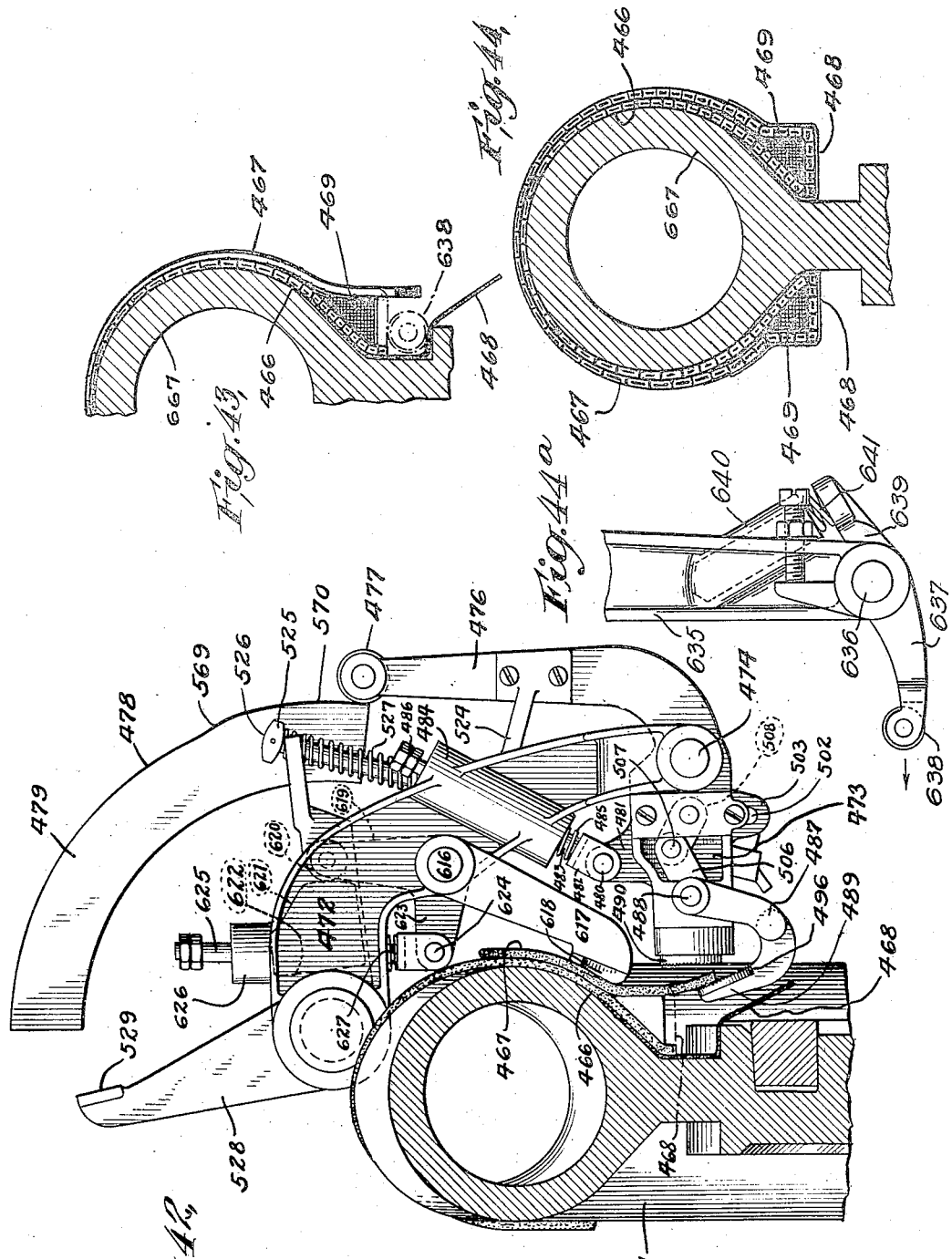

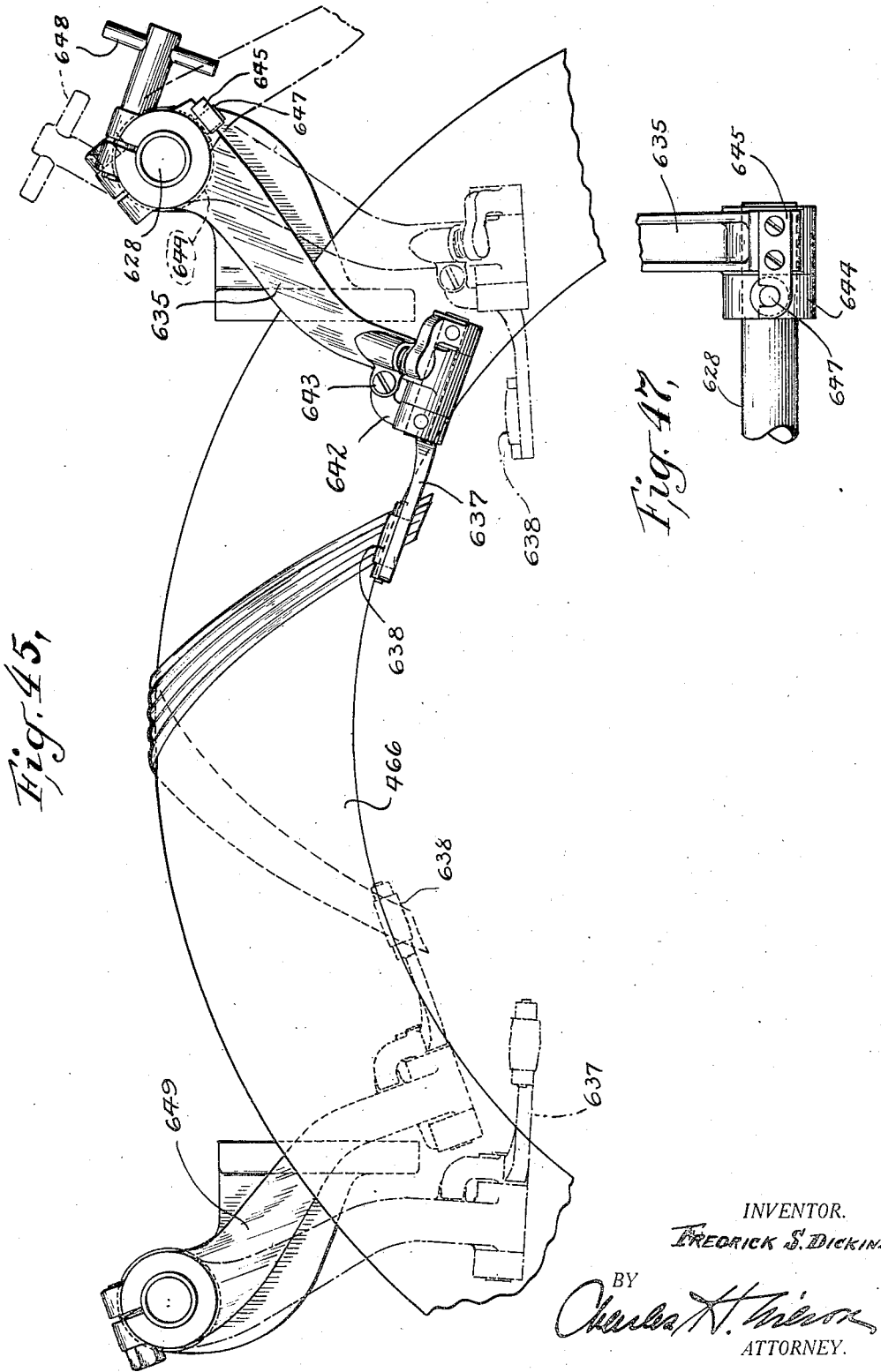

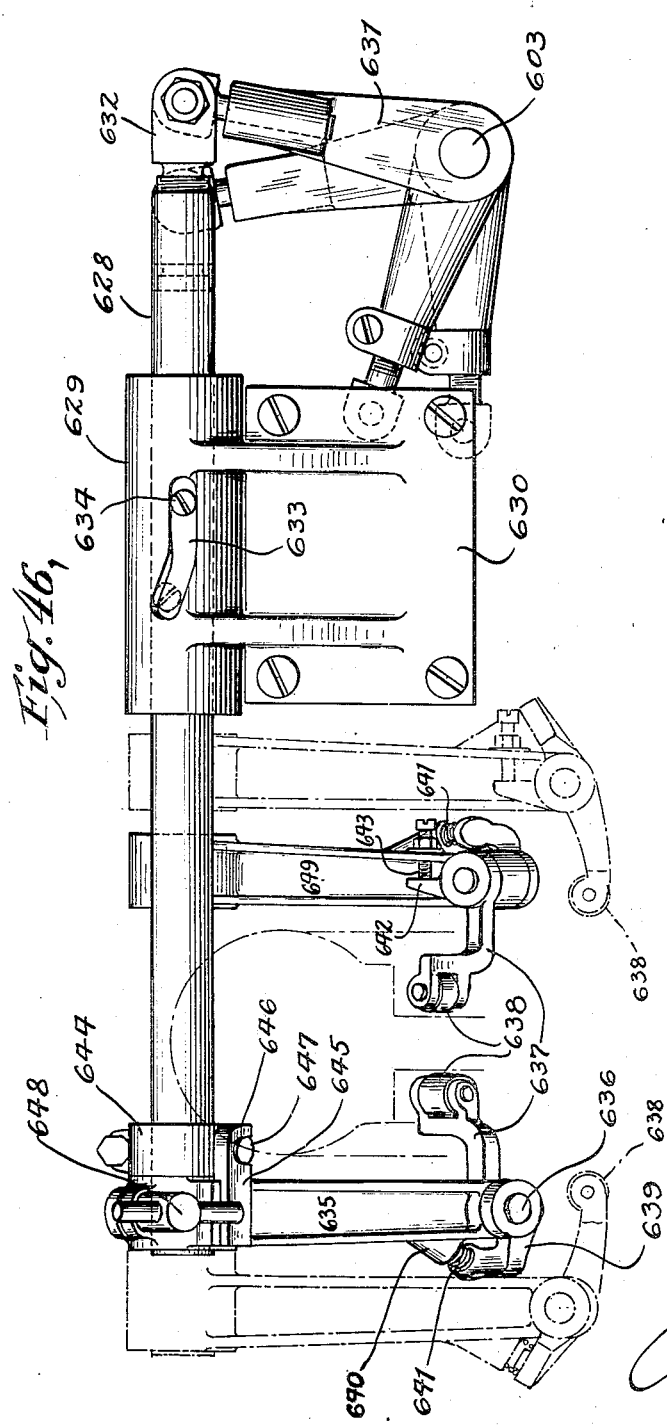

Patented Sept. 24, 1929

1,728,957

UNITED STATES PATENT OFFICE

FREDRICK S. DICKINSON, OF NEW YORK, N. Y., ASSIGNOR TO DICKINSON CORD TIRE CORPORATION, OF NEW YORK, N. Y., A CORPORATION OF DELAWARE

CORD-TIRE-MAKING MACHINE

Application filed March 16, 1923, Serial No. 625,633. Renewed May 2, 1929.

This invention relates to machines for making tires of the pneumatic type, such as are in general use on motor vehicles, and which ordinarily consist of an inner tube to be inflated, and an outer shoe or casing which encloses and protects the inner tube. In such tires, the shoe carries the wearing surface, sustains the load and must withstand the pressure of the air contained in the inner tube. It will accordingly be seen that, while the shoe must be capable of a certain amount of flexure so as to yield in accordance with the irregularities of the surface over which the vehicle is passing, it must at the same time be strong and firm though never rigid. With such requirements, the shoe is best of built-up construction so as to consist of a number of layers of reinforcing material enclosed within the resilient covering which forms the tread. The reinforcing material commonly used consists either of fabric, usually cotton, or else of cotton cords which are laid side by side to form as many layers as may be desired.

When a shoe built up as briefly described is positioned on the vehicle wheel, it will be obvious that as the vehicle moves along the ground, the tire will be bent or flexed at the point where the tread makes contact, this bending or flexure being produced in part by the weight of the vehicle which has a tendency to flatten the tire as well as by reason of roadway irregularities, and such movement of the casing wall which causes a change in contour, will in turn have a tendency to cause movements of the reinforcing elements, relative to each other. This is particularly true in the fabric tire in which the fabric layers consist of interwoven strands, but is also true to a somewhat less extent in the case of the cord type. Obviously such internal displacement of the reinforcing members within the shoe causes chafing, rubbing and weakening of the strands together with the production of heat which causes over vulcanization of the rubber and deterioration in general, shortening the life of the tire and inviting blow-outs and other difficulties.

In building a cord tire it is desirable to lay the cords with even and equal tension so that all cords throughout the shoe carcass may share equally in withstanding the internal air pressure. Such equality of tension not only attains this result, but it produces another desirable result in that it prevents the cords yielding or stretching unequally under stress, with accompanying movement relative to one another. If not the cords may be so laid as to be maintained under equal and even tension throughout at all times, and if the tension is such as to stretch the cord, the result will be theoretically the best cord construction, since under such conditions the internal friction will be reduced to a minimum.

Another difficulty incidental to tire manufacture results from the contour of the surface upon which the reinforcing material is to be placed. As will be understood the casing or shoe is ordinarily similar to a horseshoe in cross-section and the reinforcing material extends from one edge over the tread of the shoe to the other edge. Since the peripheral diameter of the shoe is greater than the diameter at its inner edges, a layer of material which will cover the tread smoothly will be in excess of the amount required at the edges. In the case of fabric tires this makes it necessary to cut the fabric on the bias, whereupon the material may be stretched to cover the surface. It occasionally happens, however, that even in using this method there results slight excess of material at the edges, so that there is a tendency for wrinkles to be formed. In the case of cord tires, if the cords be laid side by side, so as to make a tight layer at the edges of the shoe, these cords will not, under ordinary circumstances, completely cover the tread, and it is equally undesirable to have wrinkles in the fabric, as it is to have a structure in which there are gaps in the reinforcing layers, as would result in the second case.

Furthermore, in the laying of the cords about the core or mandrel which is to give form to the finished shoe, it is necessary, in maintaining an even tension on the cords, that they pass in a straight line from one edge or bead of the shoe across the tread to the other bead, or in other words, the cords must be laid so that the axis will always lie in a plane which cuts the shoe, preferably at an angle. If the cords may be so laid, under an equal tension, and in such a manner as to completely cover the core or mandrel without lapping or gapping, then it follows that there will be an equal distribution of the stress, each cord element taking its share of the load, and further the tension will be maintained. In addition to this, with the axis of the cord elements in a plane, then the core will be entirely covered, with a minimum expenditure of cord material.

One object of the invention is to provide a new and improved cord-tire making machine in which the reinforcing cords are laid under equal and unvarying tension.

Another object of this invention is to provide a new and improved automatic tire-making machine in which the cords are laid under equal tension, and in such a way that the surface will be completely and smoothly covered without overlapping or gapping.

A further object of this invention is to provide a new and improved automatic tire-making machine which will lay the cords under equal and unvarying tension to form a smooth layer completely covering the shoe surface, and in which the cords may be laid singly or in pluralities.

A further object is to provide a new and improved automatic machine for cord-tire making in which the cords are laid evenly so as completely to cover the shoe surface, and by which the cords may be laid simultaneously at a number of points about the periphery of the shoe.

A further object is to provide a new and improved automatic machine for cord-tire making in which the cords are laid so that their axis will lie in a plane, this effecting a saving of material and insuring even tension throughout the length of the cord.

A further object is to provide a new and improved automatic machine for cord-tire making in which the core or mandrel will be covered completely with a minimum expenditure of reinforcing material, and so as to eliminate any excess of such material at any point.

A further object of the invention is to provide new and improved means for covering the individual cords before laying them with a coating of unvulcanized rubber, whether said cords are laid singly or in pluralities.

A further object is to so cover or coat the cords and the cord units with a sheath of unvulcanized rubber that the heretofore required operations of covering the core or mandrel and the layers of laid cord with unvulcanized rubber are eliminated.

A further object is to feed and maintain the individual cords under equal tension while they are being covered with unvulcanized rubber, whereby the cords and the cord units will be evenly and uniformly covered, and relative local strains or stresses between the cords constituting a cord unit eliminated.

A further object is to provide a new and improved automatic machine for cord tire making by which the cord reinforcing elements may be laid so that the tension in each cord may be the same throughout its length, the cord elements passing from bead to bead so that the axes will lie in a plane, and further with uniform tension throughout all the cord elements, the core or mandrel at the same time being completely covered without excess of material at any point.

A further object of this invention is to provide a new and improved machine by which a plurality of cords maintained independently under uniform tension may be combined into a single unit, means being provided by which such units may be laid about the core or mandrel while maintaining the tension.

A further object of this invention is to provide a new and improved machine by which a plurality of cords maintained independently under uniform tension may be combined into a single unit, means being provided by which such units may be laid about the core or mandrel, with the axis of the unit always lying in a plane, and the tension being maintained throughout.

A further object is to provide a new and improved machine for cord-tire making including means by which a plurality of cords lying in a single plane and maintained independently at a uniform tension may be combined into a single tensioned unit and means by which this unit may be so distorted as to compensate for the progressive change in area of the core surface which is to be covered by single units.

A further object is to provide a new and improved cord tire making machine in which a plurality of independently and uniformly tensioned cords lying in a single plane may be combined into a unit to be laid upon the core or mandrel, the unit being so formed during the combining process as to compensate for the variable area of the surface of the core to be covered, means being provided to maintain the unit under tension until the laying is completed.

A further object is to provide a new and improved cord tire making machine in which a plurality of cords under independent and uniform tension, may be served to laying devices in composite units, each unit being composed of cords so distorted in contour as to give the unit a form of variable area throughout its length, the variations in area compensating for the variable area of the core to be covered by such units, and the tension on such cords being maintained throughout the distorting and laying processes.

A further object of the invention is to provide a new and improved machine by which a core or mandrel may be covered with a layer of angularly disposed cords combined into units maintained at a uniform tension, the cords being so dimensionally distorted in different planes and disposed as to compensate for the variation in area of the proportional part of such core to be covered by individual cords.

A further object of the invention is to provide a new and improved machine by which a core or mandrel may be covered with a layer of angularly disposed cords combined into units under uniform tension, such units being so distorted as to compensate for the variations in area of the surface to be covered by each individual unit, and each unit being laid so that its axis is in a plane, whereby the total working stress will be equally distributed throughout all the units and throughout the individual members forming each unit.

A further object of the invention is to provide new and improved means for indicating to the operator the position of any part of the laid cord with respect to the cord laying mechanism.

A further object of the invention is to provide new and improved mechanism for adapting or adjusting the machine for producing different sized tires.

A further object of the invention is to provide new and improved stop mechanism for a machine of the above character.

A further object of the invention is to provide in a machine of the above character, means whereby the cord will be laid under and over the bead of the tire carcass.

A further object of the invention is to provide a new and improved cord laying machine, possessing the above attributes, comprising a unitary structure in which the cord feeding, core covering, cord or strip moulding, severing, and cord unit laying mechanisms are so nicely and exactly coordinated that the machine will operate continuously without individual or relative adjustments of parts for given sizes of tire carcasses, and whereby there is required a minimum of care and attention on the part of the operator.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings, wherein I have shown a preferred form of embodiment of my invention:

Figure 3 is a front elevational view, the upper part being partly in vertical section, on the line 3—3 of Fig. 1, parts of the mechanism being broken away better to illustrate the construction.

Figure 4 is a vertical sectional view taken lengthwise of the machine substantially on the line 4—4 of Fig. 2.

Figure 5 is a sectional view taken substantially on the line 5—5 of Fig. 2, showing a portion of the cord laying mechanism in plan.

Figure 6 is a top plan view, partly in section, showing the cord supply and cord feed mechanism.

Figure 7 is a horizontal sectional view taken on line 7—7 of Fig. 6, through a portion of one of the supply reels and its support showing the friction device employed therein to prevent free rotation of the feed rolls.

Figure 9 is a vertical sectional view taken on the line 9—9 of Fig. 8.

Figure 10 is a similar view taken on the line 10—10 of Fig. 8.

Figure 11 is a vertical sectional view taken on the line 11—11 of Fig. 8.

Figure 12 is a rear end view of the end of the die mechanism into which the cords are fed.

Figure 13 is an elevational view of the die mechanism taken from the righthand side, parts being broken away.

Figure 14 is a plan view of the die mechanism, the cover plate being partly broken away to show the operation of the side die members or restrictors.

Figure 15 is a vertical sectional view taken transversely through the die mechanism, the view being taken on line 15—15 of Fig. 13.

Figure 16 is a similar view taken on the line 16—16 of Fig. 13.

Figure 17 is a plan view showing a portion of a molded cord strip.

Figure 18 is a plan view of a complete severed cord unit.

Figure 19 is a vertical sectional view taken through one of the cord units on the line 19—19 of Fig. 18.

Figure 20 is a similar view taken on line 20—20 of Fig. 18.

Figure 21 is a similar view taken on the line 21—21 of Fig. 18.

Figure 22 is a top plan view of the mechanism for severing the cord units from the body of the strip.

Figure 23 is a side elevational view of said strip severing mechanism.

Figure 24 is a vertical sectional view showing the details of the severing mechanism, said view being taken substantially on line 24—24 of Fig. 23.

Figure 25 is a side elevational view, partly in section, of the feed mechanism and transfer mechanism, showing the means for operating the latter.

Figure 26 is an end elevational view of the feed mechanism, showing the means for clamping the cord strip to draw the same through the machine.

Figure 27 is a horizontal sectional view, taken on the line 27—27 of Fig. 25, looking in the direction of the arrows, showing the means for operating the feed clamp.

Figure 28 is a horizontal sectional view taken on the line 28—28 of Fig. 26, looking in the direction of the arrows, showing the construction of the slide of the strip unit feed clamp.

Figure 29 is an end view of part of the strip unit transfer mechanism, partly in section.

Figure 30 is a vertical sectional view taken through the core or mandrel and associated mechanism.

Figure 31 is a horizontal sectional view taken on the line 31—31 of Fig. 30, looking in the direction of the arrows.

Figure 32 is an elevational view, partly in section, of the cord or strip laying mechanism, showing a cord unit held in position to be laid upon the core or mandrel.

Figure 33 is a vertical sectional view taken on line 33—33 of Fig. 32, looking in the direction of the arrows, showing the relation of the parts of one of the cord laying units when the latter is in its uppermost and open position.

Figure 34 is an elevational view partly in section, showing the position of the parts of one of the cord laying units in its lowermost closed position.

Figure 35 is a similar view of the cord laying mechanism with the clamp in its lowermost position, showing the cord released.

Figure 36 is a view similar to Figs. 34 and 35, showing the relation of the parts when the jaws of the laying mechanism are in full open position, just prior to the return of the laying arm to its normal or uppermost position.

Figure 37 is a plan view, partly in section, showing the wiper mechanism employed in making the first lay.

Figure 38 is an elevational view, partly in section, of the stop mechanism for the entire machine.

Figure 39 is a vertical sectional view, substantially on the line 39—39 of Fig. 38.

Figure 40 is a side elevational view of one of the cord unit laying mechanisms adapted for the second lay with the parts in their uppermost position.

Figure 41 is a top plan view of the mechanism shown in Fig. 40.

Figure 42 is an elevational view of the cord unit laying mechanism adapted for the second lay and presser arm, showing the parts in their position ready to ascend after laying the second layer of cord units.

Figure 43 is a vertical sectional view taken through a portion of the core or mandrel, showing two layers of cord strips positioned thereon.

Figure 44 is a vertical sectional view taken through the cord or mandrel, showing the complete carcass laid thereon.

Figure 44A is an elevational view of a portion of the wiping mechanism.

Figure 45 is a front elevational view of the tucker mechanism employed in the making of the second lay.

Figure 46 is a side elevational view of said tucker mechanism; and

Figure 47 is an elevational view showing a detail of construction of the tucker mechanism.

General description

Figure 1:
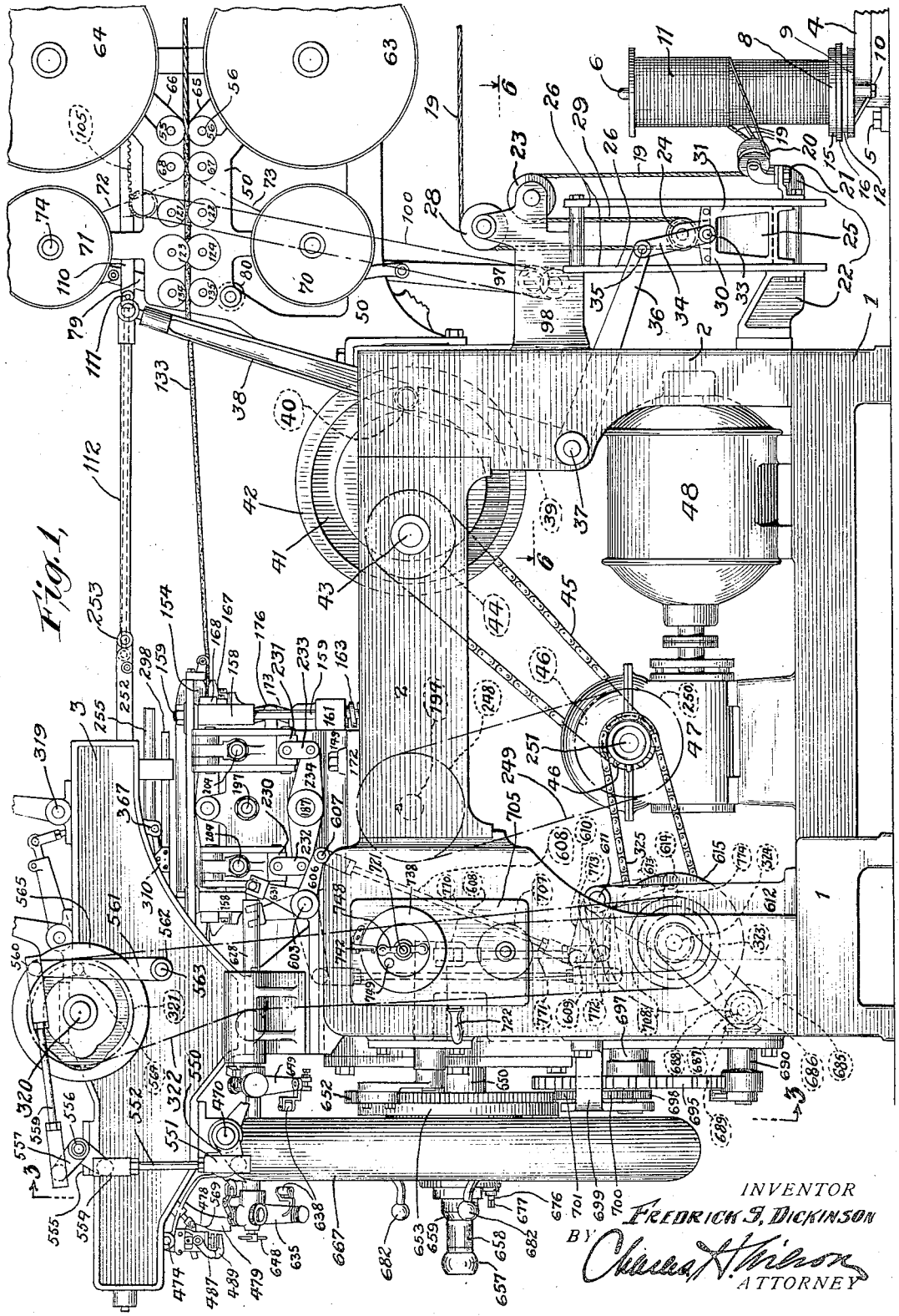
Figure 1 is a side elevational view of my improved machine, looking from the righthand side.

In order that the detailed structure of the machine, and the operation of the various parts may be better understood, a brief statement will be made as to the broad functions of the machine and the methods by which such functions are carried out.

Cords which are to be laid about a suitable mandrel, are drawn into the machines from bobbins, or other packages. These cords are independently maintained at a uniform tension, and from the tensioning devices pass to mechanism for covering them individually and collectively with a coating of unvulcanized rubber, whence they pass to a strip forming mechanism, by means of which a plurality of cords is combined into a single strip, the cords being so distorted during the combining process as to give the strip variable width and thickness along its length.

From the die mechanism the strip is advanced by a feed grip, which draws a length of the strip forward against the resistance of the tensioning means. When the feed grip reaches the end of its stroke, a transfer arm seizes the strip at two points, and the length of strip so held is severed from the main body, the jaws of the transfer arm continuing to maintain the tension on the cords of the strip. This severed length of the strip is herein termed "cord unit." The transfer arm then rotates through an arc coming to rest so that the ends of the cord unit projecting beyond the jaws of the arm are within the jaws of a laying mechanism which seizes the ends of the cord unit. Thereupon the jaws of the transfer arm are released, and the laying mechanism, continuing to maintain tension on the cord unit, descends relatively to the tire mandrel, one end of the cord unit being positioned on either side of the mandrel, and the axis of the cord unit being disposed angularly of the axis of the annular mandrel. During the descent of the laying mechanism, the ends of the cord unit are moved inwardly toward the surface of the mandrel, and at the end of the downward stroke of the laying mechanism, the ends of the cord unit are released from the jaws and wiped against the surface of the mandrel. The mandrel is then advanced so as to position a new area under the laying means which is ascending to its original position. The various operations so described make up a cycle and these cycles of operation are continued until the entire surface of the mandrel is covered with a layer of strips of cords positioned side by side in lateral abutting relation.

The machine disclosed in the present application is especially adapted to carry out the methods and produce the tire carcasses disclosed in my pending applications Serial Numbers 342,974, filed December 6th, 1919, 339,272, filed November 20th, 1919 and my Letters Patent Nos. 1,454,469 issued May 8th, 1923 and 1,453,865 issued May 1st, 1923.

*Rear cord feed*

With reference now to the drawings in which similar reference characters refer to similar parts throughout the several views thereof, the reference character 1 designates a suitable base, upon which is mounted a main supporting frame 2, having bolted together side and end walls, upon which frame is mounted a superstructure frame 3, the latter supporting the driving, timing, and controlling mechanism for certain parts of the machine.

Positioned at the rear of the machine is a support 4, which latter support may be mounted upon the floor at the rear of the machine as shown, and secured there as by means of the bolts 5, or if desired, it may be carried upon the frame of the machine as by means of a suitable bracket. This support 4 is provided with a plurality of upstanding spindles 6, the lower ends 7 of which are shouldered as at 8, and are received in sockets 9 formed in the support 4, suitable nuts 10 threaded upon the lower ends 7 of the spindles, maintaining the shoulders 8 against the upper surface of the support 4, whereby the spindles 6 are rigidly supported in their several positions.

Mounted upon the spindles 6 are the spools 11, the latter carrying the cord which is later to be laid upon the core or mandrel. In the present instance five spools are mounted upon the support 4, so that a corresponding number of cords will later be united and formed into the cord units which are to be laid upon the core or mandrel.

It should be understood that the cord has previously been impregnated with a solution of rubber in a suitable volatile solvent, the solvent being of course driven off, so that the cords are sticky and will readily unite by cohesion to the unvulcanized rubber with which they are to be sheathed.

Interposed between the spools 11 and the support 4, there is provided a friction drag, or brake, the purpose of which is to provide for such resistance to the withdrawal of the cord from the spools, that the spools will not overrun during the withdrawal of the cords therefrom. This friction drag comprises a circular plate 12, mounted upon the support 4, and held against rotation by means of a pin 13 entering a recess 14 form in the support 4.

Interposed between the flange 15 of each of the spools 11 and the plates 12 are plates 16, these plates having frictional engagement with the plates 12, sufficient to provide a friction drag upon the spools as the cords are drawn therefrom. A driving connection is established between the friction plate 16 and the spool flanges 15, by means of spring fingers 17, which engage abutments 18, provided upon the flanges of the spools.

The cords 19 are led from the bobbins 11 to the rotatively mounted sheaves 20, which are carried upon the swivels 21, mounted upon the bracket arm 22, extending rearwardly from the end wall of the frame 2 and bolted thereto. From the sheaves 20 the cords pass upwardly over the rotatively mounted sheaves 23, whence they pass downwardly over the sheaves 24. Each of the sheaves 24 supports a weight 25, said weights being mounted for free vertical movement in a frame 26, channel members 27 entering vertically disposed recesses in the weights to guide them in their vertical movements. The cords 19 pass upwardly from the sheaves 24, over the idler rolls or sheaves 28.

Referring to Fig. 1 of the drawings, it will be noted that when the weights are in their down position as shown, there is a loop 29 formed in each cord between the sheaves 23 and the sheaves 28. These loops when the cords are drawn through the machine by mechanism hereinafter to be described, provide for a sufficient amount of cord to form one cord unit length, that is to say, when the cord is drawn through the machine, the lifting of the weights by the tension exerted upon the cords shortens the loop, thereby providing for a feed of the cord while the spools remain stationary. When the aforesaid feed of the cord has been made the weights are forced downwardly by positively actuated means, while the forward ends of the cords are clamped against retrograde movement whereby a sufficient amount of cord is withdrawn from the spools again to form loops 29, whereupon the cord is ready for another feeding operation. The weights provided for each of the cord loops are equal, so that during the feed of the cord through the machine, equal tension will be maintained upon all of the cords.

The mechanism for forcing the weights downwardly after a strip length of cord has been drawn through the machine will now be described.

This means comprises a skeleton box-like structure having end pieces 30, which slide in the channel bars 31, which form a part of the frame 26, and which are guided thereby. Rods 32 rigidly connecting the side pieces 30 are disposed immediately above the weights 25 and at opposite ends thereof so that when the rods 32 are forced downwardly they will engage with the upper surfaces of the weights and force them downwardly, whereby the cord will be withdrawn from the spools as heretofore described to form the loops 29.

Pivotally connected with the side pieces 31 at 33, are links 34, which links at their opposite ends are connected at 35 with the arms 36 fast upon the rock shaft 37 extending transversely of the frame 2 and journalled in the side walls thereof. Rock shaft 37 is actuated by a lever 38, the lower end 39 of which is made fast to the rockshaft. Lever 38 intermediate its length is provided with a follower 40, which rides in the groove 41 of a box cam 42, the latter being mounted upon the shaft 43 driven by a sprocket 44 and a chain 45 from the sprocket 46 of a reducing gear mechanism 47. This reducing gear mechanism which may be of any approved type is driven by the motor 48 supported by the base 1 of the machine. It will be seen that each revolution of the cam 42 will cause the arms 36 to complete an upward and downward cycle of movement, whereby the weights 25 are permitted to move upwardly under the pull of the cords to supply cord to the machine and are forced downwardly to provide a fresh supply of cord from the bobbins or spools 11 as has already been described.

This cord feeding mechanism above described which may be termed the "rear cord feed" it will be observed is intermittent and this intermittent feed is maintained throughout the whole machine and it will be further observed that the cords are individually and equally tensioned by freely hanging weights which apply equal stresses to all of the cords.

Having described the construction and operation of this rear cord feeding mechanism the means employed to sheathe each cord with a layer of unvulcanized rubber and to form all of the individually sheathed cords into a collectively sheathed strip will now be described.

*Cord sheathing and strip forming*

Referring now to this part of the machine, the mechanism is supported upon a bracket 50 formed by spaced castings bolted to the frame 2 at its rear upper end. After the cords leave the sheaves 28, they pass over the idler guide sheaves 51 supported upon the brackets 52 and 53 respectively between an opposed pair of guide rolls 54 and 55 respectively, preferably spaced slightly apart. The guide roll 54 is journalled at 56 between sub-brackets 57 bolted to the bracket 50, and the guide roll 55 is carried by and between arms 58 pivotally mounted upon the plates 59 bolted to the bracket 50. The roll 55 is spring pressed in a downward direction by spring means 60 although its downward movement is preferably limited by means hereinafter described.

The reference numerals 61 and 62 respectively, designate supply rolls of unvulcanized rubber in sheet form, the sheet of rubber in each roll being covered upon one side by a strip of textile material which may be termed a "liner". The liners keep the convolute layers of the unvulcanized rubber out of contact with each other and form a medium by means of which the strips of unvulcanized rubber may be drawn or stripped from their respective rolls. These rolls of unvulcanized rubber and their liners are carried by the demountable spools 63 and 64 respectively. The strips of unvulcanized rubber and their liners are designated by the reference characters 65 and 66. These composite strips 65 and 66 are lead by the guide rolls 54 and 55 into position to be forcibly engaged by the opposed rolls 67 and 68 and pressed thereby into contact with the cords, it being understood that the composite strip is so constructed and arranged that the strip of unvulcanized rubber will be pressed against the cords which are being guided therebetween by the guide rolls 54 and 55 respectively, the liners engaging the rolls 67 and 68 and serving as a means for keeping the unvulcanized rubber out of direct contact with the rolls.

Referring now to Fig. 10, it will be seen that the rolls 67 and 68 are grooved rolls, there being provided in each opposed roll a relatively shallow channel for each cord, the grooves for each being located in opposed disposition. The flanges 69 defining the channels of the opposed rolls are of such height that during the progress of the material between them the pressure exerted will only slightly engage the opposed unvulcanized rubber strip with the cords. It should be observed that the liners must now be stripped from their accompanying strips of unvulcanized rubber.

The next described mechanism performs this function and strips the liners from their strips of unvulcanized rubber and is so designed that in its operation, it does not interfere with or disturb the even tension of the individual cords.

In a commercially operating machine such as the present, it is essential that spools or rolls of unvulcanized rubber be supplied, at will, to replace exhausted supplies and it is quite essential that this supply of unvulcanized rubber sheathing be applied to the cords, without regard to the length of the rubber strip upon any fresh roll, or whether one or another of the supply rolls requires replacing by a fresh roll and, as already stated, it is essential that the take up mechanism for the liners be so constructed that no strain is put upon the cords such as would disturb their even tension.

I have, therefore, provided a pair of take-up mechanisms so constructed that the used liner strips are taken care of in a very simple yet efficient manner. This take up means for the liners comprises a pair of take up or accumulating rolls or spools 70 and 71, suitably journalled in the bracket 50, the lower spool 70 taking care of the lowermost liner strip and the upper one 71 taking care of the uppermost liner strip, both of said liner strips having, as above described, been pressed slightly inwardly by the coacting rolls 67 and 68 to effect an engagement between the rubberized cords and the unvulcanized rubber strips.

These spools 70 and 71 pull the liner strips 72 and 73 from their respective strips of unvulcanized rubber, which operation leaves the upper surfaces of said unvulcanized rubber strips exposed, ready for further operations. Inasmuch as the cords, as above described, are fed intermittently through the machine, and inasmuch as it is essential to provide a variable intermittent feed for the spools 70 and 71, due to the fact that the used liner strips will not evenly accumulate upon the take-up spools, means are provided whereby the spools 70 and 71 will be intermittently driven at varying speeds, the speed of each spool being automatically determined by the quantity of the accumulated used liner upon the spools.

Figure 8:
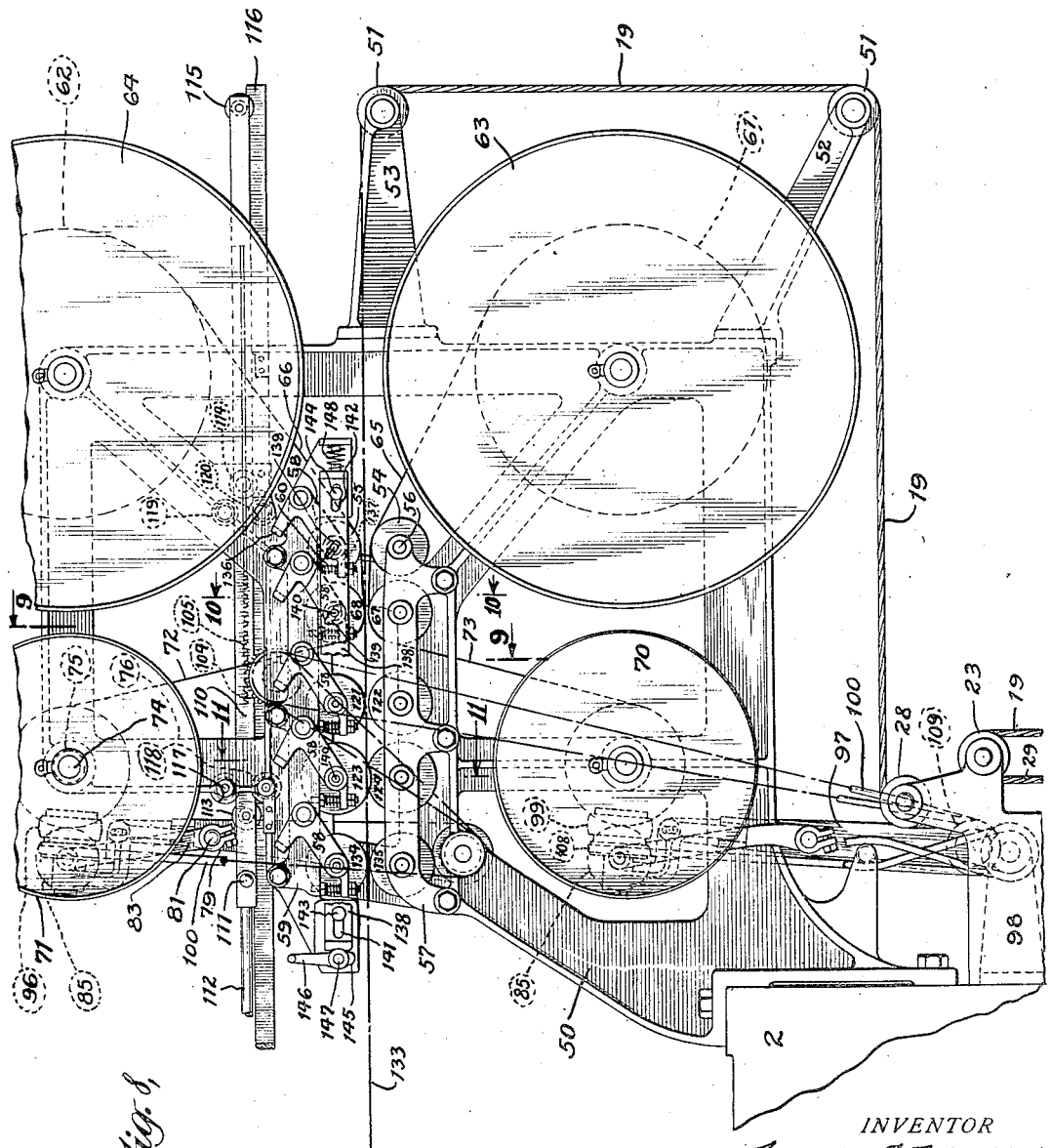
Figure 8 is an elevational view of the righthand side of the machine at its rear end, showing the means for covering the cords.

This mechanism is best illustrated in Figs. 8 and 9 of the drawings, and inasmuch as the means for driving the upper and lower take-up spools are substantially identical, but one of them need be described in order to impart a clear understanding of this feature of construction. In Fig. 9 there is illustrated the mechanism for varying the speed of rotation of the upper take-up spool 71, and this means will now be described.

The spool 71 is mounted upon a shaft 74 (Fig. 8), which shaft is journalled in a suitable bearing 75 carried upon an upright 76 formed upon the casting or bracket 50. The take-up spool 71 is fixed to one end of the shaft, and upon the opposite end of said shaft is carried a friction disc 77 upon the outer face 78 of which is provided a friction surface.

The reference numeral 79 designates an arm mounted upon a circular stud or boss 80 carried by the upright 76. This arm extends upwardly, and adjacent its upper end is provided with a laterally extending rod 81, bolted thereto as at 82. The outer end of rod 81 has clamped thereto an upwardly extending arm 83, the upper end of the latter being forked, as at 84, shown in the dotted lines of Fig. 9, and between the fingers of the fork is journalled a roller 85. In Fig. 9 this roller 85 is shown as located behind the hub of the spool 71, and this roller is urged in the direction of the hub of the spool by means of a spring 86, mounted upon the boss 80, one end of which engages with a post 87 formed upon the arm 79, the opposite end of the spring engaging with a post 88 formed upon the upright 76. Thus it will be seen that as the used up liner strip accumulates upon the hub of the spool 71, the arm 73 will be swung outwardly, thereby causing the arm 79 to swing in a corresponding direction; that is to say, in a direction away from the centre of the friction surface 78 of the disc 77.

The upper end of the arm 79 has pivotally mounted thereon at 89 an arm 90, provided with a downwardly projecting lug 91, through which extends an adjusting screw 92, between the inner end of which, and a socket 93, formed in the arm 79, is provided a coil spring 94. The upper end of the arm 90 has journalled thereon at 95 a friction disc 96, which by means of the spring 94 and the arm 90 is forced resiliently into engagement with the friction surface 78 of the disc 77.

It will, therefore, be seen that the friction disc 96, suitably driven by means about to be described, contacting with the friction surface 78, and moved laterally by the engagement of the roller 85 with the accumulated liner strip upon the spool 71, and its associated mechanism above described, will compel a variable speed of rotation of the spool 71, which speed of rotation will be retarded in proportion to the quantity of liner strip accumulating upon the spool 71.

By reference to Fig. 8 of the drawings it will be seen that the mechanism just described for operating the spool 71 is substantially duplicated for the lower spool 70, said mechanism for driving the lower spool being carried upon the swinging lever 97, journalled upon a bracket 98, mounted upon the frame 2. This mechanism is provided with a driving friction disc 99, shown in dotted lines (Fig. 8).

The friction driving discs 96 and 99 are driven by a single belt 100, the intermediate portion of which passes over the grooved pulley 101, mounted upon a shaft 102, which shaft is journalled in a suitable bearing 103 carried upon the upright 76. This shaft carries the driving gear wheel 104, with which meshes the longitudinally reciprocating rack bar 105. The gear wheel 104 is loosely mounted upon its shaft, but is adapted to be locked to the shaft by means of a ball pawl 106, which is located in a pocket 107, formed within the gear wheel 104, the construction being such that when the rack bar 105 moves rearwardly, the gear wheel 104 is free to rotate upon its shaft. When the rack 105 moves forwardly, a driving connection is established by means of the ball pawl 106, between the gear wheel 104 and its shaft, whereby the pulley 101 will be rotated, compelling such movement of the belt 100 as will drive the friction discs 96 and 99 in their proper directions, to cause corresponding variable rotative movement of the take-up spools 70 and 71.

The direction of movement of the belt 100 is indicated by the arrows, and it will be noted by reference to Fig. 9, that the belt in passing to the pulley 108 of the shaft of the friction disc 99, passes downwardly over an idler pulley 109 carried by the arm 97, and swinging with it, this construction insuring at all times an even tension of the belt.

The rack bar 105 is carried upon the rail 110, the forward end of which is pivotally connected at 111 with the link 112, which link is actuated by the main feed arm 38. The rail 110 is provided at its front, rear and intermediate portions with grooved rollers 113, 114 and 115, which ride upon a supporting rail 116, suitably carried in the bracket or casting 50. Suitably spaced grooved guide rolls 117—118 and 119—120 journalled upon bosses formed upon parts of bracket 50, also engage with the rail 110, assist in guiding it in a true horizontal reciprocatory movement.

Thus it will be seen that the intermittent rear feed of the cords, and the feed of the strips of unvulcanized rubber, and their liner strips, and the speed of the take-up or accumulating rolls or spools for the used liner strips are co-ordinated, all the mechanisms being driven or actuated by the main feed arm 38, which is actuated by the cam 42.

Referring now to Fig. 8, the cords interposed, as above described, between the strips of unvulcanized rubber, when the assembly passes from between the opposed rollers 67 and 68, it passes between a pair of peripherally grooved guide rollers 121 and 122, after which said assembly is received between a pair of forming rollers 123 and 124, each of which is provided with opposed grooved peripheral surfaces, as shown in Fig. 11. The opposed flanges 125 and 126 of the opposed rollers are of such height, as to provide grooves of sufficient depth, to cause the opposed overlying and underlying strips 127 and 128 to be forced entirely around the individual cords, the portions of said overlying and underlying strips of unvulcanized rubber being forced together by the flanges of the rolls, the material where it touches uniting by cohesion, with the result that a unitary assembly is produced wherein all the cords, as well as the individual cords, are completely sheathed with a coating of unvulcanized rubber.

The grooved rollers 123 and 124 also act as trimmers, circular knives 129 and 130 co-operating with hardened surfaced cylindrically formed rolls 131 and 132 formed upon the roller 124, trimming off the lateral edges of the cohering unvulcanized rubber strip, whereby the assembly is formed of uniform width.

Thus the cords by the mechanism above described, have been individually sheathed with unvulcanized rubber and formed into a sheathed strip of uniform width and thickness. This assembly of cords sheathed in the unvulcanized rubber when referred to in the description of the operations to be performed thereon from this point until it is severed from the main body of the assembly will, for convenience of description, be referred to as the "cord strip". It is designated by the reference numeral 133. This cord strip after leaving the forming and trimming rolls 123 and 124, passes between the guide rolls 134 and 135 into forming or molding mechanism, presently to be described.

Before leaving the description of the above described mechanism, it may be observed that the upper rollers 55, 68, 121, 123 and 134 are journalled between pairs of pivotally mounted arms, similar to the arms 58, the supporting arms of each roller being connected as by means of a yoke 136, the extensile springs, such as 60, being provided for pressing the supporting arms of each roller in a downward direction, and the springs operating upon lugs 137 formed upon the arms. Thus all of the rollers of the upper set are spring-pressed downwardly against their mating rollers. In order that the upper set of rollers may be lifted bodily to facilitate the threading of the material through the machine, an endwise movable bar 138 is provided which bar is provided with a plurality of inclined slots 139, each slot receiving a pin 140 extended from the shaft of each roller. The bar 138 at its opposite ends is provided with the slots 141 and 142, which receive the pins 143 and 144 fixed upon the framework, the engagement of the slots with these pins compelling a true horizontal movement of the bar when the same is moved in an endwise direction, whereby the inclined slots 142, will lift all the rollers of the uppermost set in unison, so that they will be carried from their lower mating rolls, providing a space through which the cords and sheathing material may be readily inserted or threaded.

The bar 138 is moved endwise as by means of a cam projection 145 formed upon an operating lever 146, journalled in a part of the frame at 147, an extensile spring 148 normally holding the bar in the position shown in the drawings. It will be seen that when this lever 146 is swung into a horizontal position, the bar 138 will be moved rearwardly, and locked in that position by the dead centre position of the parts, and that when the bar is swung to the position shown in Fig. 8 of the drawings, the spring 148 will restore the bar to its normal position and permitting the mating rollers to assume their working position.

After the cord strip is pulled from between the guide rolls 134 and 135, which it will be noted by reference to Fig. 9, are also grooved to receive the cords and their sheathing of unvulcanized rubber, said cord strip is carried forwardly to the die mechanism, which will now be described. In this connection it may be noted that mechanism, presently to be described, is suitably actuated, whereby the forward end of the cord strip is grasped and pulled forwardly, the forward movement of the strip being actuated by the feed arm 38, such co-ordination of operation being had that the several mechanisms operate in unison automatically to perform their particular functions.

Cord strip molding

Referring now to the mechanism for molding the cord strip so as to give the same variable width and thickness along its length, so that the cord units when laid upon the mandrel will provide a layer of material which will smoothly cover the entire core or mandrel without lapping or gapping, and which mechanism for briefness of description will be called "die mechanism". This mechanism briefly described, consists of a relatively fixed upper platen across the face of which the cord strip passes, together with a lower movable platen, which is movable to force the cord strip against the fixed platen, so as to flatten it. There is also provided a pair of laterally moving co-acting die members, which move toward each other to cause a constriction in the length of the strip. The upper and lower relatively movable platens for clarity of description will hereinafter be termed "flattener dies", and the laterally moving dies will be termed "constrictor dies".

The die mechanism illustrated in Figures 1, and 12 to 16 inclusive is mounted upon and within a casting or housing 149, bolted at 150 and 151 upon the upper surfaces of the side walls 152 and 153 of the frame 2 of the machine. The flattener die 154 is provided at its opposite ends with the arms 155 and 156 which rest upon apertured brackets 157 and 158 formed integrally with the housing or casting 149. This flattener die is fastened into place by bolts 159 which extend downwardly through the apertured brackets 157 and 158, and through the lugs 160 and 161, integrally formed upon the casting or housing 149. Between the nuts 162 screwed upon the lower ends of the bolts, and the lugs 160 and 161, are strong coil springs 163. These springs are of sufficient strength to hold the flattener die 154 stationary against the action of the vertically movable flattener die 164 under the usual conditions of service but will permit such slight movement of the upper flattener die under unusual stress exerted upon it by the lower flattener die, should by chance some foreign object be accidentally carried between the dies by the cord strip. The upper flattener die is, therefore, securely anchored at its four corners in the housing. The lower flattener die 164 which is located directly beneath the upper flattener die 154, is suitably guided in a true vertical plane at each end by the guide members 165 and 166, which are adapted to engage the lateral sides thereof. These guide pieces are preferably formed of bronze to eliminate the necessity of employing a lubricant between them and the vertically movable die member. The lower flattener die 164 is prevented from endwise movement by the guide screws 167, which extend through the parts 168 of the casting or housing 149, and at their inner ends engage the bosses 169 formed upon the lower flattener die member. Thus this die member, while freely slidable in a vertical direction, is prevented from lateral or endwise displacement.

Journalled upon a shaft 170, carried in the upstanding apertured bosses 171, formed upon the bed plate 172 of the casting or housing 149, is a link 173 the upper end of which extends between the spaced links 174 and 175, to which the link 173 is journalled as by means of the shaft 176. The upper ends of the links 174 and 175 are journalled as by means of a shaft 177 upon opposite sides of a downwardly extending boss 178 formed upon the lower flattener die member 164. The link 173 and the links 174 and 175 constitute an actuating toggle for one end of the lower flattener die and the construction just described is, in all respects, duplicated at the opposite end of the lower flattener die, so that both ends of said die are actuated in unison by toggles which, when straightened, force the lower flattener die upwardly against that part of the cord strip interposed between it and the upper flattener die. These toggles it will be observed by reference to Fig. 13, when broken, have their links inclined rearwardly and in parallel relations so that they may be operated to straightened or broken positions by a single actuating means. This means in the present instance, comprises a pair of links, individually designated by the reference numerals 179 and 180, which are journalled at their rear ends upon the shaft 176, and upon their forward ends upon the shaft 181 which connects the toggle link 182 and the pair of links 183 which correspond to and operate in conjunction with the link 173 and the pair of links 174 and 175 which form the toggle to actuate the first described end of the lower flattener die.

The links 179 and 180 are joined intermediate their ends by a shaft 184 and between said links and upon the shaft 184 is journalled the upper end 185 of a lever 186 mounted upon a shaft 187 journalled in bearings formed in the inwardly extending bosses 188 formed upon the upstanding spaced side members 189 of the housing or casting 149. The opposite or lower end 190 of the lever 186 is provided with a roller follower 191 which rides in a cam groove 192 formed in a box cam 193 fixed upon a shaft 194. The groove of this box cam is so formed that lever 186 operates the links 179 and 180 to straighten or break the toggles whereby the lower flattener die will be operated in a manner hereinafter described.

The lower flattener die 164 aside from the guiding means illustrated at 167, 168 and 169, which also operates as an adjusting means, is restrained against endwise movement relative to the upper flattener die 154 by means of the tie links 195 and 196 which extend between the oppositely disposed screw threaded bosses, one of which is shown at 197 and the shaft 177.

Reference will now be had to the constrictor dies. These constrictor dies comprise plates 198 and 199, which ride or slide in contact with the working face of the upper flattener die 154 and in a direction normal or at right angles thereto.

The restrictor dies 198 and 199 are mounted upon the blocks 200 and 201 respectively, which ride upon the planed surfaces of the shoulders 202 and 203 formed upon the uprights 189 of the frame or casting 149. These constrictor dies are, like the flattener die 164 moved into and out of working positions by toggle mechanisms which are constructed and operated as follows: It should be noted, however, at this point that in the flattener die mechanism above described there is but a single operated active part while in the constrictor mechanism there are two die plates 198 and 199, operating in unison and in opposite directional relations. The mechanism for operating both constrictor die plates being similarly constructed but oppositely disposed it is thought that a description of the construction of one of said mechanisms will suffice to impart a clear understanding of this feature of the invention.

By reference to Fig. 14, it will be observed that both constrictor dies 198 and 199 are moved inwardly and outwardly simultaneously to perform their respective functions and inasmuch as in each operation a considerable portion of cord strip must be operated upon it, it is desirable that each of the constrictor dies be actuated from opposite ends in order to provide against straining of parts due to the considerable stresses necessarily imposed upon the operative parts. I shall now proceed to describe the mechanism, and the manner of its operation, of the constrictor dies, reference being had to the mechanism employed to operate the constrictor die upon the righthand side of the machine.

It should be noted that the supports of the constrictor die mechanism comprise the uprights 189, which owing to the reaction strains put upon them are tied together as by means of the tie rods, one of which is shown at 204, Fig. 15. It will be understood, of course, that the upright brackets 189 are similarly tied together at opposite ends.

Referring now to the righthand of the machine, it will be seen that there are bosses 205 and 206 provided upon the upright 189. Each of these bosses form pivotal supports at 207 for a pair of toggle links 208—209 and 210—211 which are connected by means of the pivot pins 212 and 213 with toggle links 214 and 215 respectively, the latter toggle links being pivotally connected by means of the pins 216 and 217 with the apertured ears or bosses 218 and 219 formed integrally with blocks 200 and 201 respectively. Thus it will be seen that a toggle is formed between the fixed parts of the frame 205 and 206 and the bosses or ears 218 and 219 at opposite ends of the die supporting block 200. The toggles for operating each constrictor die member are oppositely disposed, that is, they work in opposite directions when straightened and broken.

Extending outwardly from the upright side pieces 189 and disposed midway between their ends are the apertured integrally formed bosses 220 and 221. The apertures in these bosses are disposed normal or at right angles to the constrictor die members and receive the guide pins 222 and 223 whose inner reduced threaded portions 224 and 225 are received in threaded apertures formed in the blocks 200 and 201. This guiding means, it will be observed, prevents relative endwise movements of the constrictor die members. Each of the toggles just described is actuated by a pair of links 226—227 and 228—229, which engage with the ends of the pivot pins 212 and 213 respectively. The lower ends of each pair of links 226—227 and 228—229 are pivotally connected with the blocks 230 and 231, and the blocks 230 and 231 are pivotally connected by means of the pairs of spaced links 232 and 233 with opposite ends 235 of a rocker lever 234 mounted upon one end of the rock shaft 187 extending transversely of the die mechanism through the side members 189 of the frame 149 which provide bearings for said shaft 235. The opposite end of shaft 187 also carries a rocker lever 236, the ends of which are connected by mechanism constructed identically with that just described with the toggle mechanism for operating the oppositely disposed constrictor die 199.

Thus it will be seen that by the means just described each pair of toggles for each constrictor die is operated in opposite directions to move each die toward or from the other die and that said dies operate in unison in opposite directions.

The rocker arm 236 is provided, intermediate its ends, with a cam follower arm 237 having a roller follower 238 which rides in a cam groove 239 formed in a box cam 240 mounted upon the shaft 194 which is the same shaft that carries the cam 193 which operates the lower flattener die in the manner above described. The operations of the flattener dies and the constrictor dies are therefore co-ordinated by the cams 193 and 240 in a manner presently to be described.

The shaft 194 is supported and journalled in housings 241 and 242 carried by the plates 243 and 244 clamped to the casting 149, underneath the same by the clamp bolts 245 tapped into the supporting casting. Roller bearings 246 and 247 are provided in the housings 241 and 242 for the shaft 194. Splined to the shaft 193 is a sprocket wheel 248 which is driven by chain 249 from a sprocket wheel 250 mounted upon the shaft 251 of the reducing gear mechanism 47. This is the same shaft that carries the sprocket wheel 46 which drives the rear feed mechanism. Thus the die and rear cord feed mechanisms are co-ordinated.

As has already been explained, the cords which are used for the manufacture of the strip which is to reinforce the tire carcass, as above described, are suitably impregnated with rubber so that when the cords are compressed the fibres or strands of the cords will stick together. The cords, as shown in the drawings, are made with a hollow centre, and this is the preferable type of cord for this purpose. It is, however, possible to use loosely twisted solid cords, suitably impregnated, such cords lending themselves to distortion such as is necessary to form the cord strip.

By reference to Figs. 14 and 17 to 21 inclusive, it will be seen that the flattener dies and the constrictor dies are so formed that the cord strip will be compressed or distorted so that when the cord unit is severed from the cord strip it will have the contour illustrated in Figs. 18 to 21 inclusive.

With reference now to these figures, it will be noted that when the cords are compressed vertically at the point indicated by the line 19—19, where the cord unit has its maximum width and minimum thickness. At a point indicated by the line 20—20, at some distance from the point of maximum flattening, the cords are forced together so as to give the cord its minimum width and maximum thickness and it will be noted that at this point the cords are slightly beveled, for a purpose later to be described. Along the line 21—21 intermediate the points of maximum and minimum width the cords have their normal contour save that their former circular contour has been changed to substantially a square contour. At this point, however, they are not either vertically or horizontally distorted by the die mechanism. All of the portions of unvulcanized rubber between individual cords have been forced into contact with one another whereby they unite by cohesion and there is formed a compact cord strip, which will retain its form during the course of the forward feeding, severing, transferring and laying operations, to which following the moulding operation it will be subjected.

In the moulding of the cord strip it will be observed by reference to Fig. 14 that at each operation of the die mechanism there is formed the rear half of one cord unit and the forward half of the succeeding cord unit, it being understood that in the severing operation presently to be described, the cord strip is severed into cord units having their ends lying at suitable angles to the plane of the length of the cord strips as indicated by the line 20'—20', Figure 14.

The flattener and constrictor dies are preferably so co-ordinated by their operating cams that the lower flattener die is first operated to slightly compress the cord strip, whereupon the constrictor dies complete their constricting operation, the flattener dies then complete their operation. In moving the dies from the moulded or distorted cord strip the pressure exerted by the flattener dies is first slightly released, whereupon both the flattener dies and constrictor dies move simultaneously from the cords to the positions they assume before starting the next moulding operation. When both sets of dies are at their points of greatest separation, the next length of cord strip is pulled between them.

Furthermore, it should be noted that the forms of the flattener and constrictor dies and their relation to each other are such that when a cord unit is formed upon the cord strip the said cord unit will be so distorted as to compensate for the progressive change in the area of the mandrel surface which is to be completely covered, without lapping or gapping by a plurality of single cord units.

The forming mechanism, while remaining in operative position, will hold the cord strip against the pull of the floating weights 25, and the forming dies are not released from the cord strip until another part, which will be later described, has seized the end of the strip, whereupon the forming mechanism is released so as to permit the formed strip to be advanced such a distance as is necessary to introduce a new portion of the strip to be moulded.

Thus it will be seen that the forming dies act upon the cords while the latter are in their uniformly tensioned condition. This is an important factor in the operation of the machine because if the cords were not drawn into the forming mechanism while tensioned, a subsequent tensioning of the cord strip by the strip transferring means and the strip laying means presently to be described, would distort or change the contour of the strip from that given it by the forming mechanism just described.

*Cord strip feeding mechanism*

Reference now being had principally to Figures 1, 4, and 25 to 29 inclusive, wherein the cord strip feeding means is illustrated, the formed strip is advanced by means of a reciprocating slide provided with gripping jaws, the slide reciprocating in a direction parallel to the axis of the cord strip. This slide, which is indicated by the reference character 252, is operated by the feed arm 38 through the link 112 which has pivotal connection with the slide 252 at the point 253.

Slide 252 rides within a frame comprised by the spaced parallel rails 254 and 255 suitably supported in the brackets 256 and 257 which form a portion of a superstructure frame or casting mounted upon the forward end of the frame or casting 2. This superstructure casting supports various operative parts of the machine presently to be described. Slide 252 at its forward end is provided with a carriage 258 which carries two pairs of grooved rollers 259—260 and 261—262. These rollers ride upon the rails 254 and 255 during the reciprocating movements of the slide 252 which is also provided along its length with other grooved rollers 266 and 267 which ride upon the rail 255. The rollers 266 and 267 are mounted upon spaced brackets 268 and 269 depending from the rail. Thus it will be seen that the rail 252 is guided to move forwardly and rearwardly upon the rails 254 and 255 in a true horizontal line.

The carriage 258 is provided with a hanger 270 which depends therefrom, and is provided with a laterally extending bracket 271 which extends underneath the rail 255. The bracket 271 is provided with integrally-formed downwardly extending side members 272 and 273, which form guides for a slide 274 which carries one jaw 275 of the feed grip jaws, designated by the reference character 276, hereinafter designated as the "feed grip", the opposite jaw of which is indicated at 277. The slide 274, which carries the feed grip jaw 275, is provided with a vertically disposed recess having the worm threads 278 with which meshes the threads of a worm screw 279, the upper end of which is rotatably supported in the bracket 271. This worm screw adjacent its upper end, and immediately beneath the bracket 271, is provided with a pinion 280, which meshes with an auxiliary slide rack 281 mounted in the guides 282 and 283, carried upon the bracket 271, said auxiliary slide rack being held in position as by means of the gibs 284 and 285 fastened to the bracket. The rack slide 281 is provided with the rack teeth 286, which mesh with the gear pinion 280, the construction being such that when the rack 281 is moved longitudinally relative to the slide 252, it will compel a rotative movement of the gear pinion 280, and a corresponding rotative movement of the worm screw 279, whereby the slide 274, which carries the gripping jaw member 275, will be moved upwardly and downwardly to move the jaw 275 relatively to the opposed gripping jaw 277. The lower gripping jaw 277 is integrally formed upon the forward end of a bar 287, pivotally mounted upon the pivot screw 288 between the downwardly projecting ears 289 formed upon the side members 272 and 273 of the bracket 271. The rear end of this bar 287 is pivotally mounted at 290 to the lower end of links 291 whose upper ends are pivoted at 292 to a rearward extension 293 of the slide 274. Thus it will be seen that when the slide 274 is moved upwardly to raise the gripping jaw 275, the pivotal mounting 288 of the bar 287 being fixed, said bar will be swung upon its pivot by the upward movement of the links 291, which are as above described, connected to the rearward extension 293 of the slide 274. A downward movement of the slide 274 will compel a swinging movement of the bar 287 in an opposite direction. It will be, therefore, seen that the jaw members 275 and 277 of the feed grip 276 move in opposite directions in unison to grip or release the cord, as will hereinafter be described.

The jaws 275 and 277 are preferably provided with serrated teeth 294 to provide for a sure hold upon the cord strip, the forward end of which the feed grip is adapted to grasp to pull the cord strip forwardly.

Referring now particularly to Fig. 25, the brackets 256 and 257 are provided with downwardly extending lugs or bosses 295, and 296 and 297, which are apertured to receive the endwise movable rod 298. This rod at its forward end is provided with a downwardly extending arm 299 adjustably fixed thereon as at 300, and at its intermediate portion with an adjustably mounted downwardly extending arm 301. Arm 299 is provided with the adjustable screw stop 302, and the arm 301 is also provided with an adjustable screw stop 303, said screw stops lying in parallel relation, and their working ends being disposed in opposed relation. The ends of both of these screw stops lie in the path of an outwardly extending lug or abutment mounted upon the auxiliary rack bar 281, which rack bar it will be noted, being mounted upon a support carried by the carriage 258 of the rail 252, when said rail is moved forwardly or rearwardly, will be carried longitudinally of the machine, whereby when the abutment 304 in the rearward movement of the auxiliary rack encounters the end of the adjustable stop 303, the auxiliary rack bar 281 will be held stationary during a slight further rearward movement of the slide 252. When the slide 252 moves forwardly, the abutment 304 will encounter the adjustable stop 302, whereupon the auxiliary rack bar 281 will be held stationary during a slight forward movement of the rack bar. Inasmuch as the grip-feed jaw members 275 and 277 are carried forwardly and rearwardly by the carriage 258 of the slide 252, and have no relative longitudinal movement with respect to said slide, the arresting of the movement of the auxiliary slide 281 as above described, will rotate the gear pinion 280, causing the worm screw 270 to rotate, and thereby open and close the feed-grip jaws.

It is desirable, however, to quickly open and close the feed grip jaws, as it would be undesirable to have the slide 252 reciprocating longitudinally either forwardly or rearwardly during the gripping or releasing operation of the feed-grip jaws. This is accomplished by giving the rod 298, which carries the adjustable stops 302 and 303, a slight rearward movement when the slide 252 reaches the limit of its forward movement, and a slight forward movement when the slide 252 reaches the limit of its rearward movement. This is accomplished by means of a rocker lever 305 journalled upon the shaft 306, having its lower end connected at 307 to a link 308, which at its opposite end is pivotally connected at 309 with a bracket 310 mounted upon the rod 298, and fixed thereon. The upper end of the rocker lever 305 is connected at 311 with the adjustable link 312, said link at its opposite end being connected at 313 to one arm 314 of a bell-crank lever, the opposite end 315 of which is provided with a cam-follower 316, which traverses the cam groove of a box-cam 317. The bell-crank lever, designated 318, is mounted upon a rod or shaft 319, which extends transversely of the superstructure frame 3 of the machine. This box cam 317 is mounted upon a cam shaft 320, which also extends transversely of the machine and is mounted in suitable bearings formed in the end walls of the superstructure 3, said shaft carrying several cams illustrated in Fig. 2, which are employed to operate the various co-operating parts of the mechanism at the front end of the machine.

One end of the cam shaft 320 is provided with the sprocket wheel 321, which is driven by means of the chain 322 from a sprocket wheel 323 mounted upon a shaft 324, which shaft is provided with a sprocket wheel driven by means of a chain 325 which engages with a sprocket wheel 326 mounted upon the drive shaft 251 of the reducing gear mechanism 47. The timing of the box cam 317 is through the above described chain of mechanism so co-ordinated with the mechanism which operates the cord strip feed arm 38, that the rod 298 will be reciprocated slightly rearwardly and forwardly as above described when the slide 252 has reached the limit of its forward and rearward reciprocatory movement respectively.

In order that the feed slide 252 may be held against accidental displacement at the limit of its forward and rearward reciprocatory movement, which accidental displacement might be caused by the re-action of the parts employed to open and close the feed grip jaws, means is provided whereby the slide will be positively locked when it reaches such position. This means, in the present instance, comprises a pair of rollers 327 and 328 which are mounted upon the stud screws 329 and 330 which form bearings therefor. The stud screw 329 is mounted upon a plate 331 made fast to the slide 252 near its rear end, and the stud screw 330 is mounted upon an adjustable plate 332 positioned between the blocks 333 and 334, the latter being fixed upon the feed slide 252. Extending through these blocks, and engaging with the ends of the plate 332, are the adjusting screws 335 and 336, the ends of which are rotatably anchored in the ends of said plate, so that the latter is supported thereby. It will be seen that by means of the adjusting screws, the plate 332 may be moved slightly endwise in either direction upon the slide 252, whereby the roller 328 can be given a slight longitudinal adjustment.

Mounted upon a shaft 337 carried upon a bracket 338 of the superstructure 3 of the frame, is an arm 339, the outer end of which is provided with the arc-shaped, spaced locking members 340 and 341. Arm 339 is adapted to be swung to a position whereby said arc-shaped members 340 and 341 will engage with the rollers 337 and 338, which engagement will lock said feed lever 252 against endwise reciprocation when the latter reaches the limit of its forward or rearward movements. In Fig. 25 of the drawings the spaced locking members 340 and 341 are shown engaging the roller 327 with the feed slide at the limit of its forward movement. When the feed slide reaches the limit of its rearward movement the spaced lock members 340 and 341 will engage the roller 328 and lock the feed slide in that position. The arm 339 is operated by means of an arm 342 mounted upon the opposite end of the shaft 337, which arm is connected at 343 with an adjustable link 344, whose opposite end is connected at 345 to an arm 346 fixed upon the shaft 319, said shaft being also provided with an arm 347 provided with a cam follower 348, which follows a cam groove formed in a box-cam 349 mounted upon the shaft 320. This cam has its groove so formed that through the associated mechanism above described the arm 339 will be swung to carry the spaced locking members 340 and 341 into and out of engagement with the rollers 327 and 328 to lock the feed slides 252 against movement in either direction at timed intervals relative to the times of the opening and closing of the feed-grip jaws.

As has already been indicated, the free end of the cord strip is gripped by the feed grip 276 when the slide 252 has been moved to its rearward position, where the movement of the auxiliary feed rack 281, under the influence of the movable abutment 303, operates the mechanism to close the feed grip jaws, which jaws when clamped upon the cord strip are held in their gripping positions by the worm screw 279, which, in conjunction with the worm screws of the slide 274, acts as a locking means, that is to say, the pitch of the threads of the worm screw 279 is such that a re-action normal to the direction of the threads of the slide 274 will not have the effect of camming the worm screw into such rotative movement as would unlock or separate the feed-grip jaws from the cord strip gripped therebetween.

*Retainer mechanism*

At this point it may be noted that the cord strip in its position within the die mechanism is in the same horizontal and vertical plane in which lies the opening between the feed-grip jaws 275 and 277, so that when said feed grip is moved rearwardly by the means of the slide 252, the free end of the cord strip will pass between the jaws 275 and 277, whereupon said jaws may be clamped against the cord strip adjacent its outer end.

I have found it desirable, however, to provide means which will positively hold the free end of the cord strip in position to be engaged by the feed-grip jaws. This insures certainty of operation and prevents any sagging or other displacement of the free end of the cord strip which might prevent the feed-grip jaws from performing their functions. This means (Fig. 4) comprises a pair of plates 350 and 351 carried by the arms 352 and 353 mounted upon shafts 354 and 355 journalled in the bracket 356. These shafts 354 and 355 are provided with meshing pinions 357 and 358. The shaft 355 has mounted thereon an arm 359 whose outer end is connected at 360 with a link 361 connected at its opposite end by a ball and socket joint 362 with an arm 363 mounted upon a shaft 364, carrying an arm 365 provided with a cam follower 366 which traverses a cam groove in a cam 367 mounted upon the cam shaft 320. It will be seen that when the arm 359 is swung upwardly, the plate 351 carried by the arm 353 will be swung downwardly, and due to the pinion connection between the arms 352 and 353, the plate 350 will be swung simultaneously upwardly. The plates 350 and 351 are adapted to engage with the free end of the cord strip and hold it ready to be engaged by the feed grip jaws when the feed grip is moved to its rearward position. The cam mechanism controlling these plates, which I term "retainer plates" is so timed that the plates will separate at the proper interval of time to permit the feed-grip jaws to pass between them, so that the jaws may be engaged with the free end of the cord strip and be locked in such engagement. When the feed grip jaws move forwardly, the plates are again moved to engage with the cord strip and to hold the free end thereof in position to again be engaged by the feed grip at its next rearward operation.

I shall now proceed to describe the mechanism for severing the cord units from the cord strip. This mechanism becomes operative to sever the cord units from the cord strip when the feed grip has reached the limit of its forward movement, and has drawn a predetermined length of cord strip through the machine to provide a single cord unit length. Reference being had to Fig. 4 of the drawings, this severing mechanism is located immediately in front of the retainer plates 350 and 351 just above described, so that when a strip unit is severed from the cord strip, the free end of the main body of the cord strip will project slightly in front of the retainer plates 350 and 351.

It should be understood, however, that before a cord unit is severed from the main body of the cord strip, means are provided to grasp the ends of the cord unit about to be severed, hold the same under tension, remove the front end thereof from between the feed-grip jaws, and thereupon deliver the ends of severed cord unit to the cord laying mechanisms. This mechanism termed "transfer mechanism" herein, comprises a pair of oppositely disposed swinging arms, the ends of which are provided with gripping jaws. This transfer mechanism will be later described, it being merely necessary to understand at this point that when the work of the feed slide is completed, and before the jaws thereof have been released from the cord strip, a transfer arm mechanism moves into position to grasp the cord unit to be severed from the main body of the strip, whereupon the feed-grip is released from the strip, and the severing mechanism operates to separate the cord unit from the main body of the strip. It should also be noted that the knife or severing mechanism must actuate at such a time that the cord strip back of it is gripped by the forming or die mechanism, otherwise the cord strip would be unthreaded from the machine, due to the tension exerted upon it by the floating tension weights heretofore described.

Cord unit severing mechanism

Referring now to the knife mechanism, and particularly to Figs. 4, 22, 23 and 24, wherein Fig. 22 illustrates it in its position relative to the retainer means, said knife mechanism is designated in general by the reference character 368. It is carried upon a bracket 369, mounted upon a cross-bar 370, extending between the side walls of the frame and the machine. Provided upon the bracket 369 are the apertured bosses 371 and 372, in which are journalled the drive shaft 373. The bracket 369 has an integrally formed upstanding rib 374, which carries the apertured boss 375. The shaft 373 is provided with the spaced arms 376, which are pivotally connected as at 377 to a bar 378, whose rear end is journalled at 379 to the spaced links 380, the lower ends of said links being pivotally connected at 381 in the apertured boss 375. The arms 376 and that part of the link 380 between the pivotal points 379 and 381 are parallel, so that when the arms 376 are swung forwardly by the shaft 373, the bar 378 will be moved forwardly and upwardly. The forward end of the bar 378 is provided with a knife blade 382 which is adjustably mounted upon the bar as by means of the set screws 383. Mounted to slide transversely of the forward end of the bar 378 is a block 384 which is bifurcated to receive said bar, and depending from said block is a plunger rod 385, which enters a dash pot 386 supported upon the bracket 369. The plunger rod 385 is provided with a shoulder 387, which is engaged by the upper end of an extensile coil spring 388, whose lower end rests against the bottom wall 389 of the dash pot, the rod 385 extending through the aperture 390 formed in the lower wall of the dash pot, which forms a guiding means therefor, the upper end of said rod being guided by the circular walls of the dash pot. Thus it will be seen that the block 384 is urged to upward movement relative to the bar 378, the upward movement, however, being restrained by the bottom wall of the recess in the block 384 which engages with the lower edge of the bar 378.

Journalled at 391 between arm 392 carried by the bracket, is an arm 393, the outer end 394 of which is provided with a platen 395 formed of a relatively soft material, which when the arm 393 is in the position shown in Fig. 23 of the drawings, forms a resistance member with which the knife 382 coacts to sever the strip. This feature when the parts are in operative positions overlies the knife blade. The arm 393 is provided adjacent its rear end with the arc-shaped slot 396, which leads into an upwardly extending slot 397. The links 380 have the upwardly extending arms 398 which at their upper ends carry a cam roll 399 adapted to traverse the slots 396 and 397 of the arm 393.

A retractile spring 400 which is extended between a post 401 and a downward extension of the links 380, tends to move the parts into the position shown by the dotted lines in Fig. 23 of the drawings.

The block 384 is provided with a face plate 402, the face of which slightly overlies the edge of the knife blade 382, where the block 384 is forced upwardly by its plunger.

Mounted upon the outer end of the shaft 373 is a collar 403 provided with a crank comprised by the arms 404 and 405, the end of the latter member being provided with a ball 406 which forms a ball and socket joint with a socket 407 carried upon the lower end of a link 408, whose upper end is connected by a ball and socket joint 409 with an arm 410 of a lever 411 pivotally mounted upon a bearing 412 carried in the frame of the superstructure, the other arm 412 of said lever being provided with a cam roll 414 which traverses a cam groove formed in the box cam 415 mounted upon the cam shaft 320.

By reference to Figs. 5 and 22, it will be seen that the bracket 369 is supported upon the frame of the machine so that the knife blade 382 will be disposed at an angle of 45° to the strip, whereby in the severing operation the opposite severed ends of the cord unit lie in parallel relation and at suitable angles to the length of the cord units, as shown in Fig. 18. The purpose of this angular severance will be obvious when the laying operation is considered.

The operation of the parts of the knife mechanism thus described is as follows:—

Assuming the parts to be in the position shown in Fig. 4 of the drawings, with the strip clamped at points spaced apart a cord unit length between the clamping members of the transfer arm mechanism, the cam 415 through the connected chain of lever and linkage above described, will produce a rotative movement of the rock shaft 373, which during its rocking operation will operate the bar 378 bearing the knife, giving said knife a movement upwardly and across the strip so that the severing operation will be in the nature of a shear. As the bar 378 starts to move, by reason of the rocking of the shaft 373, the arms 398 will be swung, causing the cam roll 399 to move in the slot 397, thereby swinging the arm 393 downwardly, and lowering the platen 395 into engagement with the strip. The bar 378 continuing its upward movement, will cause the face 402 of the slotted block 384 to engage the strip which is then held between the platen on the arm 393 and the face of the block 384.

As the bar 378 continues its movement, the knife will be forced upwardly through the cord strip and across it, finally resting against the platen 395. This platen being made of relatively soft material, such as fibre, protects the edge of the knife, while making sure that the cord strip is completely severed. When the operation of severing is complete, the shaft 373 is rocked backwardly, which retracts the bar 378 with the knife, and causes the arm 393 to be rocked upwardly, so that the platen is disengaged from the upper surface of the strip.

It will be observed that the positions of the parts as indicated in Fig. 23, when the severing mechanism is not in use, are such that the feed grip can pass between the platen and the knife to engage the end of the cord strip supported in position ready to be grasped between the retainer plates 350 and 351.

Transfer mechanism

As has previously been explained, after the feed grip draws a length of cord strip to the end of its outward travel, the strip is seized by the transfer arm mechanism, which will now be described, reference being had particularly to Figs. 2, 4, 5, 25 and 29.

The transfer arm consists of a double-ended arm indicated generally by the reference character 416, said arm and its operating mechanism being located in a housing 417. The housing 417 is supported upon a hollow shaft 418, to which is clamped a collar 419. The shaft 418 extends through and is journalled in the bearings 420 and 421 formed in spaced arms 422 and 423 of a bracket 424 carried by the superstructure frame. Positioned between collar 419 and the end of the arm 423 and encircling the hollow shaft 418 is a collar 425, secured to said shaft by a clamp screw 426.

The collar 419 which is clamped to the hollow shaft 418 rests upon the end of the bracket arm 422, whereby the hollow shaft 418 and the transfer arm mechanism are supported. The adjustable collar 425 prevents any upward displacement of the hollow shaft 418.

The transfer arm includes two pairs of levers 427, 428 and 429, 430, each pair intermediate their ends being pivoted upon bearings or stud pivots 431 and 432, carried by the housing 417. Inasmuch as both pairs of levers 427, 428 and 429, 430 and the operating mechanism therefore are similarly constructed, a description of one will be sufficient to impart a clear understanding of the construction.

Levers 427 and 428, at their outer ends, are provided with the opposed jaws, 433 and 434 respectively, and at their inner ends within the housing 417 are pivotally connected with the toggle links 435 and 436, which links at 437 are pivotally connected with the block 438 sliding in a way formed by the guide plates 439 and 440 carried by the housing 417. Connected with the pivot 437 is a link 441 (shown in dotted lines in Fig. 25) which link at its opposite end at 442 is connected with a block 443 sliding in a vertically disposed way formed between the guide plates 444 and 445 carried by the housing 417. The block 443 is formed upon the lower end of a stud shaft 446 which extends upwardly through the hollow shaft 418 and which at its upper end is provided with a flanged collar 447, the flanges being indicated at 448. On the superstructure frame is pivoted a bell-crank lever 449 having a forked end provided with the rollers 450 which extend between the flanges 448. The other arm of the bell-crank inclines downwardly and is provided with a follower 451 which traverses a cam groove 452 formed in a box cam 453.

The collar 419 which is clamped to the hollow shaft 418 is provided with an outstanding arm 454 carrying at its outer end a ball 455 which fits in a socket 456 of a link 457, the latter being pivotally connected at 458 with one arm 459 of a bell-crank pivoted at 460 to the superstucture frame, and whose other arm 461 is provided with a cam follower 462 which traverses a cam groove 463 in the cam 463'.

Having thus described the construction of the transfer arm mechanism, its operation per se may now be understood. It will be seen that a vertical reciprocatory movement of the stud shaft 446 compelled by the bell-crank connecting it with the cam 453 will through the link and toggle mechanism just described so operate the levers 427 and 428 that the jaws 433 and 434 will be opened and closed. A unisonous operation will of course occur between the jaws carried by the lever 429 and 430 which are indicated at 464, and 465 (Fig. 4) at the opposite end of the transfer arm 416. Thus it will be seen that the two pairs of opposed jaws of the transfer arm 416 will be opened and closed in unison at intervals determined by the cam groove 452 in the cam 453.

The mechanism connecting the hollow shaft 418 and cam 453 is adapted to impart to the transfer arm 416 a partial rotative movement so that, at the proper timed interval, the transfer will seize the cord strip, and after the cord unit has been severed transfer the cord unit from the feeding mechanism to the laying mechanism presently to be described, while maintaining it in its already tensioned condition.

Referring now to the operation of the transfer mechanism as related to the die mechanism, the severing mechanism, the cord strip feeding mechanism already described and the cord unit laying mechanism presently to be described such operation will now be described.

The co-related operation of these parts of the mechanism is as follows:

While the cord strip is being drawn by the feed grip to its outermost limit of travel the transfer arm 416 is being rocked or swung horizontally until its opposed jaws will be positioned above and beneath the cord strip, the inner jaws being positioned between the feed grip jaws and the severing mechanism, and the outer jaws being positioned above and beneath the free end of cord strip at a point slightly beyond or in front of the feed grip. This will occur when the feed grip reaches its outward limit and the stud shaft 446 will be moved upwardly by the engagement of the forked arm 449 with its collar 447 by the cam mechanism, thereby operating the toggle links and levers to cause the jaws at the opposite end of the transfer arm to engage with the strip. The mechanism operating the feed grip then becomes operative to release the feed grip from the strip, whereupon the severing operation takes place, leaving the cord unit extended between the gripping jaws of the transfer arm in tensioned condition. With the feed grip stationary, the transfer arm, as will be seen by reference to Fig 4, lies in the path of the feed grip, will commence to rock, continuing its rocking movement until the ends of the strip lie between the jaws of the laying mechanism, the axis of the strip then lying angularly of the mandrel, as shown by the dotted lines of Fig. 5. As will later be described, the laying mechanism thereupon seizes the ends of the cord unit, whereupon the cam actuated stud shaft 446 moves downwardly, so as to release the jaws of the transfer arm, whereupon the latter starts to resume its original position, the feed grip thereupon starting backwardly again to seize the end of the cord strip. Upon the outward reciprocation of the feed grip the described operation is repeated.

Cord laying mechanism

Before proceeding to describe the construction and operation of the laying mechanism, it may here be noted that the reinforcing strips for the tire carcass comprises at least two plies, the inner ply being laid by the cord units extending angularly of the mandrel in one direction, and the second ply being similarly laid angularly of the tire mandrel in an opposite direction, the cords of each ply crossing each other substantially at right angles. By reference to Figs. 2, 42, 43 and 44 reference numeral 466 indicates the inner ply and 467 the outer ply. The inner ply, it will be seen, is all laid directly upon the mandrel, strips of friction material 468 being applied to the mandrel at both lower sides thereof, the inner ply 466 overlying this strip of friction material, which in this art is designated as a "chaffer" strip. When the inner ply has been laid, a bead 469 is positioned upon the mandrel about the lower edge of the inner ply, as clearly shown in Figs. 43 and 44. This bead is of the usual construction and is shaped to fit closely against the inner ply. When this has been done the outer ply is laid upon the mandrel in a manner hereinafter to be described, and over and under the bead, as indicated in Figs. 43 and 44. It will be seen that inasmuch as the cord units are laid and pressed closely against the mandrel before and after the bead is positioned thereon, the mechanism for applying the first lay differs slightly from the mechanism for applying the second lay.

While the mechanism for applying the first and second plies of cord units to the mandrel, may be assembled upon a unitary structure, I prefer to equip one machine with the mechanism for applying the first ply, whereupon the mandrel is removed, the bead positioned thereon, the mandrel being then positioned upon another machine constructed identically with the first laying machine, except that the laying mechanism is varied to the extent that the ends of the cord units will be applied to the mandrel, and over and under the bead, as shown in Fig 44, of the drawings, whereupon the chaffer strip 468 is then applied exteriorly of the second ply, as shown in Fig. 44.

In describing this laying mechanism I will therefore first refer to the mechanism employed for positioning the first lay. This mechanism is shown in Figs. 1, 2, 4 and 32 to 27 inclusive, to which reference will now be made in describing the laying mechanism for the inner ply.

The laying mechanism consists of two sets of mechanisms mounted in the superstructure frame and so positioned as to operate upon opposite sides of the mandrel. These mechanisms are adapted for operation in unison. For the sake of brevity of description, but one of these mechanisms will be described, it being understood that the oppositely disposed set is simultaneously operable upon the opposite side of the mandrel. In the interest of clearness, however, some of the corresponding parts of the other laying mechanism will bear the reference numbers.

Referring now to the laying mechanism on the lefthand side of the machine as one faces the front of the machine, reference numeral 470 indicates a stud shaft suitably journalled in a bearing formed in an apertured bracket 471 bolted to the superstructure frame; and mounted upon this stud shaft is an arm 472 upon which the laying mechanism is mounted. The laying mechanism comprises a hollow casting 473, which for the purposes of this description may be termed the "cord laying hand", which is journalled upon a stud 474 extended between the forked arms 475 of the arm 472, the upper end of the lay 473 being received between said forked portion of said arm. Extending upwardly and inwardly from the laying hand, and formed integrally therewith is a cam arm 476, provided at its outer end with a cam roller or follower 477 which is adapted to traverse the cam surface 478 of a fixed cam 479 carried on the superstructure frame.

The arm 476 and the laying hand 473 comprise a bell-crank lever, which swings about the point of pivotal support 474. Pivotally attached at 480 to a lug 481, cast upon the laying hand 473, is the yoke 482 formed upon the end of a plunger rod 483, which plunger rod extends into a dash-pot or barrel 484, formed in the intermediate portion of the laying arm 472. Enclosed within the barrel or dash-pot 474, encircling the plunger rod 483, and impinging against the bottom wall of said dash-pot is a coil extensile spring 485, whose opposite end impinges against the yoke 482. The plunger rod 483 extends through an aperture formed in the bottom wall of the dash-pot or barrel 484, and is provided with adjusting nuts 486. It will be seen that the spring 485, acting through the yoke 482, tends through the hand laying arm 473, and the arm 476, to hold the cam follower 477 in operative engagement with the cam surface 478 of the cam 479.

Carried upon a yoke 487, whose arms straddle the laying hand 473 and which are pivotally mounted thereon at 488, is a lower jaw member 489. This jaw member co-operates with a reciprocating jaw member 490 carried by a plunger 491 having a sliding engagement in a cylindrically formed passageway 492 disposed centrally of the lower end of the cord laying hand 473. The plunger 471 at its inner end is provided with a shoulder 493, between which and a cap 494 is provided the coil extensile spring 495, said spring encircling the plunger. This spring tends to urge the upper jaw member 490 in an upward direction.

At this point it may be noted that the yoke 487 is so formed that the pivotal support thereof at 488 upon the cord laying hand, when the jaws are in the position shown in Fig. 32, is directly above the working face 496 of the jaw, the construction being such that a downward reaction upon said jaw will not tend to swing the yoke upon its point of pivotal support. In other words, the yoke so maintains the jaw member in working position that it is on a dead centre with its point of pivotal support.

Pivotally connected with the yoke 487 at 497, is a link 498 whose opposite end is pivotally connected at 499 with a link 500, whose opposite end 501 is pivotally mounted at 502 upon a bracket 503 formed upon the cord laying hand.

Formed upon the upper end of the plunger 491 is an ear 504, to which is pivotally connected at 505 a pair of links 506 shown in Figs. 32 and 33. Links 506 at their upper ends are pivoted at 507 to an arm 508 fixed upon the stud shaft 509 which extends transversely of the laying hand, and is journalled in bearings formed in the side walls thereof. The outer end of the shaft 509 is provided with a squared portion 510 upon which is mounted an operating lever 511. The link 500 is provided with a notch or recess 512 which is positioned between the link proper and a laterally extending cam member 513 having the straight cam face 514. The lever 511 is also provided with a notch or recess 515 located adjacent a laterally extending cam member 516 provided with a straight cam face 517. The link 498 and the link 500 it will be noted, form a toggle connection between the fixed point or pivot 502, and the pivot 497, the opening or straightening of which will serve to swing the lever 487 upon its pivotal support, whereby the jaw member 489 may be swung into or out of operative relation with respect to the opposed jaw member 490. Likewise, the links 506 and the arm 508 form a toggle connection between the stud shaft 509 and the plunger 491, which carries the upper jaw 490, the straightening or breaking of said toggle operating to raise or lower said upper jaw 490. These two toggles are operated by a reciprocating bar 518 mounted to slide between suitable guide pieces 519 and 520 formed upon the laying hand 493. An outstanding circular stud 521 mounted upon the bar 417 near its lower end, operating in a manner to be described to straighten or break the toggle controlling the operation of the lower jaw member, and a similarly formed circular stud 522 formed upon the bar 518 intermediate its ends, co-operating with the lever 511 to straighten or break the toggle operating the plunger for the upper jaw.

The bar 518 at its upper end is provided with an operating rod 523 which passes through an opening provided in an arm 524 extending laterally from the cam arm 476. Formed upon the outer end of the rod 523 is a head 525 having the curved working surface 526, and between this head and the arm 523, encircling the rod, and impinging against the head 525 and the end of the arm 523, is a coil extensile spring 527.

Mounted upon a hub formed upon the frame of the machine, concentrically of the shaft 470, is an arm 528, the outer end of which is provided with a working face 529. Also mounted upon said hub, and formed integrally with the arm 528 is an arm 530, the outer end of which is forked at 531. Arms 528 and 530 form a bell-crank lever, and which bell-crank lever is so positioned relative to the head 525 of the rod 523, that when said bell-crank lever is rocked by means hereinafter to be described, the working face 529 of the arm 528, and the forked portion 531 of the arm 530 will be alternately engaged with said head to operate the two toggle mechanisms adapted to open and close both jaws of the laying arm hereinbefore described. Fixed to the bell-crank lever formed by the arms 528 and 530, which is indicated generally by the reference numeral 532, is an arm 533 to which is pivoted at 534 a link 535, the upper end of which is pivotally connected at 536 with an arm 537 of a bell-crank lever 538, fixed upon a sleeve 539, the other arm 540 of said bell-crank lever being pivotally connected at 541 to a link 542 pivoted at 543 upon the upper end of a lever 544 journalled at 545 upon the superstructure. The intermediate portion of the lever 544 is provided with a cam follower 546 which works in a cam groove 547 formed in the cam 548 mounted upon the cam shaft 320. It will be understood that the sleeve 539, which encircles the shaft 470 at its opposite end, is provided with mechanism similar to that just described, for operating the jaw mechanism of the cord unit laying mechanism upon the opposite side of the mandrel.

Referring now to the mechanism for swinging the laying arm 472, this mechanism operates through the shaft 470, upon which is mounted the sleeve 538 just described, which latter sleeve operates the jaw mechanism. Fixed upon the shaft 470 is a hub 549, which carries an arm 550, which arm is connected by a ball and socket connection 551 with a link 552, whose upper end 553 is connected by a ball and socket connection 554 to the arm 555 of a bell-crank lever 556, whose opposite arm 557 is connected by a ball and socket joint 558 to a link 559. The opposite end of the link 559 is pivotally connected by a ball and socket joint 560 with the upper end of a lever 561 whose lower end is provided with a hub 562 journalled upon a stud 563 formed upon a superstructure frame. The intermediate portion of the lever 561 is provided with a cam follower 564 (shown in dotted lines in Fig. 2) which cam follower traverses a cam slot formed in the cam 565. It will be understood that shaft 470 which as just above described, is controlled by the cam 565 to operate the laying mechanism upon one side of the machine, extends transversely of the machine, and at its opposite end is adapted as by means of the arm 566 fastened to said opposite end of the shaft, and the link 567, to operate the laying mechanism upon the opposite side of the mandrel.

Having thus described the construction of the laying arm mechanism, the operation thereof may now be understood.

For the purpose of this description, I will assume that the parts of the laying mechanism are in the position shown in Fig. 32, in which position a cord unit indicated at 568 is shown positioned between the opposed jaws of each set of laying arm mechanism, the cord laying arms being ready to descend and be swung about the mandrel to lay the cord unit thereon. It may be noted at this point that before the cord laying jaws have been closed to seize the end of the cord unit, the transfer arm mechanism above described has been rocked laterally to insert the free ends of the cord unit between the then open jaws of the cord laying mechanism. With the parts in the position shown in Fig. 32, the cam 565 becomes operative through the link and lever mechanism next above described, to swing the arm 472 downwardly and inwardly. Assuming this operation to be taking place, the cam follower 477 traversing the cam surface 478 of the cam 479, will through the lever 476 swing the cord laying hand 473 inwardly simultaneously with the downward movement of the arm 472. By reference to Figs. 34 and 35, it will be noted that the cam surface 478 at the point 569 is provided with a slight outward break which with the continuing cam surface 570 accentuates the inward swinging movement of the cord laying hand when the latter reaches a position at the lower side of the mandrel, in which position it is shown in Fig. 34 of the drawing.

Thus it will be seen that in the movement of the laying arm from the position of Fig. 32 to that shown in Fig. 34, the cord unit has been laid about the mandrel, it being assumed that the laying mechanism upon the opposite side of said mandrel has performed an operation on the opposite end of the cord unit identical with the above described.

Assuming the parts to be in the position shown in Fig. 34, the cam 548 through the operative chain of mechanism above described, swings the bell-crank lever 532, so that the forked end thereof which straddles the rod 523 will be in a position to engage with the head 525 of said rod to perform an operation presently to be described.

It will be understood that when the jaws of the laying arm mechanism are closed upon the end of the cord unit the toggle mechanisms operating the upper and lower jaws are in their straightened positions, whereby the jaws are locked into engagement with the ends of the cord units. This position of the parts is illustrated in Figs. 32 and 34. It will be noted that when the parts are in this position the stud 522 of the bar 518 occupies the notch or recess provided in the lever 511 and the stud 521 of said bar 518 has passed some distance along the straight cam surface 514 of the cam member 513 provided upon the link 500. Thus it will be seen that while the initial upward movement of the bar 518 will break the toggle controlling the operation of the upper jaw member of the laying arm, the breaking of the toggle of the lower jaw member will have to wait until the stud 521 has moved along the cam surface 514 until it engages with the wall of the recess 512. This construction is provided so that the upper jaw of the laying mechanism will first move away from the clamped end of the cord unit.

With the parts in the position shown in Figs. 32 and 34, it will be noted that the spring 527 has a tendency to break the toggle mechanisms controlling the upper and lower jaw members. This spring, however, has not sufficient strength to break said toggles when they are in their full straightened position. When the forked arm of the lever 530, however, engages with the head 525 and moves the rod 523 upwardly to first break the toggle controlling the operation of the upper jaw of the laying mechanism (Figure 35), and an instant later breaks the toggle controlling the operation of the lower jaw member, the spring 527 will complete the jaw opening operation quickly by effecting a further breaking operation of the toggles, whereby the jaw members will assume the position shown in Fig. 36. Thus the jaws of the cord laying mechanism will be quickly released from the ends of the cord unit at the end of the downward strokes of the cord laying arms. Assuming the jaws of the cord laying arms to be opened as shown in Fig. 36, the cam mechanism controlling the laying arm 472, operating through the shaft 470 will now become operative to swing said laying arms upwardly, the jaws of the laying arms remaining in open positions. The cam follower 497 traversing the cam surfaces 570 and 478, and which cam follower is held in engagement with said surfaces by the spring 485 will permit the laying hand 473 to return to the normal position shown in Fig. 32. When the laying arms reach the position shown in Fig. 32, with the jaws in their open position, cam 548 will again become operative, and through its associated mechanism swing the arm 528 to engage the face 529 with the upper surface 526 of the head 525, whereby the rod 423 will be forced downwardly to again close the jaws of the laying arms upon the next following cord unit, which has been inserted by the transfer arm between the open jaws of the laying arms at the instant that the laying arms reach their uppermost position. This sequence of operations is repeated as the succeeding severed cord units are laid upon the mandrel.

Wiper mechanism

The cord unit laying mechanism thus far described is identical for the first and second lay, and it will be noted by reference to Figs. 34 and 35 that when the cord laying arms release their hold upon the ends of the cord units, the entire length of the cord unit has not yet been applied to or laid against the mandrel, that is to say, the opposite ends of the cord units when the laying jaws are freed from them, hang loosely upon opposite sides of the mandrel, and it is necessary to provide means whereby said loosely lying ends of the cord units will be forced into engagement with the mandrel.

Referring now to the mechanism for performing this function of forcing the free ends of the cord units into engagement with the mandrel in making the first lay, this means comprises a pair of wiper arms 569 and 570 disposed at either side of the mandrel, and lying slightly below the centre line thereof. These arms are provided with rollers 571 and 572, which when the arms are operated, the rollers are engaged with the cord units slightly above the point where they are applied to the mandrel, the arms 569 and 570 being so disposed and operated that the rollers will ride over the cord units and press them against the mandrel, whereby the entire length of cord unit will be applied thereto. Inasmuch as the cord units are applied to the mandrel at an angle, these wiper arms must be so constructed and operated that they will be swung inwardly, downwardly and laterally, following the direction of the laid cord units. Inasmuch as these wiper mechanisms located upon both sides of the mandrel are identical in construction and operation, but one thereof need be described to impart a full understanding of their construction and operation.

Referring now to the wiper mechanism located in front of the mandrel, the wiper arm 569 is carried by a shaft 573, journalled in the end of the arm 574. The wiper arm is provided with a lug 575, which carries an adjusting screw 576, the latter being adapted to be engaged with an abutment 577 provided upon the outer end of the arm 574. The engagement of the end of the screw 576 with the abutment 577 limits the upward swinging movement of the wiper arm 569 with reference to the arm 574. Encircling the shaft 573 is a coil spring 578. One end of this spring is attached to the shaft 573, and the other to the arms 574, the tendency of the spring being to hold the wiper arm in the position shown in Fig. 4 of the drawings. This spring, however, permits the wiper arm 569 to swing relatively to the arm 574 for a purpose presently to be described.

Referring now to Fig. 37, the arm 574 is provided with a hub portion 579, which is adapted to slide upon a shaft 580, and is keyed thereto as at 581 to prevent a relative rotative movement between the hub and the arm, although permitting a free sliding movement therebetween. Shaft 580 is mounted in a suitable support 582, fixed upon the end of a rod 583 adapted to slide in a suitable bearing 584 carried upon a bracket 585 clamped to the side of the superstructure frame as by means of the clamp screw 586. Pivotally mounted as at 587 upon the support 582, is a bell-crank lever 588. One arm 589 of this bell-crank lever is connected as by means of a link 590 with the hub 579 of the arm 574. The opposite arm 591 is pivotally connected at 592 with a plunger rod 593 mounted to slide in a longitudinally formed recess 594 formed in the bearing member 584. Mounted upon the plunger rod 593 and engaging at one end, a fixed plate 595, upon the bearing member 584 at one end of the recess 594, is a coil spring 596 which at its opposite end engages a collar 597, adjustably mounted upon the plunger rod 593. Plunger rod 593 extends through a recess formed in the plate 595. Reference numeral 598 denotes an abutment having a recess through which extends the rod 593. This abutment 598 is adjustably mounted upon a stud screw 599 carried by the bearing member 597. The abutment forms a stop to limit the endwise movement of the plunger rod 593 when the collar 597 thereof is engaged therewith during the operation of the wiper mechanism. The rod 593 at its inner end is pivotally connected at 600 with an arm 601 formed upon a bracket 602, which bracket is fixed upon a shaft 603 journalled in a bearing 604 formed in the superstructure.

Upon the opposite end of the shaft 603 is a bracket 605, having a laterally extending arm 606, which is connected by means of a ball and socket joint 607 with a link 608. The opposite end of the link 608 is connected by a ball and socket joint 609 with an arm 610 mounted upon a shaft 611 mounted upon a bracket 612 supported upon the base 1 of the main frame. The shaft 611 is provided with an arm 613 provided with a cam-follower 614 which is received in a cam groove formed in a box-cam 615 mounted upon the shaft 324.

Having thus described the construction of this wiper arm mechanism, the operation thereof is substantially as follows, it being understood that the wiper arms 569 and 570 are shown in their normal positions in Figs. 1 and 4.

It will be seen that the cam 615 operates through the connected chain of mechanism above described to reciprocate the rod 583, and thereby reciprocate the bracket 582 which carries the shaft 580. This operation moves the wiper arm 569 and its roller 571 in the direction of the mandrel. Simultaneously with this operation the rod 593 being held against endwise movement by the spring 597 causes the bell-crank lever 588 to swing upon its point of pivotal support, whereby the link 570 moves the hub 579 of the arm 574 endwise upon the shaft 580, the construction being such that the wiper roller is first thrust against the partly laid cord unit in a position slightly above the point where said cord unit has been applied or laid against the mandrel by the laying mechanism. The continued inward movement of the bracket 582 will cause the wiper roller to swing downwardly and laterally, the downward movement being permitted by the yielding of the spring 578 and the lateral movement by the bell-crank 588 which effects a sliding movement of the head 579 upon the shaft 580. These two movements are so co-related that the wiper roller will follow the angular course of the strip as it is laid upon the mandrel and wipe the entire unlaid length thereof closely against the mandrel.

The cam 615 controlling the operation of the wiper arm mechanism, and the cam control of the laying arm mechanism, are so co-related that the wiper rollers will be projected into engagement with the partly laid cord units just before the jaws of the laying arms release their hold upon the ends of said cord units.

*Mechanism for completing second lay*

Referring now to the mechanism for applying the second ply or lay, this mechanism has already been described, with the exception of an attachment mounted upon the laying arm which presses the cord units against the already laid cord units directly over the junction point of the upper edge of the bead and said already laid cord units, and the mechanism for pressing or tucking the ends of the cord units under the bead.

Referring now to Figs. 40 to 47 inclusive, the laying arm 472 is provided with a bearing in which is journalled the shaft 616, said shaft having mounted thereon an arm 617, having the presser foot 618. Shaft 616 is also provided with an arm 619, whose upper end is provided with a cam-follower 620. The cam-follower 620 is adapted to traverse the cam surface 621 of a cam 622, which is carried upon the arm 530. The arm 619 which is mounted upon the shaft 616 forms a part of a bell-crank lever, whose opposite arm 623 is pivotally connected at 624 with a plunger rod 625, which extends through a recess formed in a bracket 626 provided upon the laying arm 472. A compression spring 627 forces the arm 623 downwardly and maintains the cam-follower 620 in engagement with the cam surface 621.

Having described this part of the mechanism for effecting the second lay, the operation thereof may now be understood.

Assuming the parts to be in the position shown in Fig. 40 of the drawings, when the laying arm starts to move downwardly, the arm 617 will swing downwardly with it. When the laying arm reaches its lowermost position, the forked arm 530 swinging upward to operate the toggle mechanism to release the jaws of the laying arms from the ends of the strip, will carry the cam 622 with it, whereby the engagement of the cam with the cam-follower will cause the arm 617 to complete its swinging movement and project the presser foot 618 against the partially laid cord unit and press it tightly against the point of union of the upper edge of the bead and the previously laid cord unit.

When the laying arm commences its return movement, the spring 627 will compel a return movement of the arm 617 to restore it to the position shown in Fig. 40 of the drawing.

Referring now to the tucker mechanism for the second lay, this mechanism is illustrated in Figs. 43 to 47 inclusive, the tucker mechanism being operated from the shaft 603, which operates the wiper mechanism of the first lay, the form of the cam 615 being merely changed to effect the desired operation of said tucker mechanism.

Referring to Fig. 46, which shows a side elevational view of the tucker mechanism, on the righthand side of the machine, and also portions of the tucker mechanism on the opposite side of the machine, reference numeral 628 denotes a rod mounted for reciprocal and rotative movement in a bearing 629 carried upon a bracket 630, clamped to the frame. This rod is moved endwise by means of an arm 631 mounted upon shaft 603 which at its upper end is provided with a yoke 632, the threaded connection between the yoke 632 and the rod 628 permitting the latter to have a rotative movement. The bearing 629 is provided with a cam slot 633 which receives a post 634 mounted in the rod 628 and extending laterally therefrom. The cam slot 633 is so formed that when the rod 628 is moved longitudinally, it will be given a slight rotative movement. Mounted upon the rod 628 is an arm 635, which at its lower end is provided with a bearing for a shaft 636. Shaft 636 at its forward end is provided with an arm 637, the outer forked end of which is provided with a tucker roller 638. Shaft 636 at its opposite end is provided with an arm 639 between the outer end of which, and a lug 640, is provided a compression spring 641. The arm 637 is provided with a laterally extending lug 642, which co-operates with an adjustable abutment 643, which limits the upward swinging movement of said arm 637 under the influence of the spring 641.

Referring now to Fig. 46, it will be noted that this part of the tucker mechanism is located directly in front of the mandrel, and its presence there if permanently located would interfere with the removal of the mandrel from the machine when a carcass has been laid thereon. I, therefore, provide means whereby the arm 635 on the front of the machine may be readily removed therefrom and readily replaced in a predetermined position without the necessity of effecting a nice adjustment thereof after each replacement. To this end the rod 628 is provided with a collar 644, and the arm 635 with a laterally extending arm 645 having a recess 646 adapted to receive a post 647 provided upon the collar 644. The upper end of the arm 635 is bifurcated, and the bifurcated parts are adapted to be clamped about the ends of shaft 628 as by means of a clamp screw 648. The arm is removed from its supporting and operating rod 628 by merely unscrewing the clamp screw 648 and sliding the arm from the rod. When the arm is replaced upon the rod, it is merely necessary to again engage the recess 646 of the arm 645 to the post 647, whereby the arm 635 will be replaced in its former predetermined position. The arm upon the opposite side of the machine, and which corresponds to the arm 635, and is indicated at 649, is permanently mounted upon its operating rod, which of course corresponds to the rod 628.

Having thus described the construction of this part of the mechanism, the operation thereof may now be understood.

Referring to Fig. 45 of the drawings, the tucker mechanism is shown both in inoperative and in operative positions. Referring to the righthand side of the figure, the dotted lines show the tucker mechanism in its inoperative position, wherein it is out of the way of the cord unit laying mechanism when they perform their function. When the cord laying arms have moved upwardly a sufficient distance to clear the space below the jaws thereof, the cam mechanism which operates the shaft 603, becomes operative to rotate said shaft, and thereby swing inwardly the rod 628. This operation first by means of the cam slot 633 and the post 634 of the rod 628 gives said rod a slight rotative movement which swings the arm 635 from the position shown in dotted lines of Fig. 45 to the position shown in the full lines thereof. The continued rearward movement of the rod 628 will cause the arm 635 to move directly inwardly, thereby causing the tucker arm 637 to engage the roller 638 with the free end of the cord unit substantially opposite the lower surface of the bead, as illustrated in Fig. 43 of the drawings.

Further rearward movement of the arm 635 will cause the tucker roller 638 to move downwardly and inwardly, thereby wiping and tucking the free end of the cord unit against the under surface of the bead. This operation is clearly shown in Figs. 43 and 44 of the drawings. The second lay or ply has now been applied to the mandrel, and the parts of the tucker mechanism are restored to their normal positions by the forward movement of the rod 628 under the control of its operating cam.

*Core or mandrel operating mechanism*

Referring now to the mechanism for supporting the mandrel, and for rotating the latter, the reference numeral 650 denotes an arbor which is suitably supported in the front wall of the main frame, preferably being by means of the bracket arm 651 so that the arbor is rigidly supported. Journalled upon the arbor is a gear wheel 652 which is provided with a laterally offset circular part 653 provided with the outstanding lug or key 654. Adapted to be mounted upon the arbor 650 is a chuck 655 having a collar 656 which is rotatably mounted upon the arbor. The outer end 657 of the arbor is preferably rounded, as shown, and between the rounded portion of the shaft of the arbor is a reduced portion 658 and an inclined circular surface 659.

The purpose of this construction is to facilitate the positioning of the chuck upon the arbor. It will be seen that it is merely necessary to shove the chuck over the rounded portion 657, whereupon the inclined surface 659 will guide the chuck member upon the arbor. The collar 656 of the chuck has fastened thereto a circular plate 660, having a recess 661 adapted to receive the lug or key 654, this construction establishing a driving connection between the gear wheel 652 and the chuck.

Mounted in suitable guideways 662 formed in the plate 660 are three chuck blocks 663, 664 and 665, said chuck blocks being adapted to be projected outwardly to engage with the rim 666 of the mandrel 667. The chuck blocks 663 to 665 inclusive, are controlled by worm screws 668, threaded into the blocks, the heads 669 of said worm screws resting in recesses or bearings 670 formed in the collar 656. Adjacent these heads and keyed to the shaft of the worms are beveled gears 671, which mesh with a bevel gear 672 journalled on the collar 656. This bevel gear is provided with a circular row of gear teeth 673 with which meshes a pinion 674 journalled in the front wall of the housing 675 of the chuck. The shaft 676 of this pinion extends outwardly and is provided with a squared head 677 adapted to be received in a socket of a detachable crank member 678 shown in dotted lines 530 by means of which the pinion may be rotated. It will be seen by the rotation of the pinion 674 through the beveled gear connection with the worms, the chuck block may be projected inwardly and outwardly at will into and out of engagement respectively with the rim of the mandrel. Each of the chuck blocks is provided with an outwardly extending shoulder 679 against which the rim 666 of the mandrel is clamped by means of the clamp member 680, which have a threaded connection as at 681, with the chuck blocks and operating handle 682. By means of this construction it will be seen that when the rim of the mandrel is positioned upon the chuck it may be clamped tightly thereto. The flanges 683 of these clamping members having flat portions 684 which when lying parallel with the inner circumference of the mandrel ring, permit the mandrel to be removed from the chuck. When in operative position it will be seen that the mandrel is tightly clamped between the shoulders 683 of the clamping members 680 and the shoulders 679 of the chuck block.

Thus it will be seen that the mandrel is securely clamped to the chuck, and the chuck has a detachable driving connection with the drive gear 652.

Driven as by means of a sprocket chain 685 from a sprocket wheel on the shaft 324 is, a sprocket wheel 686 mounted upon a shaft 687 journalled in the frame of the machine. This shaft at its outer end is provided with a bevel gear 688 which meshes with a bevel gear 689 carried by a shaft 690. Shaft 690 is provided with a disc 691 provided with arms 692 between which is journalled a roller 693. The arms 692 straddling the periphery of a Geneva wheel 694, having the teeth 695 separated by the recesses 696, which recesses are adapted to receive the roller 693 during the rotative movements of the shaft 690, whereby the Geneva wheel 694 will be given a rotative movement equal to the space of one tooth upon each rotative movement of the shaft 690. The Geneva wheel 694 is mounted upon a shaft 697 which is provided with the spur gear 698. The shaft 697 forms a pivotal support for a swinging bracket 699 between the side arms of which are journalled the shafts of the meshing gears 700 and 701. The gears 698, 700 and 701 are in mesh, and the gear 701 is in mesh with the gear wheel 652. Thus it will be seen that the gear wheel 694 has driving connection with the gear wheel 672 which drives the mandrel chuck through the chain of gearing just described.

The bracket 699 is provided with a pin adapted to be received in any one of a plurality of openings 702, 703 and 704, the construction being such that the brackets may be swung downwardly so that a gear of larger diameter may be substituted for the gear wheel 701 when it is desired to vary the relative rotative movement between the Geneva wheel 694 and the gear wheel 652, as when carcasses of varying diameter are to be produced upon the machine.

Automatic stop

Having thus described the construction of the chuck, the mandrel and the intermittent driving means for the chuck, the operation which should be obvious without further description, I shall now describe the means whereby the machine is stopped automatically, and whereby it may be set to replace one or more cord units which the machine might be required to do in the event that defective cord units are found in a completed carcass. This means is carried in a box or casing 705 suitably supported upon the side frame of the machine, as illustrated in Fig. 3. Journalled in a suitable bearing formed in the rear wall of this casing is a shaft 706 having a sprocket 707 adapted to be driven by the sprocket chain 708 from the shaft 324. Shaft 706 carries a disc 709 provided with a roller tooth 710 adapted to mesh with the teeth 711 of the Geneva wheel 712. The Geneva wheel 712 is mounted upon a sleeve 713 mounted upon a transverse shaft 714 journalled in bearings formed in the front and rear walls of the casing 705. Splined upon the sleeve 713 is the gear wheel 715, the construction being such that a driving connection is established between the Geneva wheel 712 and said gear wheel 715. Journalled on the sleeve 713 is a lever 716, upon the inner end of which is journalled a gear wheel 717, which meshes with the gear wheel 715, and gear wheel 717 is adapted in turn to mesh with any one of a plurality of gears 718, 719 and 720 mounted upon a shaft 721, journalled in the front and rear walls of the casing. The lever 716 at its outer end has an operating handle 722, and the arm of said lever adjacent the operating handle is adapted to be engaged with any one of a plurality of slots 723 formed in the side wall of the casing. It will be seen that by means of this construction the lever 716 moved laterally, whereby the gear wheel 717 may be engaged with any one of the gear wheels 718 to 720 inclusive, to vary the driving ratio between the Geneva wheel 712 and the shaft 721. The lever may be locked after lateral movement by the slots 723 which varying in depth also maintains the gear 717 in mesh with the selected driven gear wheel. This driving mechanism for the shaft 721 is co-ordinated with the drive of the mandrel, so that this automatic stop mechanism will be operative upon different sized mandrels upon which the tire carcasses are to be laid.

Mounted upon the shaft 706 is a cam member 724 having the slot or recess 725 formed in the edge thereof, said slot being provided with an abrupt shoulder 726. Mounted upon a suitable pivot 727 is an arm 728, whose upper end at 729 is connected as by means of a link 730 with a lever 731 journalled as at 732 upon a suitable boss 733 carried by the front wall of the casing.

The reference numeral 734 indicates a sleeve provided with a cam disc 735, the latter being provided in its edge portion with a recess 736. The sleeve 734 is fixed to a sleeve 737, the latter being journalled upon the shaft 721. The sleeve 737 is provided exteriorly of the casing with a dial 738. This dial is calibrated to indicate the positions of the various cord units laid, or to be laid upon the mandrel. In the present instance there are three rows of numbers indicated at 739, each row being adapted for use when a tire carcass is laid upon a mandrel of a predetermined size, and the various rows of numbers being adapted for use upon different sized mandrels.

The sleeve 737 and the sleeve 734 are connected together so that the dial 738 and the cam member 735 rotate as a unit and are held against relative rotation. The hair line indicator 741, carried by the bracket 742, co-operates with the numbers on the dial to make the indication. The front face of the sleeve 737 is provided with an inclined face 743, which co-operates with a similarly formed face 744 formed upon a locking member 745 loosely mounted upon the shaft 721. A coil spring 746 provided in a recess formed in the sleeve 737 engages with the locking member 745 and tends to move it in an outward direction. Threaded on the outer end of the shaft 721 is a nut 747 provided with the operating handles 748. The dial is also provided with an operating handle 749.

It will be seen that the cam disc 735 and the dial 738 being connected together may be moved independently of the shaft 721 by merely loosening the nut 747, which nut, however, through the instrumentality of the locking member 745, when tightened, connects the shaft 721 with the sleeve 737, whereby these parts will rotate as a unit.

Suitably supported as by means of the bracket arms 750, is a block 751 of insulating material, which carries a circuit breaker 752 provided with the push button 753. The stem of the push button 753 extends through an aperture 754 formed in the insulating block, through an aperture 755 formed in a lug 756, provided upon the arm 728, the outer end of said stem being provided with a head 757, which is adapted to be engaged by said lug.

At this point it may be noted that this circuit breaker which may be of any approved type, is connected in electric circuit, not shown, of the driving motor 48, so that when the circuit breaker is actuated by the operation of the stop mechanism, the construction of which has just been described, the current supply of the machine will be cut off, and the operation of the machine thereby arrested.

The arm 728 is provided with a laterally extending lug 758, which is adapted to ride upon the surface of the disc cam 724, and at a predetermined time during the rotated movement of said disc to enter the recess 725 and engage with the shoulder 726. The upper end of the lever 731 is provided with a laterally extending boss 759 which is adapted to rise upon the surface of the cam 735, and at a predetermined time during the rotated movement of said cam to enter the recess 736.

Pivotally connected at one end with the lever 731 at 760, and suitably guided in an apertured lug 761 is a rod 762. Encircling this rod, and impinging upon the lug 761, and upon a shoulder 763, formed upon the end of the rod 762, is a coil spring 764, whose function is to urge the lever 731 and the arm 738 through their connections in such directions that the lug 758 will be maintained in resilient engagement with the rim of the cam disc 724 and the boss 759 will be similarly held in engagement with the rim of the cam disc 735.

The operation of this stop mechanism may now be understood.

Assuming the machine to be in operation, and the shaft 706 being driven by its sprocket and chain connection with the shaft 324, the Geneva movement will effect a step-by-step operation of the shaft 714, which shaft as above described, is connected by the system of selective gearing with the shaft 721.

Assuming the parts to be in the position shown in the drawings, and the machine in operation, the lugs 758 and the boss 759 will ride over the rims of their respective cam members. When a complete rotative movement of the cam members 735 and 724 has been effected, the spring 764 will become operative to swing the lever 731, so that the boss 759 thereof will enter the then oppositely disposed recess 736, and the lug 758 will be sprung into the recess 725 of the cam disc 724, whereby said lug will engage with the shoulder 726 and effect a mechanical arresting of the parts.

Concurrently with this operation, the swinging of the arm 728 will operate the circuit breaker 752 to break the power circuit. Thus the driving power of the entire machine wil be instantly shut off and the movement of the parts mechanically arrested.

At this point it may be noted that the parts are so co-ordinated that the operation of the machine will be automatically arrested when the transfer arm is in a direction parallel with the length of the machine, just after it has clamped the ends of the cord strip.

The purpose of the dial 738, and its associated mechanism, is to permit one or more cord units to be laid in the event that an imperfection is discovered in previously laid cord units, such for instance as a knot or blemish in the cord unit as might effect the quality of the tire carcass. It will be seen that by releasing the tension of the nut 747, the dial and its associated cam member 735, may be rotated by means of the operating handle 749, thereby caming out the lug 759 from said cam 738, whereby when the machine is again set in operation, a number of cord units will be laid upon the mandrel, corresponding with the position of the dial, it being understood, of course, that after the dial has been moved to the desired position, the nut 747 has been tightened to again connect the shaft 721 with the cam 735 and the said dial. It will be further noted that in the event that it is necessary to replace imperfect strips, the mandrel shall have been rotated as by means of the operating handle 678 to carry that part thereof upon which it is desired to place a cord unit, directly beneath the cord unit carried by the transfer arm.

In order to exactly position the mandrel, and to hold it stationary while a cord unit is being laid thereon, I have provided means whereby a positive locking of the mandrel is effected at each cord unit laying operation. This means comprises a lever 765 mounted upon a shaft 766 which extends transversely through the front wall of the machine. The outer end of this shaft is provided with an adjustable member 767, having a tooth 768 which is adapted to enter the spaces between the gear teeth of the gear wheel 652, which, as above described, is connected with the chuck supporting the mandrel. The shaft 766 at its opposite ends is provided with an arm 769 connected by means of a ball and socket joint 770, with a rod 771, whose lower end is provided with a ball and socket joint 772, with one arm 773 of a bell-crank lever, whose opposite ends is provided with a follower 774, which traverses a box-cam provided upon the shaft 324. Thus it will be seen that upon each cord unit laying operation, the tooth 768 will be projected between one of the teeth of the gear wheels 762, thereby locking the mandrel chuck against rotative movement. This tooth will also operate to exactly position the mandrel should there be any lost motion, whereby the position of the mandrel relative to the cord laying mechanism will be precisely determined.

*Sequence of operation*

To make clear the operation of the machine, there will now be set forth a sequence of operation of the various parts.

It will be assumed that an empty mandrel has been properly positioned upon the arbor, and the selective mechanism has been adjusted, so that the machine will lay cord units upon a mandrel of the size selected so as to cover the entire surface of the mandrel. When the cords have been passed through the strip forming and sheathing mechanism, and thence through the die mechanism, assume now that the die mechanism has been operated, and the free end of the cord strip which was supported by the retainer plates 350 and 351 is now between the jaws of the feed grip in its retracted position. The secondary slide is now operated by its associated cam mechanism, and this causes the feed grip as above described, to grip the end of the cord strip. The strip forming dies and movable platen now clear the cord, and the feed grip is ready to move to its outward position. At this time the layer arms are just finishing a laying operation, and as the feed grip commences to move outwardly, the lower jaws open, and the wiper or tucker mechanism, as the case may be, operate. When the feed grip has completed about half of its outward travel, the layer arms commence to move outwardly and to rise, and when the feed grip has passed over about three-fourths of its outward travel, the layer arms are rising simultaneously to their normal inoperative position.

The transfer arm, as the feed grip moves forwardly, moves in behind the feed grip until the transfer arm jaws lie parallel with the cord strip. As the feed grip is completing its outward travel, the knife starts to move to its outward position, and the transfer arm jaws now grip the cord. The severing operation is completed immediately thereafter. At this time the layer arms have assumed their horizontal positions, and the die mechanism has been moved to a position to reengage the cord strip. As the knife starts toward its retracted position from the feed strip, the feed grip releases, but prior to the severing operation the transfer arms have firmly gripped the cord strip and are holding it in tensioned condition.

The transfer arm, between the gripping jaws of which is held the tensioned cord unit, now starts to swing, the feed grip remaining stationary. The ends of the cord unit are then delivered between the oppositely disposed jaws of the laying arms, which now start to descend, and lay the cord unit upon the mandrel. The feed grip simultaneously starts to move rearwardly as the layer arms move downwardly. The layer arms complete so much of their path as is necessary to transfer the cord below the path of the feed grip, before the feed grip can strike the strip, and the transfer arm also swings about, its limit of travel being such that it is out of the path of the retreating feed grip jaws. The laying arms now continue their downward movement, the feed jaw returning to its original position. Passing by the rear end of the transfer arm and between the knife and its platen, which are now opened, the feed grip jaw now passes between the retainer plates and assumes a position with the end of the strip lying between its jaws, meanwhile the die mechanism still holding the strip firmly against the tension weights. The feed grip having reached its limit of backward travel secondary slide thereof is again operated by the associated cam mechanism to close the feed grip, and as the feed grip jaws grip the cord, the die mechanism is released, and by the mechanism described, is forced clear of the cord. The parts are now in their original position, and the sequence of operation is repeated. As each cord unit is laid, the mandrel is advanced one step by the Geneva wheel, so as to expose a new portion of the mandrel to the operation of the laying means. It will be seen that inasmuch as the cord units have been coated or sheathed with unvulcanized rubber, it is unnecessary to provide a coating of such rubber upon the mandrel.

Figure 2:
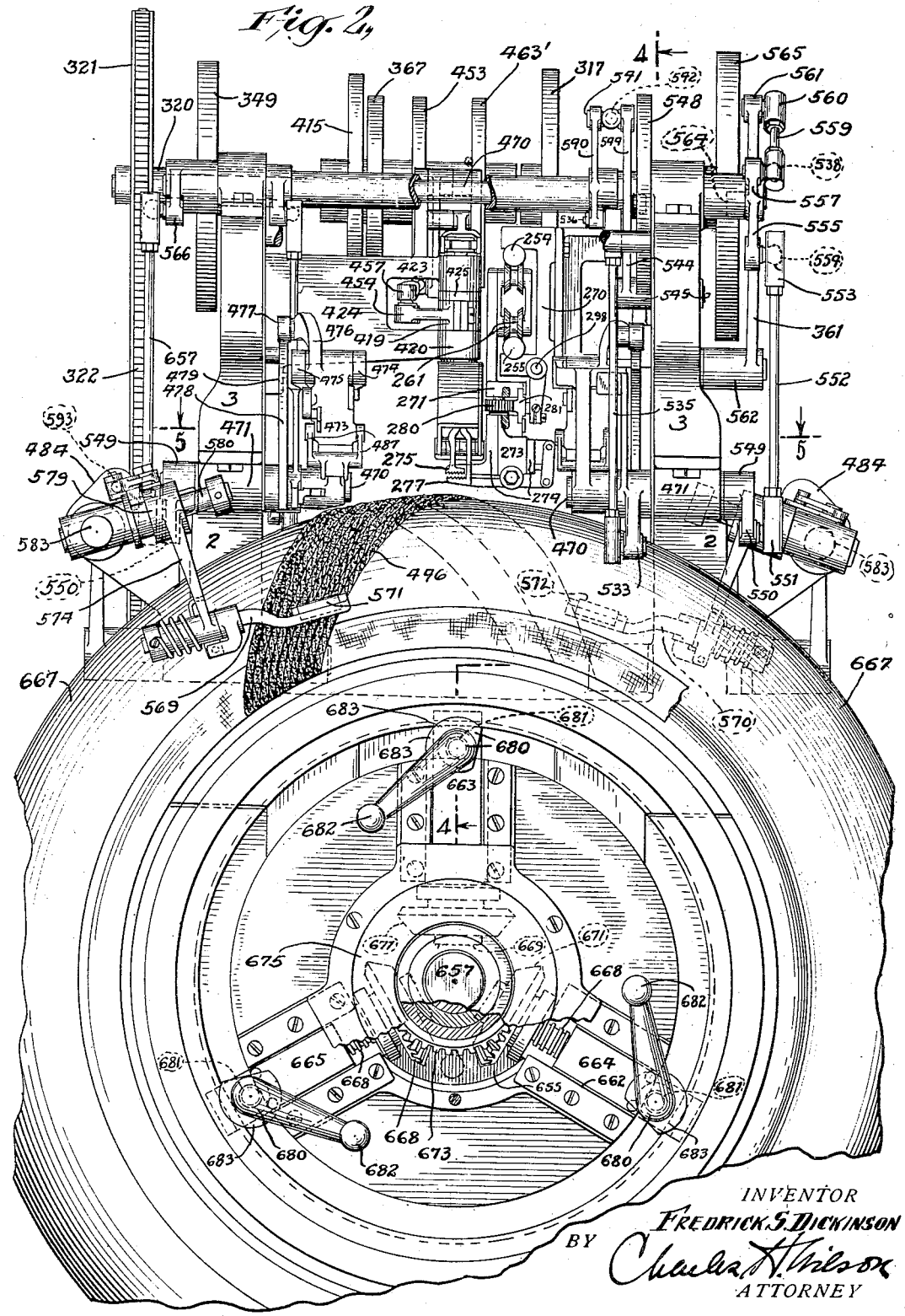
Figure 2 is a front elevational view of the machine with parts broken away, better to illustrate the construction.

As above indicated, the strips which are laid angularly of the mandrel, as illustrated in Figs. 2, 16 and 18, have been severed angularly of their axes, and the first layer is laid, as illustrated in Fig. 2, a strip of resistance fabric having been first placed along the under side of the mandrel so as to project beyond the end of the cord units of the first ply when laid. After a layer of cord units has been laid in position, the bead is placed in position whereupon the second lay is completed, as has already been described.

It will be understood that when one layer of cord units has been completed, the mandrel is taken from the machine and placed in a similar machine in which the layers are reversed, so as to lay the second layer of cord units angularly of the first layer, the bead remaining in position, as illustrated. The resistance material or fabric strip is then passed over the outer layer or ply as indicated in Fig. 44, whereupon the tire carcass is completed. While the present drawing and description apply only to two layers of cord units, it will be clear that as many layers may be applied to the mandrel, as desired. Two layers, however, have been found to provide a sufficiently strong structure.

The carcass is now complete so far as the reinforcing members are concerned, and the cushion rubber, breaker strip and side walls are now placed over the layers of the cord strip, and the shoe finished by the usual vulcanization process.

The purpose of beveling the sides of the strip as indicated in Figs. 20 and 21, which function is performed by the die mechanism is to insure that each strip as it is laid down against the adjacent strip will be put in place with a wiping action against the edge of the preceding strip, which operation will insure a tight fit throughout the layer, the bevels on the end of the strip permitting the strips to be forced evenly into position.

It is to be noted that first the individual cords are held under an equal tension, and then the cord strip is tensioned, and the cord units are held tightly tensioned throughout the laying operation, the laying arms moving in such a direction that the axis of the cord unit as laid will be sufficiently in a plane. Each of these planes will pass through the axis of the mandrel, this term being used to indicate the axis corresponding to the hub of the wheel upon which the shoe is to be placed. Each plane will also cut the axis of the annulus at an angle, the term "axis of the annulus" being used to designate the axis of the whole chamber which corresponds in a sense to the inner tube of the finished tire. It is clear, of course, that unless the axis of the cord units, or of the individual cords, as the case may be, lies in a plane, such as has been described, it would not be possible to maintain these reinforcing members at a constant tension, nor would they assume an equal distribution of the load throughout their entire lengths.

Furthermore, by laying the cord strips with an axis in a plane described, the units in each instance will pass from bead to bead throughout the tread in the shortest line, this insuring that a minimum quantity of material will be required to cover the surface. Furthermore, this construction will bring it to pass that the load, caused by the inflation of the tire, will be taken up in a direct pull upon the cords throughout their length, there being no tendency of the strips to move laterally in any sense. This makes certain also that there will be no tendency for the cord units to move relatively to each other, thereby causing friction and heat, and also being torn from their anchorage in the completed structure. It will be noted also that the cord units being coated or sheathed in unvulcanized rubber, will cohere along their lateral edges, whereby there will be formed homogeneous sheaths of rubber through which the cords extend, the cord units themselves and the individual cords being separated from one another by a homogeneous layer of unvulcanized rubber.

By way of definition it may be said that the terms "distort" and "distortion" as used in the specification and claims refer to the process by which the individual cord units, and the individual cords, are given such a form as is necessary to compensate for the variation in the size on the mandrel which is to be covered by the cords. In the process the normal cross-sectional contour of the individual cords is changed by causing the strands forming the cords to be moved transversely relatively to one another, to positions other than those normally occupied, the results being obtained without, however, causing the internal strains, lessening the strength of the cord, or varying the relative tension of the individual strands. This definition applies whether the cords are laid individually or in composite strips.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

1. In a machine of the class described, in combination with means for feeding a cord or cords, of means for distorting said cord or cords in a plurality of planes in different directions, and means for laying severed lengths of said cord or cords upon a form or mandrel.

2. In a machine of the class described, in combination, means for feeding a cord or cords, means for molding said cord or cords so that it or they will have recurring variations in breadth and thickness in different directions, and means for laying severed lengths of said cord upon a form.

3. In a machine of the class described, in combination, means for feeding a cord or cords, means acting in opposite directions upon said cord or cords to distort it or them cross-sectionally in different planes and in different directions, means for laying severed lengths of said cord upon a form.

4. In a machine of the class described, in combination, means for feeding a cord or cords under tension, means acting in opposite directions upon said cord or cords to distort it or them cross-sectionally, means for laying severed lengths of said cord upon a form.

5. In a machine of the class described, in combination, means for feeding a plurality of cords, means for uniting said cords into a strip, means acting recurringly in different directions upon said strip to vary it in width and thickness by molding the cords to change their cross-sectional contour, means for severing molded lengths of said cord, and means for seizing the ends of said severed lengths and laying them about a form.

6. In a machine of the class described, in combination, means for feeding a plurality of cords under tension, means for uniting said cords into a strip, means acting recurringly in different directions upon said strip to vary it in width and thickness by molding the cords to change their cross-sectional contour, means for severing molded lengths of said cord, and means for seizing the ends of said severed lengths and laying them about a form, the laying means retaining the lengths of cord under tension while laying them.

7. In a machine of the class described, in combination with feeding and laying means, of means to mold a length of cord by pressure exerted upon it in different planes and in different directions while the cord is stationary.

8. In a machine of the class described, in combination with cord feeding means and means to lay the cord under tension upon a form, of means cooperating with the aforesaid instrumentalities adapted recurringly to cross-sectionally distort the cord in different planes and in different directions before it is laid.

9. In a machine of the class described, in combination with means adapted to serve a plurality of cords under tension, of means to lay severed lengths of said cords while maintaining the tension and while maintaining the cord in a plane, and means for cross-sectionally distorting the cord in different planes and in different directions while under tension by a molding operation before it is severed and laid.

10. In a machine of the class described, in combination with means, adapted to serve a plurality of cords under tension, of means to lay severed lengths of said cords while maintaining the tension, and means for cross-sectionally distorting the cord in different planes and in different directions while under tension by a molding operation before it is severed and laid.

11. In a machine of the class described, in combination with a circular form of mandrel, of means for supplying a cord, means for feeding the cord, means for distorting the cord, means for severing lengths from said cord, and means for seizing the severed lengths of said cord and laying them about said mandrel while maintaining them in planes passing through the axis of the mandrel and angularly disposed relatively to the axis of the annulus.

12. In a machine of the class described, in combination with means adapted to serve a plurality of cords under tension, of means to lay severed lengths of a strip formed of said cords while maintaining the tension, and means for combining the cords while under tension into such a strip by a molding operation before the severance and laying so that said strip is distorted in different planes and in different directions before the same is laid.

13. In a machine of the class described, in combination with cord feeding means and means to lay strips formed from such cords upon a form, while under tension, of means co-operating with the aforesaid instrumentalities adapted to combine said cords into strips while recurringly distorting in different directions the cross-section of said cords.

14. In a machine of the class described, in combination with means adapted to serve a plurality of cords under tension, of means to lay lengths of a strip formed of said cords while maintaining the tension and while maintaining the axis of such strips in a plane, and means for combining the cords while under tension into such a strip by a molding operation before the severance and laying so that said strip is distorted cross sectionally in different directions before the same is laid.

15. In a machine of the class described, in combination with an annular form or mandrel, of means for supplying a plurality of cords, means for feeding said cords, means for combining said cords, while maintained in a plane, into a strip, means for severing lengths from said strip, and means for seizing the severed lengths of said strip and laying them about said mandrel while maintaining the axes of said lengths in planes passing through the axis of the mandrel.

16. In a machine of the class described, in combination with an annular form or mandrel, of means for supplying a plurality of cords, means for feeding said cords, means for combining said cords, while maintained in a plane, into a strip, means for severing lengths from said strip, and means for seizing the severed lengths of said strip and laying them about said mandrel while maintaining the axes of said strips in planes passing through the axis of the mandrel, and angularly disposed relatively to the axis of the annulus.

17. In a machine of the class described, in combination with an annular form or mandrel, of means supplying a plurality of cords means for feeding said cords, means for combining said cords into a strip having recurring variations in its transverse dimensions, means for severing lengths from said strip and means for laying the severed lengths of said strip about said mandrel while maintaining the tension, the axes of said severed lengths being maintained in planes passing through the axis of the mandrel.

18. In a machine of the class described, in combination, means to feed a cord, means to vary the cross-sectional contour of said cord in different planes and in different directions, means to sever said distorted cord into lengths, and means to lay such lengths upon a core or mandrel.

19. In a machine of the class described, comprising means to feed a cord under tension, means to vary the cross-sectionl contour of said cord in different planes and in different directions, means to sever said distorted cord into lengths and means to lay such lengths upon a core or mandrel, the tension being maintained on the cord until the lengths are laid.

20. In a machine of the class described, in combination, means to feed a cord, means to cause a periodical variation in the cross-sectional contour of said cord in different planes and in different directions, means to sever said distorted cord into similar lengths, and means to lay such lengths upon a core or mandrel.

21. In a machine of the class described, comprising means to feed a cord under tension, means to cause a periodical variation in the cross-sectional contour of said cords in different planes and in different directions, means to sever said distorted cord into similar lengths, and means to lay such lengths upon a core or mandrel, the tension being maintained throughout the progress of the cord through the machine.

22. In a machine of the class described, in combination, means to feed a cord, means to cause a periodical variation in the diameter of said cord in different planes and in different directions, means to sever said distorted cord into similar lengths, and means to lay such lengths progressively in laterally abutting relation upon a core or mandrel.

23. In a machine of the class described, comprising means to feed a cord under tension, means to cause a periodical variation in in diameter of said cord in different planes and in different directions, means to sever said distorted cord into similar lengths, and means to lay such lengths progressively in laterally abutting relation upon a core or mandrel, the tension on the cord being maintained throughout its progress through the machine.

24. In a machine of the class described, in combination, means to feed a cord, means to lay said cord in lengths progressively about a core or mandrel, and means between said feed and laying means to serve said cord in severed lengths, having gradually varying cross-sectional dimensions in different directions to compensate for the variations in area of the surface to be covered by each cord.

25. In a machine of the class described, comprising means to feed a cord under tension, means to lay said cord in lengths progressively about a core or mandrel, and means between said feed and laying means to serve said cord in severed lengths, having gradually varying cross-sectional dimensions in different directions to compensate for the variations in area of the surface to be covered by each cord, the tension on the cord being maintained at all times.

26. In a machine of the class described, comprising means to feed a plurality of hollow cords under tension, means to form and deliver severed strips composed of said cords combined to have an area progressively varying lengthwise of said strip and means to lay said delivered strips in laterally abutting relation on a core or mandrel, the tension on said strips being maintained at all times 27. In a machine of the class described, in combination, means to deliver units severed from a round hollow cord of indefinite length, such units being so distorted during such delivery to have a varying horizontal diameter, and means to lay such units angularly about a mandrel.

28. In a machine of the class described, comprising means to deliver tensioned units severed from a round hollow cord of indefinite length, such units being so distorted during such delivery to have a varying horizontal diameter, and means to lay such units angularly about a mandrel while maintaining the tension.

29. In a machine of the class described, in combination, means to deliver tensioned strips composed of severed lengths of a plurality of hollow cords so combined as to give each strip a progressively varying width, and means to lay such strips angularly about a core while maintaining the tension.

30. A machine of the class described, comprising in combination, means to deliver units severed from a round cord of indefinite length, the individual cords in such units being so distorted during such delivery as to provide units of varying horizontal widths, and means to lay such units in lateral abutting relation angularly about an annular mandrel.

31. A machine of the class described, comprising means to deliver tensioned units severed from a round cord of indefinite length, such units being so distorted during such delivery as to have a varying horizontal diameter, and means to lay such units in lateral abutting relation angularly about an annular mandrel while maintaining the tension.

32. A machine of the class described, comprising means to deliver tensioned strips composed of severed lengths of a plurality of round cords combined and cross-sectionally distorted during such combining process so as to produce a strip of varying width, and means so as to lay such strips in laterally abutting relation angularly about an annular mandrel that the axis of each strip will be in a plane, the tension on all strips being maintained at a uniform value.

33. In a machine of the class described, in combination, means to feed a plurality of cords, means to combine said cords into a strip having periodical cross-sectional variations in width and thickness in different directions, while maintaining the tension, means to sever said strip into lengths and means to lay such lengths in progressive relation angularly about an annular mandrel, in such a way that the point of maximum width of said strip will be at a point where said annular mandrel is of maximum diameter.

34. In a machine of the class described, comprising means to feed a plurality of cords independently maintained under uniform tension, means to combine said cords into a strip having periodical cross-sectional variations in width and thickness, while maintaining the tension, means to sever said strip into lengths and means to lay such lengths in progressive relation angularly about an annular mandrel, in such a way that the point of maximum width of said strip will be at a point where said annular mandrel is of maximum diameter, the tension on said strips being uniformly maintained.

35. A machine of the class described, comprising in combination, means to feed a plurality of cords independently maintained under uniform tension, means to combine said cords into a strip having periodical variations in its vertical and horizontal dimensions, while maintaining the tension on all the cords therein by a single means, means to sever such strip into lengths and means to lay such lengths in laterally abutting relation progressively and angularly about an annular mandrel, the point of maximum width of said strips coinciding with the point of maximum diameter of said mandrel, the tension being maintained on said strip during the severing and laying operations.

36. In a machine of the class described, in combination, means to deliver units severed from a round hollow cord of indefinite length, such units being distorted during such delivery as to vary the horizontal diameter from a minimum at one end through an intermediate maximum to a minimum at the other end, and means to lay such units simultaneously at a number of points angularly about an annular mandrel, so that the point of maximum diameter of each unit coincides with the point of maximum diameter of the annulus.

37. In a machine of the class described, in combination, means to deliver tensioned strips composed of severed lengths of a plurality of round cords, so combined as to give each strip a progressively varying width and means to lay such strips in laterally abutting relation angularly about an annular core, so that the point of maximum width of each strip coincides with the point of maximum diameter of the core, the tension on the strips being maintained at all times, and the laying means operating so as to lay such strips simultaneously at a plurality of points about said core.

38. In a machine of the class described, in combination, means to feed a plurality of cords independently maintained under uniform tension, means to combine said cords into a strip having periodical variations in width and thickness, means to sever said strip into lengths including a point of maximum width, means to sever said lengths and means to lay such lengths angularly about an annular mandrel in laterally abutting relation so that the point of maximum width of said strip will coincide with the point of maximum diameter of said core, the tension on said cords in said strip being maintained until completion of the laying operation.

39. A machine of the class described, comprising means to feed a plurality of cords, means to combine said cords into a strip of a width varying progressively from a maximum to a minimum, means to sever said strip at its points of minimum width, means to deliver said severed portions and means to lay said severed portions angularly about an annular mandrel in laterally abutting relation with the point of maximum width coinciding with the point of maximum diameter of said mandrel.

40. A machine of the class described, comprising means to feed a plurality of cords independently maintained under uniform tension, means to combine said cords into a strip of a width varying progressively from a maximum to a minimum, means to sever said strip at its points of minimum width, means to deliver said severed portions and means to lay said severed portions angularly about an annular mandrel in laterally abutting relation with the point of maximum width coinciding with the point of maximum diameter of said mandrel, the tension on said cords in said strips being maintained until the strips are laid.

41. In a machine of the class described, in combination, driven rolls to feed a plurality of cords, tensioning devices acting independently to place uniform tension on each cord, means to combine said cords while held in a plane into a strip, said cords being diametrically distorted during such combining process so as to cause said strip to have a varying width, means to sever said strip, means to position said severed portions angularly of an annular mandrel, and means to lay said severed portions about said mandrel, the tension on said cords being maintained throughout.

42. A machine of the class described, comprising driven rolls to feed a plurality of cords, floating weights acting independently to place uniform tension on each cord, means to combine said cords into a strip having a varying width, means to sever said strip and means to lay such severed portions angularly and progressively about an annular mandrel, the severed portions of the strip being so positioned that the variations in width will compensate for the variations in the area on the core to be covered by single strips, the tension on the cords being maintained at all times.

43. In a machine of the class described, in combination, driven rolls to draw a plurality of cords from a suitable supply, floating weights acting independently to stretch said cords and to maintain them in stretched condition, means to combine said cords while lying in a plane, into a strip, the cross-sectional contour of each cord being so distorted under the application of said means as to give the strip a varying width and thickness, means to sever said strip into portions including a point of maximum width, means to deliver said severed portions, and means to lay said portions angularly and progressively in laterally abutting relation about a core, the cords being maintained at all times in stretched condition.

44. In a machine of the class described, in combination, a driven roll to feed a cord from a supply, a tensioning device to stretch said cord, means to distort the cross-sectional area of said cord to provide points of maximum and minimum horizontal diameter, means to deliver said cord in lengths each length having a point of maximum horizontal diameter intermediate its ends, and means to lay such lengths angularly about an annular core, the point of maximum horizontal diameter of said cord coinciding with the point of maximum diameter of the core, the tension on said cord being maintained at all times.

45. In a machine of the class described, in combination, means to feed a plurality of cords independently maintained under uniform tension, means to combine said cords, while lying in a plane, into a strip of varying width, means to sever said strip, means to deliver said severed portions, and means to lay said severed portions angularly about an annular core, in such a manner that the axis of said laid portions will lie in a plane with the variations in width compensating for the variation in that area of said core which is to be covered by said portions, the tension on the cords being maintained at all times before and after severance.

46. In a machine of the class described, in combination, a driven roll to feed a cord from a supply, a floating weight to maintain a uniform tension on said cord, means to distort the contour of said cord to provide portions of varying horizontal diameter, means to deliver said cord in severed lengths, and means to lay such lengths angularly upon a core with the axis of each length lying in a plane, the tension being maintained at all times.

47. A machine of the class described, comprising means to feed a plurality of cords independently maintained under a uniform tension, coacting die members to combine said cords while held in a plane, into a single strip having progressively varying vertical and horizontal cross-sectional dimensions, means to sever said strip, and means to lay severed portions of said strip successively about an annular mandrel, with the axis of each portion in a plane, the point of maximum width of each portion coinciding with the point of maximum diameter of said mandrel, the tension on the cords being maintained at all times.

48. In a machine of the class described, comprising, in combination, means to feed a plurality of independently tensioned cords, coacting die members to exert pressure in two directions upon said cords while lying in a plane whereby to combine said cords into a single strip having progressively varying vertical and horizontal cross-sectional dimensions, means to sever said strip into portions having relatively narrow ends and broad intermediate portions and means to lay said severed portions of said strip successively about an annular mandrel, with the axis of each portion in a plane, the point of maximum width of each portion coinciding with the point of maximum diameter of said mandrel, the tension on the cords being maintained at all times.

49. In a machine of the class described, the combination of means to feed a plurality of cords, die members coacting along different axes to engage said cords while lying in a plane whereby to compress said cords into a single strip having points of maximum and minimum width and points of maximum and minimum depth, the point of maximum width lying in a plane different from the plane of the point of maximum depth, means to sever said strips at points of minimum width, to include an intermediate point of maximum width, and means to lay said severed portions of said strip successively about an annular mandrel, with the axis of each portion in a plane, the point of maximum width of each portion coinciding with the point of maximum diameter of said mandrel, the cords being maintained under tension at least during the laying operation.

50. In a machine of the class described, in combination, means to feed a plurality of cords independently, means to advance said cords from said feeding means intermittently, means to combine said cords while lying in a plane in a state of rest into a strip of varying width and thickness so that the points of width and thickness lie in different planes, means to sever said strip, means to advance said severed portions from said severing means, and means to lay said portions angularly about a core in such a manner that the axis of said laid portions will lie in a plane with the variations in width compensating for the variation in that area of said core which is to be covered by said portions, the tension on said cords being maintained at all times from said feeding means till the completion of said laying operation.

51. In a machine of the class described, comprising means to feed a plurality of cords independently maintained at a uniform tension, means to advance said cords from said feeding means intermittently, coacting die members to compress said cords while in a state of rest into a strip having points of minimum and maximum width, means to sever said strip at its points of minimum width, means to advance said severed portions, and means to lay such portions angularly about a core in such a manner that the axis of said laid portions will lie in a plane, with the variations in width compensating for the variation in that area of said core which is to be covered by said portions, the tension on said cords being maintained at all times from said feeding means till the completion of said laying operation.

52. In a machine of the class described, in combination, means to feed a plurality of cords independently maintained at a uniform tension, means to advance said cords from said feeding means intermittently, a fixed platen across which said cords move, a die member movable relative to said platen to combine said cords while at rest into a strip having a flattened portion intermediate the ends of said platen, die members coacting with said movable die member and with each other to constrict said strip at either side of said flattened portion, means to sever said strip, means to advance said severed portions and means to lay said portions angularly about a core in such manner that the axis of said laid portions will lie in a plane with the variations in width compensating for the variation in that area of said core which is to be covered by said portions, the tension on said cords being maintained at all times from said feeding means until the completion of said laying operation.

53. In a machine of the class described, the combination of means to feed a plurality of cords, means to advance said cords from said feeding means intermittently, a fixed platen across which said cords move, a die member movable toward said platen whereby to combine said cords while at rest into a strip having a flattened portion intermediate the ends of said platen, a pair of die members acting along said platen to compress said strip in the direction of its width whereby to restrict said strip on either side of said flattened portion, means to advance said strip after the action of said die members, means to sever said strip at its constricted point, and means to lay said severed portions angularly in successive relation about an annular mandrel with the point of maximum flattening coinciding with the point of maximum diameter of said mandrel, the strips being tensioned while being formed and laid.

54. In a machine of the class described, in combination, means to feed a plurality of cords independently maintained at a uniform tension, means to advance said cords from said feeding means intermittently, a fixed platen across which said cords move, a die member movable relative to said platen whereby to combine said cords while at rest into a strip having a flattened portion intermediate the ends of said platen, coacting die members operative along said platen to form said strip with constricted portions having beveled edges, at either side of said flattened portion, means to sever said strip at its constricted points, and means to lay said severed portions angularly about an annular mandrel in successive abutting relation with the point of maximum flattening coinciding with the point of maximum diameter of said mandrel, the tension on said cords being maintained from the feeding means until the laying means has completed its operation.

55. A machine of the class described, comprising in combination, means to feed a plurality of cords, intermittently acting means to combine said cords into a single strip having alternate flattened and restricted portions, reciprocating means to draw said strip from said last named means, means to sever said strip at its points of maximum restriction and means to lay said severed portions angularly in successive relation about an annular mandrel with the point of maximum flattening coinciding with the point of maximum diameter of said mandrel, the cords of the strips being in stretched condition while being formed and laid.

56. In a machine of the class described, in combination, means to feed a plurality of cords, intermittently acting means to combine said cords into a single strip having alternate flattened and restricted portions, a slide reciprocated to draw said strip from said last-named means, means to sever said strip at its points of maximum restriction, and means to lay said severed portions angularly about an annular mandrel in successive abutting relation with the point of maximum flattening coinciding with the point of maximum diameter of said mandrel.

57. In a machine of the class described, in combination, means to feed a plurality of cords, intermittently acting means to combine said cords into a single strip having alternate flattened and restricted portions, a reciprocating slide having jaws adapted to hold said strip whereby to draw said strip from said last-named means when in inoperative position as said slide is reciprocated therefrom, means to sever said strip at its points of maximum restriction, and means to lay said severed portions angularly in successive relation about an annular mandrel with the point of maximum flattening coinciding with the point of maximum diameter of said mandrel.

58. A machine of the class described, comprising means to feed a plurality of cords, intermittently acting means to combine said cords into a single strip having alternate flattened and restricted portions, a reciprocating slide having fixed and movable jaws, a secondary slide independently movable to cause said jaws to engage the end of said strip to draw the same through strip-forming means as said slide reciprocates therefrom, means to sever said strip at its points of maximum restriction and means to lay said severed portions angularly about an annular mandrel in successive abutting relation with the point of maximum flattening coinciding with the points of maximum diameter of said mandrel.

59. In a machine of the class described, the combination with means to feed a plurality of cords independently maintained at a uniform tension, of intermittently acting means to combine said cords into a single strip having alternate flattened and restricted portions, a reciprocating slide having fixed and movable jaws, a secondary slide mounted in said reciprocating slide and movable therein to actuate said movable jaw to grip said strip whereby the reciprocation of said first-named slide will draw said strip through said strip-forming means while the latter is in inoperative position, means to sever said strip at its points of maximum restriction, and means to lay said severed portions angularly in successive relation about an annular mandrel with the point of maximum flattening coinciding with the point of maximum diameter of said mandrel, the tension on said cords being maintained at all times.

60. A machine of the class described comprising, in combination, means to feed a plurality of cords, intermittently acting means to combine said cords into a single strip having alternate flattened and restricted portions, means to sever said strip at its points of maximum restriction, and means to lay said severed portions angularly about an annular mandrel in successive abutting relation with the point of maximum flattening coinciding with the point of maximum diameter of said mandrel, the cords being tensioned while being laid.

61. In a machine of the class described, in combination, means to feed a plurality of cords, intermittently acting means to combine said cords into a single strip having alternate flattened and restricted portions, a reciprocating slide, fixed and movable jaws mounted on said slide, a secondary slide freely movable in said first slide, cam-actuated means to reciprocate said slide, means to move said secondary slide in its mountings, a screw attached to said movable jaw, means on said secondary slide whereby the movement of said slide will rotate said screw to move said jaw to gripping position relative to said strip whereby to draw the same from said strip forming means as said reciprocating slide is moved, means to sever said strip at its points of maximum restriction, and means to lay said severed portions angularly in successive relation about an annular mandrel with the point of maximum flattening coinciding with the point of maximum diameter of said mandrel, the laying means holding the cords under tension while laying the same.

62. In a machine of the class described, in combination, means to feed a plurality of cords, intermittently acting means to combine said cords into a single strip having alternate flattened and restricted portions, a reciprocating slide having jaws thereon, means to cause said jaws to grip said strip at the inward limit of reciprocation of said slide, means to hold said jaws in gripping position during the outward movement of said slide whereby to draw said strip from said strip-forming means, means to cause said jaws to release said strip at the outward limit of reciprocation, means to sever said strip between said jaws and said strip-forming means, transferring means having means thereon to grip said strip at either end prior to the release of said slide jaws and the action of said severing means, and means to take said severed portions from said transferring means and to lay them angularly in successive relation about an annular mandrel with the point of maximum flattening coinciding with the point of maximum diameter of said mandrel.

63. A machine of the class described comprising, in combination, means to feed a plurality of cords independently maintained at a uniform tension, intermittently acting means to combine said cords into a single strip having alternate flattened and restricted portions, means to advance said strip from said intermittent means, a transfer arm to grip said strip in its jaws, means to sever said strip between said transfer arm and said strip forming means, means to cause said transfer arm to serve said severed portions, and means to lay said severed portions angularly in successive relation about an annular mandrel with the point of maximum flattening coinciding with the point of maximum diameter of said mandrel, the tension on said cords being maintained at all times.

64. A machine of the class described, comprising, in combination, means to feed a plurality of cords independently maintained at a uniform tension, intermittently acting means to combine said cords into a single strip having alternate flattened and restricted portions, means to advance said strip from said intermittent means, a transfer arm having jaws on either end, means to cause said transfer arm to grip said strip, means to sever said strip between said transfer arm and said strip-forming means, said severing means being actuated subsequent to the gripping by said transfer arm, means to cause said transfer arm to serve said severed portions, and means to lay said severed portions angularly in successive relation about an annular mandrel with the point of maximum flattening coinciding with the point of maximum diameter of said mandrel, the tension on said cords being maintained at all times.

65. In a machine of the class described, the combination with means to feed a plurality of cords independently maintained at a uniform tension, of intermittently acting means to combine said cords into a single strip having alternate flattened and restricted portions, guiding means for the strip after it leaves said intermittent means, including pivoted plates movable to bear against said strip, a reciprocating slide provided with jaws, means to cause said jaws to grip said strip whereby to draw said strip from said intermittent means as said slide is reciprocated therefrom, means to sever said strip at its points of maximum restriction and means to lay said severed portions angularly in successive relation about an annular mandrel with the point of maximum flattening coinciding with the point of maximum diameter of said mandrel, the tension on said cords being maintained at all times.

66. In a machine of the class described, in combination, means to feed a plurality of cords independently maintained at a uniform tension, means to combine said cords into a single strip having alternate flattened and constricted portions, means to draw said strip from said last-named means, a transfer arm having jaws adapted to seize the formed strip at two points after it is drawn from said forming means, means to sever said strip between said transfer arm and said forming means after the seizure by said transfer arm, means to give said transfer arm a partial rotation, and means to take said severed portions from said transfer arm and to lay them angularly in successive relation about an annular mandrel with the point of maximum flattening coinciding with the point of maximum diameter of said mandrel, the tension on said cords being maintained at all times.

67. In a machine of the class described, in combination, means to feed a plurality of cords independently maintained at a uniform tension, means to combine said cords into a strip having alternate flattened and constricted portions, means to draw said strip from said last-named means, a transfer arm pivotally mounted intermediate its ends, pairs of jaws at either end of said arm, means to swing said arm to a position with a strip lying between the jaws of said pair, means to cause said jaws to grip the strip, means to sever the strip between the rearward jaws of said arm and said strip-forming means, means to give said arm a partial rotation to cause the axis of the transferred portion of the strip to lie at an angle to an annular mandrel and means to take the transferred portions from said arm and to lay it angularly about said mandrel, with the point of maximum flattening coinciding with the point of maximum diameter of said mandrel, tension being maintained on said lengths during the laying operation.

68. A machine of the class described, comprising means to feed a plurality of cords independently maintained at a uniform tension, means to combine said cords into a strip having alternate flattened and constricted portions, means to draw said strip from said last-named means, a swinging transfer arm having pairs of jaws on either end thereof, means to swing said arm by intermittent steps to a position at an angle to an annular mandrel, cam-actuated means to cause said jaws to grip said strip while said arm is in a state of rest, means between said rearward jaws and said strip-forming means to sever said strip, said severing means being operable after the seizure by said arm jaws, and means to take said severed portions from said arm and to lay them angularly about said mandrel in successive laterally abutting relation with the point of maximum flattening coinciding with the point of maximum diameter of said mandrel, the tension being maintained on said lengths during the laying operation.

69. A machine of the class described, comprising means to feed a plurality of cords, means to combine said cords into a single strip having alternate flattened and constricted portions, means to draw said strip from said last-named means, a swinging knife operable to sever said strip into unit lengths, means to deliver said lengths, and means to lay said lengths angularly in successive laterally abutting relation about an annular mandrel with the point of maximum flattening coinciding with the point of maximum diameter of said mandrel, tension being maintained on said lengths during the laying operation.

70. A machine of the class described, comprising means to feed a plurality of cords, means to combine said cords into a single strip having alternate flattened and constricted portions, means to draw said strip from said last-named means, a swinging knife operable to sever said strip, a platen movable with said knife to a position on the opposite side of said strip, means to deliver the severed lengths of said strip, and means to lay said lengths angularly in successive laterally abutting relation about an annular mandrel with the point of maximum flattening coinciding with the point of maximum diameter of said mandrel, tension being maintained on said lengths during the laying operation.

71. A machine of the class described, comprising means to feed a plurality of cords, means to combine said cords into a single strip having alternate flattened and constricted portions, means to draw said strip from said last-named means, a knife movable across and through said strip, a platen movable with said knife to a position in engagement with said strip at a point opposite said knife, means to deliver the severed lengths of said strip and means to lay said lengths angularly in successive laterally abutting relation about an annular mandrel with the point of maximum flattening coinciding with the point of maximum diameter of said mandrel, tension being maintained on said lengths during the laying operation.

72. A machine of the class described, comprising means to feed a plurality of cords independently maintained at a uniform tension, means to combine said cords into a strip having alternate flattened and constricted portions, means to draw said strip from said last-named means, a knife mounted between spring-held plates and movable through and across said strip, a platen movable with said knife to a position against said strip at a point opposite said knife, means to deliver the severed lengths of said strip, and means to lay said lengths angularly in successive laterally abutting relation about an annular mandrel with the point of maximum flattening coinciding with the point of maximum diameter of said mandrel, tension being maintained on said lengths during the laying operation.

73. In a machine of the class described, in combination, means to feed a plurality of cords independently maintained at a uniform tension, means to combine said cords into a strip having alternate flattened and constricted portions, means to draw said strip from said last-named means, a knife mounted between spring-held plates, a platen movable to a position against said strip, means to move said knife across and through said strip and to move said platen to operative position prior to the engagement of said knife with said strip, means to deliver the severed lengths of said strip and means to lay said lengths angularly in successive laterally abutting relation about an annular mandrel with the point of maximum flattening coinciding with the point of maximum diameter of said mandrel, tension being maintained on said lengths during the laying operation.

74. A machine of the class described, comprising means to feed a plurality of cords independently maintained at a uniform tension, means to combine said cords into a strip having alternate flattened and constricted portions, means to draw said strip from said last-named means, a movable arm, a knife mounted thereon, a platen movable by said arm to a position opposed to said knife and on the other side of said strip, means to move said arm to cause said knife to pass through and across said strip, means to deliver the severed lengths of said strip and means to lay said lengths angularly in successive laterally abutting relation about an annular mandrel with the point of maximum flattening coinciding with the point of maximum diameter of said mandrel, tension being maintained on said strip during the laying operation.

75. In a machine of the class described, in combination, means to feed a plurality of cords, means to combine said cords into a strip having alternate flattened and constricted portions, means to draw said strip from said last-named means, a movable arm having a knife on one end thereof, a spring-held box into which said arm projects, a pair of spaced plates on one end of said box between which said knife lies a platen adapted to be moved with said arm to rest against said strip at a point opposite to said knife, cam mechanism to move said platen and said arm toward said strip and to move said knife through and across said strip. means to deliver the severed lengths of said strip and means to lay said lengths angularly in successive laterally abutting relation about an annular mandrel with the point of maximum flattening coinciding with the point of maximum diameter of said mandrel, tension being maintained on said strip during the laying operation.

76. In a machine of the class described, in combination, means to feed a plurality of cords, means to combine said cords into a single strip having alternate flattened and constricted portions, means to draw said strip from last-named means, means to sever said strip into similar lengths, means to serve such lengths and pivoted layer arms to lay such lengths angularly about an annular mandrel.

77. In a machine of the class described, the combination of means to feed a plurality of tensioned cords, means to combine said cords into a strip having alternate flattened and constricted portions, means to draw said strip from said last-named means, means to sever said strip into similar lengths, means to sever such lengths, and pivoted layer arms positioned on either side of an annular mandrel, adapted to lay such lengths angularly thereon, the lengths being under tension during the laying operations.

78. A machine of the class described, comprising means to feed a plurality of cords independently maintained at a uniform tension, means to combine said cords into a strip having alternate flattened and constricted portions, means to draw said strip from said last-named means, means to sever said strip into similar lengths, means to serve such lengths, pivoted layer arms positioned on either side of an annular mandrel, jaws on said layer arms, means to cause said jaws to grip the ends of such lengths, and means to cause said arms to lay such lengths about said mandrel, tension being maintained on the strip during the laying operation.

79. In a machine of the class described, in combination, means to feed a plurality of cords independently maintained at a uniform tension, means to combine said cords into a strip having alternate flattened and constricted portions, means to draw said strip from said last-named means, pivoted layer arms positioned on either side of an annular mandrel, jaws on said arms to grip the ends of such strip, and means to cause said arms to move downwardly with an inward swinging motion to lay such lengths about said mandrel, the strip being under tension during the laying operation.

80. A machine of the class described, comprising, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, a layer arm positioned on either side of an annular mandrel, jaws mounted in the ends thereof, means to cause said jaws to grip the ends of said lengths of strip, means to move said arms and to move said jaws on their supports, whereby to lay such lengths about said mandrel, tension being maintained during the laying operation.

81. In a machine of the class described, in combination, means to feed a plurality of cords, means to combine said cords into a strip having alternate flattened and constricted portions, means to draw said strip from said last-named means, means to sever said strip into similar lengths, means to serve such lengths, a layer arm positioned on either side of an annular mandrel, gripping jaws mounted upon their ends, layer arms, means to cause said jaws to grip the ends of said lengths of strip, and means to swing said arms whereby to lay such lengths about said mandrel.

82. A machine of the class described, comprising means to feed a plurality of cords independently maintained at a uniform tension, means to combine said cords into a strip having alternate flattened and constricted portions, means to draw said strip from said last-named means, means to sever said strip into similar lengths, means to serve such lengths, a pair of layer arms, one being positioned on each side of an annular mandrel and having layer hands pivoted on their ends, jaws on the ends of said hands to grip the ends of said lengths of strip, means to move said arms, means operable to cause said layer hands to swing, whereby to lay such lengths about said mandrel, tension being maintained on the lengths during the laying operation.

83. A machine of the class described, in combination, comprising means to feed a plurality of cords, means to combine said cords into a strip having alternate flattened and constricted portions, means to draw said strip from said last-named means, a plurality of layer arms, one being positioned on either side of an annular mandrel, carrying cord laying hands pivoted on their ends, means for operating said laying hands, jaws on said hands to grip the ends of said lengths of strip, means to actuate said jaws, and means to actuate said pair of said arms whereby to lay said lengths about said mandrel.

84. A machine of the class described, comprising, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, layer arms, one of which is positioned upon each side of an annular mandrel, jaws on said layer arms, a cam to operate said layer arms, whereby to cause the latter to swing to lay a length of strip held in said jaws about said mandrel, tens on being maintained on the lengths during laying.

85. In a machine of the class described, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, a pair of layer arms, one of which is positioned on either side of an annular mandrel, a pair of opposed jaws on each of said arms, means to actuate each jaw separately, and means to actuate said layer arms, whereby to swing said arms to lay a length of strip held in jaws, about said mandrel, the tension being maintained on said length during the laying operation.

86. In a machine of the class described, the combination with means to feed a plurality of cords independently maintained at a uniform tension, of means to combine said cords into a strip having alternate flattened and constricted portions, means to draw said strip from said last-named means, means to sever said strip into similar lengths, means to serve such lengths, a layer arm positioned on either side of an annular mandrel, a pair of jaws in each arm, and means to move said arms in unison and relatively to each other, whereby to lay a length of strip held in such jaws about said mandrel, tension being maintained on said lengths during the laying operation.

87. In a machine of the class described, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, a layer arm positioned on either side of an annular mandrel, a slidable upper jaw in each arm, a swinging lower jaw in each arm, separate means to actuate each jaw, and means to actuate both arms, whereby to swing them to lay a length of strip held in said jaws about said mandrel, tension being maintained on said lengths during the laying operation.

88. In a machine of the class described, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, layer arms positioned on either side of an annular mandrel, a slidable spring-held upper jaw in each arm, an arm pivoted on said layer arm and having a lower jaw therein, means to actuate said upper jaw, means to swing said jaw arm, and means to actuate said arms whereby to swing them, and to cause them to lay a length of strip held in said jaws about said mandrel, tension being maintained on said lengths during the laying operation.

89. In a machine of the class described, in combination, means to feed a plurality of cords independently maintained at a uniform tension, means to combine said cords into sheathed strip having alternate flattened and constricted portions, means to draw said strip from said last-named means, means to sever said strip into similar lengths, means to serve such lengths, a layer arm positioned on each side of an annular mandrel, a slidable spring-held upper jaw in each arm, an arm carrying a lower jaw and pivoted on said layer arm, cam and toggle mechanism to move said upper jaw to open position, cam and toggle mechanism to swing said jaw arm to open position, and means to actuate both arms whereby to swing said arms to lay a length of strip held in said jaws about said mandrel, tension being maintained on said lengths during the laying operation.

90. In a machine of the class described, the combination with means to feed a plurality of cords independently maintained at a uniform tension, of means to combine said cords into a single strip having alternate flattened and constricted portions, means to draw said strip from said last-named means, means to sever said strip into similar lengths, means to serve such lengths, a layer arm positioned upon each side of an annular mandrel, said arms being operated by a common operating means, a slidable spring-held upper jaw in each arm, an arm carrying a lower jaw and pivoted on said layer arm, a wiper, and means to swing said arms in unison to lay a length of strip held in said jaws, about said mandrel, tension being maintained on said lengths during the laying operation.

91. In a machine of the class described, in combination, means to feed a plurality of cords independently maintained at a uniform tension, means to combine said cords into a strip having alternate flattened and constricted portions, means to draw said strip from said last-named means, means to sever said strip into similar lengths, means to serve such lengths, a pair of layer arms, one of said arms being positioned on either side of an annular mandrel, a pair of jaws in the end of each layer arm, and means to cause said arms to move relatively to one another whereby to swing them and to lay a length of strip held in said jaws about said mandrel, the tension being maintained on said lengths during the laying operation.

92. A machine of the class described, comprising means to feed a plurality of cords under uniform tension, means to combine said cords into a strip having recurring variations in width, means to sever said strip into lengths, means to serve such lengths, means to lay such lengths angularly about a mandrel, and means to advance said mandrel through an arc between successive operations of said laying means.

93. In a machine of the class described, in combination, means to feed a plurality of cords under uniform tension, means to combine said cords into a single strip having recurring variations in width, means to sever said strip into lengths, means to serve such lengths, means to lay such lengths angularly about an annular mandrel, and means to rotate said mandrel through such an arc between successive operations of said laying means, as to cause said strips to lie in laterally abutting relation.

94. In a machine of the class described, in combination, means to feed a plurality of cords under uniform tension, means to combine said cords into a single strip having recurring variations in width, means to sever said strip into lengths, means to serve such lengths, means to lay such lengths angularly about an annular mandrel, driving means to rotate said mandrel and means to actuate said driving means intermittently.

95. In a machine of the class described, in combination, means to feed a plurality of cords under uniform tension, means to combine said cords into a single strip having recurring variations in width, means to sever said strip into lengths, means to serve such lengths, means to lay such lengths angularly about an annular mandrel, and means to advance said mandrel between successive laying operations by an arc proportioned to the area occupied by a single strip.

96. In a machine of the class described, in combination with means for feeding a cord or cords, of means for sheathing said cord or cords, means for distorting said cord or cords in a plurality of planes lying in different directions, and means for laying severed lengths of said cord or cords upon a form or mandrel.

97. In a machine of the class described, in combination with means for feeding a cord or cords, of means for sheathing said cord or cords with unvulcanized rubber, means for distorting said cord or cords in a plurality of planes extending in different directions, and means for laying severed lengths of said cord or cords upon a form or mandrel.

98. In a machine of the class described, in combination, means for feeding a cord or cords, means for sheathing said cord or cords, means acting in opposite directions upon said cord or cords to distort it or them cross-sectionally in different planes and in different directions, means for laying severed lengths of said cord upon a form.

99. In a machine of the class described, in combination, means for feeding a plurality of cords, means for sheathing said cords, means for uniting said cords into a strip, means acting recurringly upon strip to vary it in width and thickness by molding the cords to change their cross-sectional contour in different planes and in different directions, means for severing molded lengths of said cord, and means for seizing the ends of said severed lengths and laying them about a form.

100. In a machine of the class described, in combination, means for feeding a plurality of cords, means for uniting said cords into a strip, means for sheathing said strip, means acting recurringly upon said strip to vary it in width and thickness by molding the cords to change their cross-sectional contour in different planes and in different directions, means for severing molded lengths of said cord, and means for seizing the ends of said severed lengths and laying them about a form.

101. In a machine of the class described, in combination, means for feeding a plurality of cords, means for sheathing said cords, means for uniting said cords into a strip, said strip being sheathed by the sheathing of the individual cords, means acting recurringly upon said strip to vary it in width and thickness by molding the cords to change their cross-sectional contour in different planes and in different directions, means for severing molded lengths of said cord, and means for seizing the ends of said severed lengths and laying them about a form.

102. In a machine of the class described, in combination, means for feeding a plurality of cords under tension, means for uniting said cords into a sheathed strip, means acting recurringly upon said strip to vary it in width and thickness by molding the cords to change their cross-sectional contour in different planes and in different directions, means for severing molded lengths of said cord, and means for seizing the ends of said severed lengths and laying them about a form, the laying means retaining the lengths of cord under tension while laying them.

103. In a machine of the class described, in combination with the feeding and laying means, of means located between the two to sheathe a cord with unvulcanized rubber, and to mold said sheathed cord by pressure exerted upon it in different planes and different directions.

104. In a machine of the class described, in combination with means adapted to serve a plurality of cords under tension, of means to lay severed lengths of a strip formed of said cords while maintaining the tension, and means for combining the cords while under tension into such a sheathed strip by a molding operation to change their cross-sectional contour in different planes and in different directions before the severance and laying.

105. In a machine of the class described, in combination, means for feeding a plurality of cords, means to sheathe the individual cords with unvulcanized rubber, means to combine said sheathed cords into a strip whereby the strip is also sheathed, means for recurringly distorting the cross-section of said strip in different planes and in different directions, and means to lay cord units severed from said strip upon the form or mandrel.

106. In a machine of the class described, in combination, means to feed the cord, means to sheathe the same with unvulcanized rubber, means to vary the cross-sectional contour of said cord in different planes and in different directions, means to sever said distorted cord into lengths, and means to lay such lengths upon a core or mandrel.

107. In a machine of the class described, in combination, means to deliver tensioned strips composed of sheathed severed lengths of a plurality of hollow cords so combined as to give each strip a progressively varying width, and means to lay such strips angularly about a core while maintaining the tension.

In testimony whereof, I affix my signature.

FREDRICK S. DICKINSON.